(12) United States Patent
Du et al.

(10) Patent No.: US 11,198,394 B2
(45) Date of Patent: Dec. 14, 2021

(54) VEHICLE RUNNING BOARD APPARATUS AND RETRACTABLE DEVICE THEREOF

(71) Applicant: T-MAX (HANGZHOU) TECHNOLOGY CO., LTD., Hangzhou (CN)

(72) Inventors: Xinfa Du, Hangzhou (CN); Qi Zhang, Hangzhou (CN); Songfeng Wang, Hangzhou (CN); Yongyong Zhan, Hangzhou (CN); Yiming Wang, Hangzhou (CN); Tao He, Hangzhou (CN); Xing Fan, Hangzhou (CN)

(73) Assignee: T-MAX (HANGZHOU) TECHNOLOGY CO., LTD., Hangzhou (CN)

( * ) Notice: Subject to any disclaimer, the term of this patent is extended or adjusted under 35 U.S.C. 154(b) by 193 days.

(21) Appl. No.: 16/517,527

(22) Filed: Jul. 19, 2019

(65) Prior Publication Data
US 2020/0023780 A1  Jan. 23, 2020

Related U.S. Application Data

(63) Continuation-in-part of application No. 16/199,517, filed on Nov. 26, 2018, now Pat. No. 10,384,614.

(30) Foreign Application Priority Data

Jul. 20, 2018  (CN) .......................... 201810805743.4
Jul. 20, 2018  (CN) .......................... 201821161957.4
(Continued)

(51) Int. Cl.
*B60R 3/02* (2006.01)
*B60R 3/00* (2006.01)

(52) U.S. Cl.
CPC ................ *B60R 3/02* (2013.01); *B60R 3/002* (2013.01)

(58) Field of Classification Search
CPC .............. B60R 3/00; B60R 3/002; B60R 3/02
See application file for complete search history.

(56) References Cited

U.S. PATENT DOCUMENTS

| 7,591 A | 8/1850 | Burdett |
| 634,385 A | 10/1899 | Wolfe et al. |

(Continued)

FOREIGN PATENT DOCUMENTS

| CA | 1021826 | 11/1977 |
| CA | 2082177 | 5/1994 |

(Continued)

OTHER PUBLICATIONS

International Search Report and Written Opinion of the International Searching Authority for PCT International Application No. PCT/CN2015/097930 dated May 10, 2016.

(Continued)

*Primary Examiner* — Jeffrey J Restifo
(74) *Attorney, Agent, or Firm* — Perkins Coie LLP

(57) ABSTRACT

The present disclosure relate to a vehicle running board apparatus and a retractable device thereof. In some embodiments, a retractable device includes a running board holder and an arm assembly. The running board holder has a connecting portion, and the arm assembly is configured to drive the running board holder to move between an extended position and a retracted position. The arm assembly includes a first arm and a second arm. The first arm has a first end and a second end. The second end of the first arm is pivotally connected to the connecting portion of the running board holder. The second arm has a first end and a second end. The second end of the second arm is pivotally connected to the (Continued)

connecting portion of the running board holder. The second end of at least one of the first arm or the second arm straddles the connecting portion.

20 Claims, 27 Drawing Sheets

(30) Foreign Application Priority Data

Feb. 22, 2019 (CN) .......................... 201910132865.6
Feb. 22, 2019 (CN) .......................... 201920229788.1
Apr. 16, 2019 (CN) .......................... 201910304218.9
Apr. 16, 2019 (CN) .......................... 201920517260.4

(56) References Cited

U.S. PATENT DOCUMENTS

| | | |
|---|---|---|
| 724,155 A | 3/1903 | Besse |
| 752,031 A | 2/1904 | Chadwick |
| 817,224 A | 4/1906 | Clifford |
| 955,658 A | 4/1910 | Mitchell et al. |
| 1,063,643 A | 6/1913 | Blake et al. |
| 1,169,140 A | 1/1916 | Fassett et al. |
| 1,176,538 A | 3/1916 | Warner |
| 1,182,169 A | 5/1916 | Hansen |
| 1,222,127 A | 4/1917 | Perri |
| 1,239,892 A | 9/1917 | Dunderdale |
| 1,242,828 A | 10/1917 | Lyle |
| 1,250,604 A | 12/1917 | Lorenc |
| 1,268,335 A | 6/1918 | Fairchild |
| 1,364,697 A | 1/1921 | Branch |
| 1,437,648 A | 12/1922 | Gore |
| 1,449,031 A | 3/1923 | Blake |
| 1,471,972 A | 10/1923 | Miller |
| 1,621,479 A | 3/1927 | Cleveland et al. |
| 1,755,942 A | 4/1930 | Woolson |
| 1,800,162 A | 4/1931 | Stroud |
| 2,029,745 A | 2/1936 | Stiner |
| 2,041,640 A | 5/1936 | Goss |
| 2,118,557 A | 5/1938 | Hamilton |
| 2,122,040 A | 6/1938 | Machovec |
| 2,125,085 A | 7/1938 | Pool |
| 2,197,266 A | 4/1940 | Fredell |
| 2,209,576 A | 7/1940 | McDonald |
| 2,246,986 A | 6/1941 | Pellegrini |
| 2,436,961 A | 3/1948 | Gabriel |
| 2,487,921 A | 11/1949 | Culver |
| 2,492,068 A | 12/1949 | Schofield et al. |
| 2,566,401 A | 9/1951 | Bustin |
| 2,575,615 A | 11/1951 | Crump |
| 2,583,894 A | 1/1952 | Shuck |
| 2,645,504 A | 7/1953 | Branstrator et al. |
| 2,669,613 A | 2/1954 | Despard |
| 2,678,832 A | 5/1954 | Wright |
| 2,682,671 A | 7/1954 | Faure |
| 2,764,422 A | 9/1956 | McDonald |
| 2,774,494 A | 12/1956 | Malmström |
| 2,825,582 A | 3/1958 | McDonald |
| 2,921,643 A | 1/1960 | Vanderveld |
| 2,925,876 A | 2/1960 | Wagner |
| 2,998,265 A | 8/1961 | Kozicki |
| 3,008,533 A | 11/1961 | Haberle |
| 3,012,633 A | 12/1961 | Magee |
| 3,039,562 A | 6/1962 | Wagner |
| 3,095,216 A | 6/1963 | Browne et al. |
| 3,164,394 A | 1/1965 | Husko |
| 3,172,499 A | 3/1965 | Stairs |
| 3,266,594 A | 8/1966 | Antosh et al. |
| 3,329,443 A | 7/1967 | Lowder et al. |
| 3,392,990 A | 7/1968 | Wolf |
| 3,488,066 A | 1/1970 | Hansen |
| 3,494,634 A | 2/1970 | De Paula |
| 3,515,406 A | 6/1970 | Endsley |
| 3,517,942 A | 6/1970 | Cuffe et al. |
| 3,522,396 A | 7/1970 | Norden |
| 3,528,574 A | 9/1970 | Denner et al. |
| 3,572,754 A | 3/1971 | Fowler |
| 3,608,957 A | 9/1971 | Maneck |
| 3,650,423 A | 3/1972 | O'Brien |
| 3,671,058 A | 6/1972 | Kent |
| 3,745,595 A | 7/1973 | Nagy |
| 3,756,622 A | 9/1973 | Pyle et al. |
| 3,762,742 A | 10/1973 | Bucklen |
| 3,784,227 A | 1/1974 | Rogge |
| 3,799,288 A | 3/1974 | Manuel |
| 3,807,757 A | 4/1974 | Carpenter et al. |
| 3,833,240 A | 9/1974 | Weiler |
| 3,853,369 A | 12/1974 | Holden |
| 3,863,890 A | 2/1975 | Ruffing |
| 3,865,399 A | 2/1975 | Way |
| 3,869,022 A | 3/1975 | Wallk |
| 3,869,169 A | 3/1975 | Johnson et al. |
| 3,887,217 A | 6/1975 | Thomas |
| 3,889,997 A | 6/1975 | Schoneck |
| 3,891,261 A | 6/1975 | Finneman |
| 3,913,497 A | 10/1975 | Maroshick |
| 3,915,475 A | 10/1975 | Casella et al. |
| 3,957,284 A | 5/1976 | Wright |
| 3,961,809 A | 6/1976 | Clugston |
| 3,980,319 A | 9/1976 | Kirkpatrick |
| 3,981,515 A | 9/1976 | Rosborough |
| 3,986,724 A | 10/1976 | Rivinius |
| 3,997,211 A | 12/1976 | Graves |
| 4,020,920 A | 5/1977 | Abbott |
| 4,053,172 A | 10/1977 | McClure |
| 4,058,228 A | 11/1977 | Hall |
| 4,068,542 A | 1/1978 | Brand et al. |
| 4,073,502 A | 2/1978 | Frank et al. |
| 4,089,538 A | 5/1978 | Eastridge |
| 4,098,346 A | 7/1978 | Stanfill |
| 4,103,872 A | 8/1978 | Hirasuka |
| 4,106,790 A | 8/1978 | Weiler |
| 4,110,673 A | 8/1978 | Nagy et al. |
| 4,116,457 A | 9/1978 | Nerem et al. |
| 4,124,099 A | 11/1978 | Dudynskyj |
| 4,145,066 A | 3/1979 | Shearin |
| 4,164,292 A | 8/1979 | Karkau |
| 4,168,764 A | 9/1979 | Walters |
| 4,174,021 A | 11/1979 | Barlock |
| 4,180,143 A | 12/1979 | Clugston |
| 4,185,849 A | 1/1980 | Jaeger |
| 4,188,889 A | 2/1980 | Favrel |
| 4,194,754 A | 3/1980 | Hightower |
| 4,205,862 A | 6/1980 | Tarvin |
| 4,219,104 A | 8/1980 | MacLeod |
| 4,231,583 A | 11/1980 | Learn |
| 4,275,664 A | 6/1981 | Reddy |
| 4,325,668 A | 4/1982 | Julian et al. |
| 4,369,984 A | 1/1983 | Hagen |
| 4,424,751 A | 1/1984 | Blochlinger |
| 4,440,364 A | 4/1984 | Cone et al. |
| 4,462,486 A | 7/1984 | Dignan |
| 4,536,004 A | 8/1985 | Brynielsson et al. |
| 4,542,805 A | 9/1985 | Hamlin et al. |
| 4,570,962 A | 2/1986 | Chavira |
| 4,623,160 A | 11/1986 | Trudell |
| D287,001 S | 12/1986 | Jarvie et al. |
| 4,676,013 A | 6/1987 | Endo |
| 4,679,810 A | 7/1987 | Kimball |
| 4,696,349 A | 9/1987 | Harwood et al. |
| D292,904 S | 11/1987 | Bielby |
| 4,708,355 A | 11/1987 | Tiede |
| 4,711,613 A | 12/1987 | Fretwell |
| 4,720,116 A | 1/1988 | Williams et al. |
| 4,733,752 A | 3/1988 | Sklar |
| 4,757,876 A | 7/1988 | Peacock |
| 4,846,487 A | 7/1989 | Criley |
| 4,858,888 A | 8/1989 | Cruz et al. |
| 4,909,700 A | 3/1990 | Fontecchio et al. |
| 4,911,264 A | 3/1990 | McCafferty |
| 4,926,965 A | 5/1990 | Fox |
| 4,930,973 A | 6/1990 | Robinson |
| 4,958,979 A | 9/1990 | Svensson |

(56) References Cited

U.S. PATENT DOCUMENTS

| | | | |
|---|---|---|---|
| 4,982,974 | A | 1/1991 | Guidry |
| 4,991,890 | A | 2/1991 | Paulson |
| D316,394 | S | 4/1991 | Carr |
| 5,005,667 | A | 4/1991 | Anderson |
| 5,005,850 | A | 4/1991 | Baughman |
| 5,007,654 | A | 4/1991 | Sauber |
| 5,028,063 | A | 7/1991 | Andrews |
| 5,039,119 | A | 8/1991 | Baughman |
| 5,085,450 | A | 2/1992 | DeHart, Sr. |
| 5,137,294 | A | 8/1992 | Martin |
| 5,154,125 | A | 10/1992 | Renner et al. |
| 5,195,609 | A | 3/1993 | Ham et al. |
| 5,199,731 | A | 4/1993 | Martin |
| 5,228,707 | A | 7/1993 | Yoder |
| 5,228,761 | A | 7/1993 | Huebschen et al. |
| 5,238,300 | A | 8/1993 | Slivon et al. |
| 5,253,973 | A | 10/1993 | Fretwell |
| D340,905 | S | 11/1993 | Orth et al. |
| 5,257,767 | A | 11/1993 | McConnell |
| 5,257,847 | A | 11/1993 | Yonehara |
| 5,261,779 | A | 11/1993 | Goodrich |
| 5,280,934 | A | 1/1994 | Monte |
| 5,284,349 | A | 2/1994 | Bruns et al. |
| 5,286,049 | A | 2/1994 | Khan |
| 5,342,073 | A | 8/1994 | Poole |
| 5,358,268 | A | 10/1994 | Hawkins |
| 5,375,864 | A | 12/1994 | McDaniel |
| 5,423,463 | A | 6/1995 | Weeks |
| 5,425,615 | A | 6/1995 | Hall et al. |
| 5,439,342 | A | 8/1995 | Hall et al. |
| 5,462,302 | A | 10/1995 | Leitner |
| 5,478,124 | A | 12/1995 | Warrington |
| 5,498,012 | A | 3/1996 | McDaniel et al. |
| 5,501,475 | A | 3/1996 | Bundy |
| 5,505,476 | A | 4/1996 | Maccabee |
| 5,513,866 | A | 5/1996 | Sisson |
| 5,538,100 | A | 7/1996 | Hedley |
| 5,538,265 | A | 7/1996 | Chen et al. |
| 5,538,269 | A | 7/1996 | McDaniel et al. |
| 5,547,040 | A | 8/1996 | Hanser et al. |
| 5,549,312 | A | 8/1996 | Garvert |
| 5,584,493 | A | 12/1996 | Demski et al. |
| 5,601,300 | A | 2/1997 | Fink et al. |
| 5,624,127 | A | 4/1997 | Arreola et al. |
| 5,697,623 | A | 12/1997 | Bermes et al. |
| 5,697,626 | A | 12/1997 | McDaniel |
| 5,727,840 | A | 3/1998 | Ochiai et al. |
| 5,779,208 | A | 7/1998 | McGraw |
| 5,842,709 | A | 12/1998 | Maccabee |
| 5,876,051 | A | 3/1999 | Sage |
| 5,897,125 | A | 4/1999 | Bundy |
| 5,937,468 | A | 8/1999 | Wiedeck et al. |
| 5,941,342 | A | 8/1999 | Lee |
| 5,957,237 | A | 9/1999 | Tigner |
| 5,980,449 | A | 11/1999 | Benson et al. |
| 5,988,970 | A | 11/1999 | Holtom |
| 6,012,545 | A | 1/2000 | Faleide |
| 6,027,090 | A | 2/2000 | Liu |
| 6,042,052 | A | 3/2000 | Smith et al. |
| 6,055,780 | A | 5/2000 | Yamazaki |
| 6,065,924 | A | 5/2000 | Budd |
| 6,082,693 | A | 7/2000 | Benson et al. |
| 6,082,751 | A | 7/2000 | Hanes et al. |
| 6,112,152 | A | 8/2000 | Tuttle |
| 6,135,472 | A | 10/2000 | Wilson et al. |
| 6,149,172 | A | 11/2000 | Pascoe et al. |
| 6,158,756 | A | 12/2000 | Hansen |
| 6,168,176 | B1 | 1/2001 | Mueller |
| 6,170,842 | B1 | 1/2001 | Mueller |
| 6,179,312 | B1 | 1/2001 | Paschke et al. |
| 6,179,546 | B1 | 1/2001 | Citrowske |
| 6,203,040 | B1 | 3/2001 | Hutchins |
| 6,213,486 | B1 | 4/2001 | Kunz et al. |
| 6,224,317 | B1 | 5/2001 | Kann |
| 6,264,222 | B1 | 7/2001 | Johnston et al. |
| 6,270,099 | B1 | 8/2001 | Farkash |
| 6,325,397 | B1 | 12/2001 | Pascoe |
| 6,352,295 | B1 | 3/2002 | Leitner |
| 6,357,992 | B1 | 3/2002 | Ringdahl et al. |
| 6,375,207 | B1 | 4/2002 | Dean et al. |
| 6,412,799 | B1 | 7/2002 | Schrempf |
| 6,422,342 | B1 | 7/2002 | Armstrong et al. |
| 6,425,572 | B1 | 7/2002 | Lehr |
| 6,430,164 | B1 | 8/2002 | Jones et al. |
| 6,435,534 | B1 | 8/2002 | Stone |
| 6,439,342 | B1 | 8/2002 | Boykin |
| 6,460,915 | B1 | 10/2002 | Bedi et al. |
| 6,471,002 | B1 | 10/2002 | Weinermen |
| 6,511,086 | B2 | 1/2003 | Schlicht |
| 6,511,402 | B2 | 1/2003 | Shu |
| 6,513,821 | B1 | 2/2003 | Heil |
| 6,533,303 | B1 | 3/2003 | Watson |
| 6,536,790 | B1 | 3/2003 | Ojanen |
| 6,588,783 | B2 | 7/2003 | Fichter |
| 6,612,596 | B2 | 9/2003 | Jeon et al. |
| 6,641,158 | B2 | 11/2003 | Leitner |
| 6,659,484 | B2 | 12/2003 | Knodle et al. |
| 6,663,125 | B1 | 12/2003 | Cheng |
| 6,746,033 | B1 | 6/2004 | McDaniel |
| 6,769,704 | B2 | 8/2004 | Cipolla |
| 6,810,995 | B2 | 11/2004 | Warford |
| 6,812,466 | B2 | 11/2004 | O'Connor et al. |
| 6,830,257 | B2 | 12/2004 | Leitner |
| 6,834,875 | B2 * | 12/2004 | Leitner .................. B60R 3/002 280/166 |
| 6,840,526 | B2 | 1/2005 | Anderson et al. |
| 6,874,801 | B2 | 4/2005 | Fichter |
| 6,880,843 | B1 | 4/2005 | Greer, Jr. |
| 6,912,912 | B2 | 7/2005 | Reichinger et al. |
| 6,918,624 | B2 | 7/2005 | Miller et al. |
| 6,926,295 | B2 | 8/2005 | Berkebile et al. |
| 6,938,909 | B2 | 9/2005 | Leitner |
| 6,942,233 | B2 | 9/2005 | Leitner et al. |
| 6,942,272 | B2 | 9/2005 | Livingston |
| 6,948,903 | B2 | 9/2005 | Ablabutyan et al. |
| 6,951,357 | B2 | 10/2005 | Armstrong et al. |
| 6,955,370 | B2 | 10/2005 | Fabiano et al. |
| 6,959,937 | B2 | 11/2005 | Schneider et al. |
| 6,966,597 | B2 | 11/2005 | Tegtmeier |
| 6,971,652 | B2 | 12/2005 | Bobbert et al. |
| 6,997,469 | B2 | 2/2006 | Lanoue et al. |
| 7,000,932 | B2 | 2/2006 | Heil et al. |
| 7,007,961 | B2 | 3/2006 | Leitner |
| 7,017,927 | B2 | 3/2006 | Henderson et al. |
| 7,055,839 | B2 | 6/2006 | Leitner |
| 7,090,276 | B1 | 8/2006 | Bruford et al. |
| 7,111,859 | B2 | 9/2006 | Kim et al. |
| 7,118,120 | B2 | 10/2006 | Lee et al. |
| 7,163,221 | B2 | 1/2007 | Leitner |
| 7,258,386 | B2 | 8/2007 | Leitner |
| 7,287,771 | B2 | 10/2007 | Lee et al. |
| 7,360,779 | B2 | 4/2008 | Crandall |
| 7,367,574 | B2 | 5/2008 | Leitner |
| 7,380,807 | B2 | 6/2008 | Leitner |
| 7,398,985 | B2 | 7/2008 | Leitner et al. |
| 7,413,204 | B2 | 8/2008 | Leitner |
| 7,416,202 | B2 | 8/2008 | Fichter |
| 7,487,986 | B2 | 2/2009 | Leither et al. |
| 7,516,703 | B2 | 4/2009 | Tazreiter |
| 7,566,064 | B2 | 7/2009 | Leitner et al. |
| 7,584,975 | B2 | 9/2009 | Leitner |
| 7,594,672 | B2 | 9/2009 | Piotrowski |
| 7,621,546 | B2 | 11/2009 | Ross et al. |
| 7,637,519 | B2 | 12/2009 | Leitner et al. |
| 7,673,892 | B2 | 3/2010 | Kuntze et al. |
| 7,717,444 | B2 | 5/2010 | Fichter |
| 7,740,261 | B2 | 6/2010 | Leitner et al. |
| 7,793,596 | B2 | 9/2010 | Hirtenlehner |
| 7,823,896 | B2 | 11/2010 | VanBelle |
| 7,874,565 | B2 | 1/2011 | Duncan |
| D634,687 | S | 3/2011 | Vukel |
| 7,900,944 | B2 | 3/2011 | Watson |
| 7,909,344 | B1 | 3/2011 | Bundy |
| 7,934,737 | B2 | 5/2011 | Okada |

(56) References Cited

U.S. PATENT DOCUMENTS

| | | |
|---|---|---|
| 7,976,042 B2 | 7/2011 | Watson et al. |
| 8,038,164 B2 | 10/2011 | Stahl et al. |
| 8,042,821 B2 | 10/2011 | Yang |
| D649,100 S | 11/2011 | Cheng |
| 8,052,162 B2 | 11/2011 | Yang et al. |
| 8,056,913 B2 | 11/2011 | Kuntze et al. |
| 8,070,173 B2 | 12/2011 | Watson |
| 8,136,826 B2 | 3/2012 | Watson |
| 8,146,935 B1 | 4/2012 | Adams |
| 8,157,277 B2 | 4/2012 | Leitner et al. |
| 8,177,247 B1 | 5/2012 | Carr |
| 8,205,901 B2 | 6/2012 | Yang et al. |
| D665,713 S | 8/2012 | Pochurek et al. |
| 8,262,113 B1 | 9/2012 | Chafey et al. |
| 8,297,635 B2 | 10/2012 | Agoncillo et al. |
| D671,874 S | 12/2012 | Kekich et al. |
| 8,342,550 B2 | 1/2013 | Stickles et al. |
| 8,342,551 B2 | 1/2013 | Watson et al. |
| 8,360,455 B2 | 1/2013 | Leitner et al. |
| 8,408,571 B2 | 4/2013 | Leitner et al. |
| 8,419,034 B2 | 4/2013 | Leitner et al. |
| 8,469,380 B2 | 6/2013 | Yang et al. |
| 8,602,431 B1 | 12/2013 | May |
| 8,827,294 B1 | 9/2014 | Leitner et al. |
| 8,833,782 B2 | 9/2014 | Huotari et al. |
| 8,844,957 B2 | 9/2014 | Leitner et al. |
| D720,674 S | 1/2015 | Stanesic et al. |
| 8,936,266 B2 | 1/2015 | Leitner et al. |
| 8,944,451 B2 | 2/2015 | Leitner et al. |
| 9,156,406 B2 | 10/2015 | Stanesic et al. |
| 9,272,667 B2 | 3/2016 | Smith |
| 9,302,626 B2 | 4/2016 | Leitner et al. |
| 9,346,404 B1 | 5/2016 | Bundy |
| 9,346,405 B2 | 5/2016 | Leitner et al. |
| 9,511,717 B2 | 12/2016 | Smith |
| 9,522,634 B1 | 12/2016 | Smith |
| 9,527,449 B2 | 12/2016 | Smith |
| 9,550,458 B2 | 1/2017 | Smith et al. |
| 9,561,751 B2 | 2/2017 | Leitner et al. |
| 9,573,467 B2 | 2/2017 | Chen et al. |
| 9,656,609 B2 | 5/2017 | Du et al. |
| 9,669,766 B2 | 6/2017 | Du et al. |
| 9,669,767 B2 | 6/2017 | Du et al. |
| 9,688,205 B2 | 6/2017 | Du et al. |
| 9,701,249 B2 | 7/2017 | Leitner et al. |
| 9,764,691 B2* | 9/2017 | Stickles ............ B60R 3/02 |
| 9,809,172 B2 | 11/2017 | Stanesic et al. |
| 9,834,147 B2 | 12/2017 | Smith |
| 9,902,328 B1 | 2/2018 | Mazur |
| 9,944,231 B2 | 4/2018 | Leitner et al. |
| 10,053,017 B2 | 8/2018 | Leitner et al. |
| 10,065,486 B2 | 9/2018 | Smith et al. |
| 10,077,016 B2 | 9/2018 | Smith et al. |
| 10,081,302 B1 | 9/2018 | Frederick et al. |
| 10,106,069 B2 | 10/2018 | Rasekhi |
| 10,106,086 B1 | 10/2018 | Eckstein et al. |
| 10,106,087 B2 | 10/2018 | Stojkovic et al. |
| 10,106,088 B2 | 10/2018 | Smith |
| 10,118,557 B2 | 11/2018 | Pribisic |
| 10,124,735 B2 | 11/2018 | Du et al. |
| 10,124,839 B2 | 11/2018 | Povinelli et al. |
| 10,144,345 B2 | 12/2018 | Stinson et al. |
| 10,150,419 B2 | 12/2018 | Derbis et al. |
| 10,155,474 B2 | 12/2018 | Salter et al. |
| 10,173,595 B1 | 1/2019 | Ulrich |
| 10,183,623 B2 | 1/2019 | Kirshnan et al. |
| 10,183,624 B2 | 1/2019 | Leitner et al. |
| 10,189,517 B2 | 1/2019 | Povinelli et al. |
| 10,195,997 B2 | 2/2019 | Smith |
| 10,207,598 B2 | 2/2019 | Reynolds et al. |
| 10,214,963 B2 | 2/2019 | Simula et al. |
| 10,384,614 B1* | 8/2019 | Du ............ B60R 3/002 |
| 10,618,472 B2 | 4/2020 | Du |
| 10,649,483 B2* | 5/2020 | Liu ............ B60R 3/02 |
| 10,682,960 B2 | 6/2020 | Du |
| 10,821,904 B2* | 11/2020 | Du ............ H01H 36/0033 |
| 11,021,108 B2* | 6/2021 | Du ............ B60R 3/002 |
| 2003/0011164 A1 | 1/2003 | Cipolla |
| 2003/0038446 A1 | 2/2003 | Anderson et al. |
| 2003/0090081 A1 | 5/2003 | Oakley |
| 2003/0094781 A1 | 5/2003 | Jaramillo et al. |
| 2003/0132595 A1 | 7/2003 | Fabiano |
| 2003/0200700 A1 | 10/2003 | Leitner |
| 2004/0100063 A1 | 5/2004 | Henderson et al. |
| 2004/0108678 A1 | 6/2004 | Berkebile et al. |
| 2004/0135339 A1 | 7/2004 | Kim |
| 2005/0035568 A1 | 2/2005 | Lee et al. |
| 2005/0146157 A1 | 7/2005 | Leitner |
| 2005/0231149 A1 | 10/2005 | Numauchi |
| 2005/0280242 A1 | 12/2005 | Fabiano et al. |
| 2006/0082096 A1 | 4/2006 | Sukonthapanich et al. |
| 2006/0214386 A1 | 9/2006 | Watson |
| 2006/0219484 A1 | 10/2006 | Ogura |
| 2006/0284440 A1 | 12/2006 | Leitner |
| 2008/0042396 A1 | 2/2008 | Watson |
| 2008/0100023 A1 | 5/2008 | Ross |
| 2008/0100025 A1 | 5/2008 | Leitner et al. |
| 2008/0116653 A1 | 5/2008 | Piotrowski |
| 2008/0271936 A1 | 11/2008 | Kuntze et al. |
| 2009/0250896 A1 | 10/2009 | Watson |
| 2009/0295114 A1 | 12/2009 | Yang et al. |
| 2010/0044993 A1 | 2/2010 | Watson |
| 2011/0115187 A1 | 5/2011 | Leitner et al. |
| 2012/0025485 A1 | 2/2012 | Yang et al. |
| 2012/0046846 A1 | 2/2012 | Dollens |
| 2013/0154230 A1 | 6/2013 | Ziaylek |
| 2015/0097353 A1 | 4/2015 | Rasmussen et al. |
| 2015/0197199 A1 | 7/2015 | Kuo |
| 2015/0321612 A1 | 11/2015 | Leitner et al. |
| 2015/0321613 A1 | 11/2015 | Leitner et al. |
| 2016/0039346 A1 | 2/2016 | Yang et al. |
| 2016/0193964 A1 | 7/2016 | Stanesic et al. |
| 2017/0008459 A1 | 1/2017 | Leitner et al. |
| 2017/0036607 A1 | 2/2017 | Du et al. |
| 2017/0144606 A1 | 5/2017 | Smith |
| 2017/0190308 A1 | 6/2017 | Smith |
| 2017/0246993 A1 | 8/2017 | Smith |
| 2017/0267182 A1 | 9/2017 | Leitner |
| 2017/0355315 A1 | 12/2017 | Leitner |
| 2018/0118530 A1 | 5/2018 | August |
| 2018/0141497 A1 | 5/2018 | Smith |
| 2018/0201194 A1 | 7/2018 | Stanesic |
| 2018/0257572 A1 | 9/2018 | Du et al. |
| 2018/0281687 A1 | 10/2018 | Derbis et al. |
| 2018/0326911 A1 | 11/2018 | Leitner |
| 2019/0009725 A1 | 1/2019 | Stojkovic et al. |
| 2019/0047477 A1 | 2/2019 | Crandall |
| 2019/0054961 A1 | 2/2019 | Ngo |
| 2019/0071021 A1 | 3/2019 | Pribisic |
| 2019/0071042 A1 | 3/2019 | Smith |
| 2019/0084482 A1 | 3/2019 | Long et al. |
| 2019/0084628 A1 | 3/2019 | Povinelli et al. |
| 2019/0292026 A1 | 9/2019 | Felps |
| 2020/0023779 A1 | 1/2020 | Du et al. |
| 2020/0047674 A1 | 2/2020 | Du et al. |
| 2020/0262354 A1 | 8/2020 | Du et al. |
| 2020/0265658 A1 | 8/2020 | Du et al. |
| 2020/0269763 A1 | 8/2020 | Du et al. |
| 2020/0277169 A1 | 9/2020 | Zhan |
| 2020/0282913 A1 | 9/2020 | Qing |
| 2020/0290424 A1 | 9/2020 | Zhan |
| 2020/0299116 A1 | 9/2020 | Fan |
| 2020/0282914 A1 | 10/2020 | Du et al. |
| 2020/0331396 A1 | 10/2020 | Du et al. |

FOREIGN PATENT DOCUMENTS

| | | |
|---|---|---|
| CA | 2218280 A1 | 6/1999 |
| CA | 2332193 A1 | 9/2001 |
| CA | 2370618 A1 | 11/2007 |
| CN | 2174368 Y | 8/1994 |
| CN | 2806241 Y | 8/2006 |
| CN | 1976833 A | 6/2007 |
| CN | 101279594 A | 10/2008 |

(56) References Cited

FOREIGN PATENT DOCUMENTS

| | | |
|---|---|---|
| CN | 102394918 A | 3/2012 |
| CN | 202806579 U | 3/2013 |
| CN | 103507719 A | 1/2014 |
| CN | 203728468 U | 7/2014 |
| CN | 104192070 A | 12/2014 |
| CN | 2044474223 U | 7/2015 |
| CN | 105083136 A | 11/2015 |
| CN | 105083137 A | 11/2015 |
| CN | 105128751 A | 12/2015 |
| CN | 105450762 A | 3/2016 |
| CN | 106249641 A | 12/2016 |
| CN | 106499293 A | 3/2017 |
| CN | 107601333 A | 1/2018 |
| CN | 207361653 U | 5/2018 |
| CN | 108263303 A | 7/2018 |
| CN | 108454518 A | 8/2018 |
| CN | 207758678 U | 8/2018 |
| CN | 108583446 A | 9/2018 |
| CN | 108632335 A | 10/2018 |
| CN | 108791086 A | 11/2018 |
| CN | 208037900 U | 11/2018 |
| CN | 108973868 A | 12/2018 |
| CN | 208232903 U | 12/2018 |
| CN | 109253888 A | 1/2019 |
| CN | 208325054 U | 1/2019 |
| CN | 208344082 U | 1/2019 |
| CN | 208532082 U | 2/2019 |
| DE | 1042403 B | 10/1958 |
| DE | 1220276 B | 6/1966 |
| DE | 2555468 A1 | 6/1977 |
| DE | 7922488 U1 | 7/1982 |
| DE | 3151621 A1 | 7/1983 |
| DE | 3932142 | 4/1990 |
| DE | 8910933 U1 | 10/1990 |
| EP | 0066493 | 12/1982 |
| EP | 373842 A1 | 6/1990 |
| EP | 0418615 A1 | 3/1991 |
| EP | 0559624 B1 | 8/1995 |
| EP | 0966367 A1 | 9/1998 |
| EP | 0901783 A2 | 3/1999 |
| EP | 1116840 A2 | 7/2001 |
| EP | 1213185 B1 | 12/2004 |
| EP | 3002157 | 4/2016 |
| EP | 3176038 B1 | 1/2019 |
| EP | 3237254 B1 | 2/2019 |
| FR | 1271901 A | 9/1961 |
| FR | 1350593 A | 12/1963 |
| FR | 2225612 A | 8/1974 |
| FR | 2651739 A1 | 3/1991 |
| FR | 2764254 A1 | 12/1998 |
| GB | 191315077 | 8/1913 |
| GB | 254426 | 7/1926 |
| GB | 340162 A | 12/1930 |
| GB | 381672 | 10/1932 |
| GB | 745918 | 3/1956 |
| GB | 934387 | 8/1963 |
| GB | 936846 | 9/1963 |
| GB | 987846 A | 3/1965 |
| GB | 1430813 A | 4/1976 |
| GB | 1471256 A | 4/1977 |
| GB | 2045699 A | 11/1980 |
| GB | 2055705 A | 3/1981 |
| GB | 2129378 | 5/1984 |
| GB | 2201511 A | 9/1988 |
| GB | 2288014 A | 10/1995 |
| IN | 201741011829 | 10/2018 |
| JP | 63-255144 A | 10/1988 |
| JP | H04138944 A | 5/1992 |
| JP | H04339040 A | 11/1992 |
| JP | H04342629 A | 11/1992 |
| JP | H05310061 A | 11/1993 |
| JP | H05310081 A | 11/1993 |
| JP | H08132967 A | 5/1996 |
| JP | H10287182 A | 10/1998 |
| JP | 2018-177089 A | 11/2018 |
| JP | 2019-001222 A | 1/2019 |
| KR | 2000-0003099 | 2/2000 |
| KR | 101719102 B1 | 3/2017 |
| MX | 2017001699 A | 8/2018 |
| MX | 2017001700 A | 8/2018 |
| MX | 2017006328 A | 8/2018 |
| MX | 2017008032 A | 9/2018 |
| MX | 2017010183 A | 9/2018 |
| SU | 403594 | 11/1973 |
| SU | 783097 A1 | 11/1980 |
| WO | 1988/05759 A1 | 8/1988 |
| WO | 1995/00359 A1 | 1/1995 |
| WO | 1997/027139 A1 | 7/1997 |
| WO | 1998/43856 A2 | 10/1998 |
| WO | 2000/047449 A1 | 8/2000 |
| WO | 2001/000441 A1 | 1/2001 |
| WO | 2003/039910 A1 | 5/2003 |
| WO | 2003/039920 A1 | 5/2003 |
| WO | 2003/066380 A1 | 8/2003 |
| WO | 2003/069294 A1 | 8/2003 |
| WO | 2006/050297 A2 | 5/2006 |
| WO | 2009/103163 A1 | 8/2009 |
| WO | 2017/176226 A1 | 10/2017 |
| WO | 2018/148643 A1 | 8/2018 |
| WO | 2018/197393 A1 | 11/2018 |
| WO | 2019/009131 A1 | 1/2019 |
| WO | 2019/034493 A1 | 2/2019 |

OTHER PUBLICATIONS

U.S. Office Action dated Nov. 18, 2019 for U.S. Appl. No. 16/510,775, filed Jul. 12, 2019. (9 pages).
U.S. Office Action dated Dec. 20, 2019 for U.S. Appl. No. 16/655,149, filed Oct. 16, 2019. (11 pages).
International Search Report of the International Searching Authority for PCT International Application No. PCT/CN2019/077842 dated Oct. 12, 2019. (English Translation, p. 1-20).
International Search Report and Written Opinion of the International Searching Authority for PCT International Application No. PCT/CN2019/082919 dated Oct. 11, 2019. (English Translation, p. 1-20).
U.S. Office Action dated Jun. 9, 2020 for U.S. Appl. No. 16/826,094, filed Mar. 20, 2020 (10 pages).
U.S. Office Action dated Jun. 9, 2020 for U.S. Appl. No. 15/931,474, filed May 13, 2020 (12 pages).
U.S. Notice of Allowance for U.S. Appl. No. 16/510,775 dated Feb. 3, 2020.
U.S. Notice of Allowance for U.S. Appl. No. 16/655,149 dated Feb. 20, 2020.
U.S. Notice of Allowance for U.S. Appl. No. 16/826,083 dated Oct. 9, 2020.
Australian Application No. 2019250149 Office Action dated Oct. 6, 2020, pp. 1-4).
Final Office Action dated Oct. 27, 2020 for U.S. Appl. No. 15/931,474, filed Oct. 27, 2020 (13 pages).
Final Office Action dated Feb. 16, 2021 for U.S. Appl. No. 16/826,094, filed Mar. 20, 2020 (15 pages).
U.S. Appl. No. 16/742,632 Notice of Allowance dated Jun. 29, 2021, pp. 1-7.
Chinese Application No. 201910125764.6 Office Action dated May 6, 2021, pp. 1-13.

* cited by examiner

VEHICLE RUNNING BOARD APPARATUS AND RETRACTABLE DEVICE THEREOF

CROSS-REFERENCE TO RELATED APPLICATIONS

This patent application is a continuation-in-part of and claims priority to U.S. patent application Ser. No. 16/199,517, filed on Nov. 26, 2018, which claims priority to and benefits of Chinese Patent Application Serial No. 201810805743.4, filed with the State Intellectual Property Office of P.R. China on Jul. 20, 2018, and Chinese Patent Application Serial No. 201821161957.4, filed with the State Intellectual Property Office of P.R. China on Jul. 20, 2018. This patent application also claims priority to and benefits of Chinese Patent Application Serial No. 201910304218.9, filed with the State Intellectual Property Office of P.R. China on Apr. 16, 2019, Chinse Patent Application Serial No. 201920517260.4, filed with the State Intellectual Property Office of P.R. China on Apr. 16, 2019, Chinese Patent Application Serial No. 201920229788.1, filed with the State Intellectual Property Office of P.R. China on Feb. 22, 2019, and Chinese Patent Application Serial No. 201910132865.6, filed with the State Intellectual Property Office of P.R. China on Feb. 22, 2019. The entire contents of the before-mentioned patent applications are incorporated by reference as part of the disclosure of this patent application.

FIELD

The present disclosure relates to a technical field of vehicles, and more particularly to a vehicle running board apparatus and a retractable device thereof.

BACKGROUND

Normally, a vehicle footboard is provided to a chassis under a door (for example, a side door and/or a back door) of a vehicle for a passenger to get into or out of the vehicle. The vehicle footboard is driven by a retractable device and moves between an extended position and a retracted position. The retractable device is connected to the chassis of the vehicle. Generally, the retractable device includes a running board holder configured to mount a running board and an arm assembly configured to drive the running board holder to move. In the related art, the running board holder of the retractable device has a low strength and is liable to be damaged, for example as foreign matters like mud and sand can enter a fitting position between the arm assembly and the running board holder easily, consequently, the retractable device has poor force equilibrium and reduced stability, and the service life of the arm assembly and the running board holder is lowered as they experience heavy wear and tear.

SUMMARY

The present disclosure is made based on the following facts and problems in the related art discovered by inventors of the present disclosure.

In the related art, each arm in the arm assembly usually includes a pair of parallel plates or rods connected at two sides of the running board holder. The arm assembly in such a structure has disadvantages like a low strength, a large number of parts and a complicated processing procedure. In addition, the related art also proposes that the running board holder is provided with grooves, end portions of arms in the arm assembly are fitted in the grooves for a connection to the running board holder. However, the inventors of the present disclosure note that since a running board is mounted to the running board holder, the running board holder bears great forces when a person gets into or out of the vehicle through the running board. Disposing grooves in the running board holder reduces the strength of the running board holder, thus the running board holder is easily to be damaged and the retractable device has poor operational stability.

The present disclosure aims to solve at least one of the technical problems in the related art to a certain extent.

To this end, embodiments of an aspect of the present disclosure provide a retractable device for a vehicle running board apparatus. The retractable device has a high strength, a long service life and an enhanced operational stability.

Embodiments of another aspect of the present disclosure further provide a vehicle running board apparatus having the above-identified retractable device.

Embodiments of yet another aspect of the present disclosure further provide a drive assembly for a vehicle running board.

Embodiments of still yet another aspect of the present disclosure further provide a running board assembly for a vehicle.

The retractable device for the vehicle running board apparatus according to some embodiments of an aspect of the present disclosure includes: a running board holder having a connecting portion; and an arm assembly configured to drive the running board holder to move between an extended position and a retracted position. The arm assembly includes a first arm and a second arm. The first arm has a first end and a second end, and the second end of the first arm is pivotally connected to the connecting portion of the running board holder. The second arm has a first end and a second end, and the second end of the second arm is pivotally connected to the connecting portion of the running board holder. The second end of at least one of the first arm or the second arm straddles the connecting portion.

The retractable device for the vehicle running board apparatus according to some embodiments of the present disclosure does not provide grooves in the running board holder. By making the first arm and/or the second arm of the arm assembly straddle the connecting portion of the running board holder, the strength and service life of the running board holder are prolonged and the operational stability of the retractable device is improved.

The vehicle running board apparatus according to some embodiments of another aspect of the present disclosure includes: a retractable device according to any one of the above embodiments; and a footboard mounted to the running board holder.

The drive assembly for the vehicle running board according to some embodiments of yet another aspect of the present disclosure includes a mounting base; a running board base movable between an extended position and a retracted position and including a third main body and a third hinged portion connected to the third main body; a first connecting portion rotatably connected to the mounting base and the running board base respectively, the first connecting portion including a first main body and a plurality of first hinged portions spaced apart from each other and connected to the first main body, and the third hinged portion being rotatably connected between adjacent first hinged portions; and a second connecting portion rotatably connected to the mounting base and the running board base respectively, the second connecting portion including a second main body and a plurality of second hinged portions spaced apart from each other and connected to the second main body, and the third hinged portion being rotatably connected between adjacent second hinged portions.

The running board assembly for the vehicle according to some embodiments of still yet another aspect of the present disclosure includes a running board; a drive assembly, the drive assembly being a drive assembly for a vehicle running board according to any one of the above embodiments, the running board being mounted to the running board base, and the drive assembly being connected to one of the running board and the running board base; and a driving member connected to the first connecting portion to drive the first connecting portion to rotate with respect to the mounting base.

DETAILED DESCRIPTION

Figure 1:
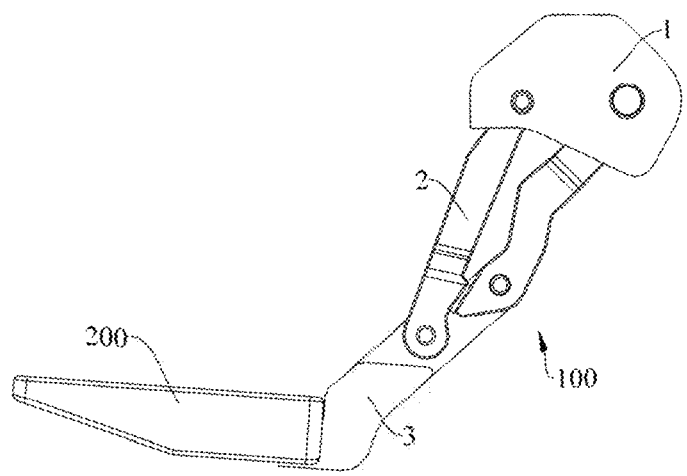
FIG. 1 is a perspective view of a vehicle running board apparatus according to an example embodiment of the present disclosure, in which a footboard is in an extended position.

Embodiments of the present disclosure are described below in detail and examples of the embodiments are shown in accompanying drawings. The embodiments described below with reference to the accompanying drawings are exemplary, are merely used to explain the present disclosure, and cannot be construed as a limit to the present disclosure. In the description of the present disclosure, it is to be understood that, terms such as "center", "longitudinal", "lateral", "length", "width", "thickness", "upper", "lower", "front", "back", "left", "right", "vertical", "horizontal", "top", "bottom", "inner", "outer", "clockwise", "anti-clockwise", "axial", "radial" and "circumferential" refer to the directions and location relations which are the directions and location relations shown in the drawings, and for describing the present disclosure and for describing in simple, and which are not intended to indicate or imply that the device or the elements are disposed to locate at the specific directions or are structured and operated in the specific directions, which could not to be understood to the limitation of the present disclosure, unless specified otherwise.

A vehicle running board apparatus and a retractable device thereof according to embodiments of the present disclosure will be described below with reference to FIGS. 1 to 16.

Figure 2:
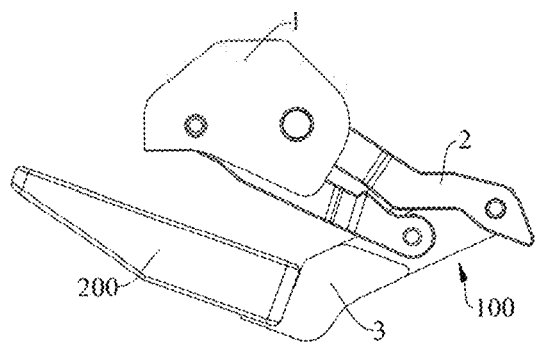
FIG. 2 is a perspective view of a vehicle running board apparatus according to an example embodiment of the present disclosure, in which a footboard is in a retracted position.
Figure 3:
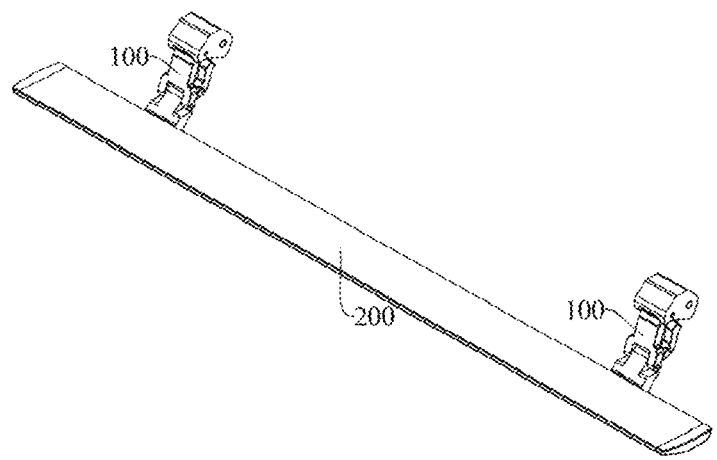
FIG. 3 is a perspective view of a vehicle running board apparatus according to an example embodiment of the present disclosure, in which a footboard is mounted to running board holders of two retractable devices and the footboard is in an extended position.
Figure 4:
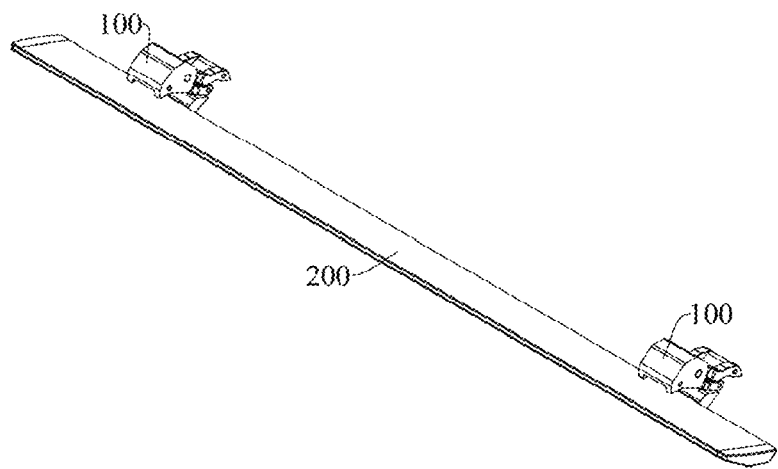
FIG. 4 is a perspective view of a vehicle running board apparatus according to an example embodiment of the present disclosure, in which a footboard is mounted to running board holders of two retractable devices and the footboard is in a retracted position.

As illustrated in FIGS. 1 to 4, the vehicle running board apparatus according to some embodiments of the present disclosure includes a retractable device 100 and a footboard 200. In embodiments of the present disclosure, the footboard is also called the running board and the retractable device is also called the drive assembly, e.g., a drive assembly for a vehicle running board. The retractable device 100 is connected to the footboard 200 to drive the footboard 200 to move between an extended position and a retracted position. For example, FIG. 1 and FIG. 3 illustrate that the retractable device 100 is stretched out to place the footboard 200 in the extended position. FIG. 2 and FIG. 4 illustrate that the retractable device 100 is retracted to place the footboard 200 in the retracted position. In the description of embodiments of the present disclosure, the vehicle running board apparatus is also called the running board assembly, e.g., a running board assembly for a vehicle.

In embodiments of the present disclosure, one footboard 200 may be driven by one or a plurality of retractable devices 100. In the description of the present disclosure, the term "a plurality of" refers to at least two, for example, two, three, etc., unless specifically defined otherwise.

As illustrated in FIG. 3 and FIG. 4, two retractable devices 100 drive one footboard 200. The two retractable devices 100 are spaced apart from each other along a length direction of the footboard 200. FIG. 3 illustrates that the two retractable devices 100 are stretched out simultaneously to place the footboard 200 in the extended position. FIG. 4 illustrates that the two retractable devices 100 are retracted simultaneously to place the footboard 200 in the retracted position.

The retractable device 100 may be driven by a driving member to move the footboard 200 between the extended position and the retracted position. For example, the driving member may be an electric motor.

Hereinafter, the retractable device according to some embodiments of the present disclosure will be described.

As illustrated in FIGS. 5 to 16, the retractable device 100 according to some embodiments of the present disclosure includes an arm assembly 2 and a running board holder 3, and the footboard 200 is mounted to the running board holder 3. The running board holder 3 has a connecting portion 31. The arm assembly 2 is connected to the running board holder 3 so as to drive the running board holder 3 to move between the extended position and the retracted position. In the description of embodiments of the present disclosure, the running board holder is also called the running board base, and the connecting portion is also called the third hinged portion.

Figure 5:
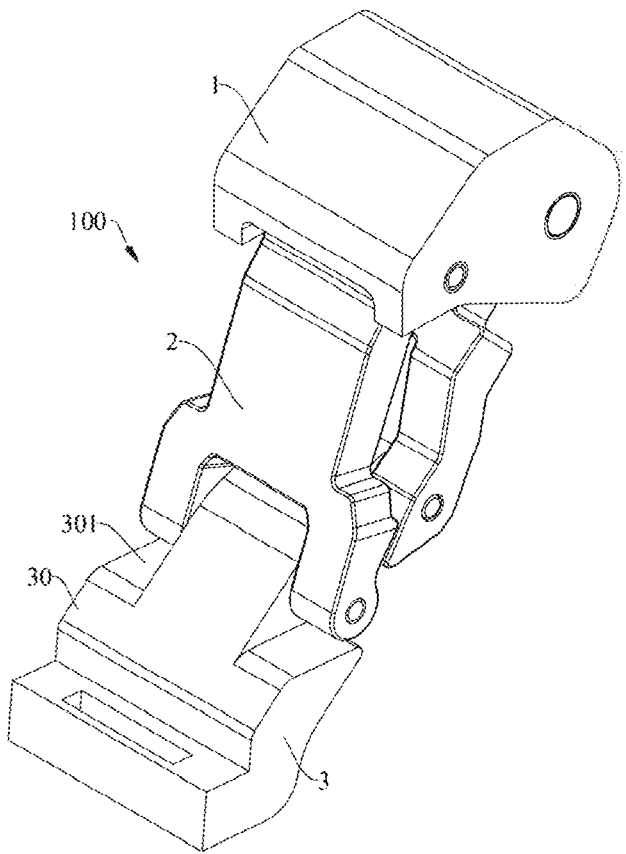
FIG. 5 is a perspective view of a retractable device according to an example embodiment of the present disclosure, in which a running board holder is in an extended position.
Figure 6:
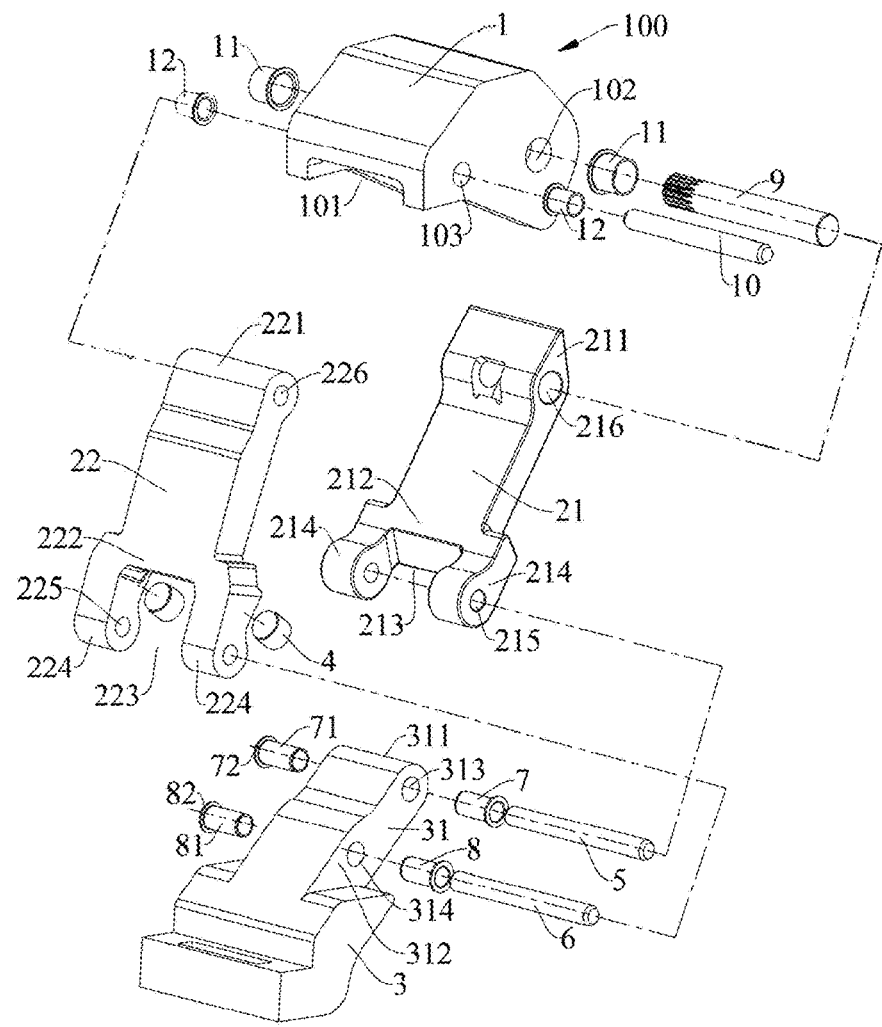
FIG. 6 is an exploded view of the retractable device as shown in FIG. 5.
Figure 7:
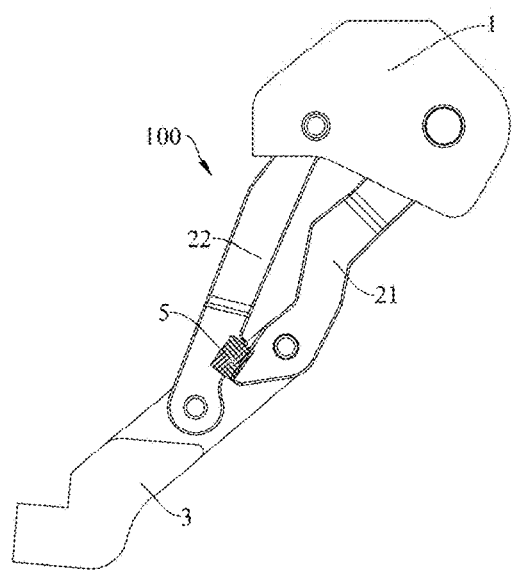
FIG. 7 is a side view of the retractable device as shown in FIG. 5, in which a position of a cushioning member is illustrated.
Figure 8:
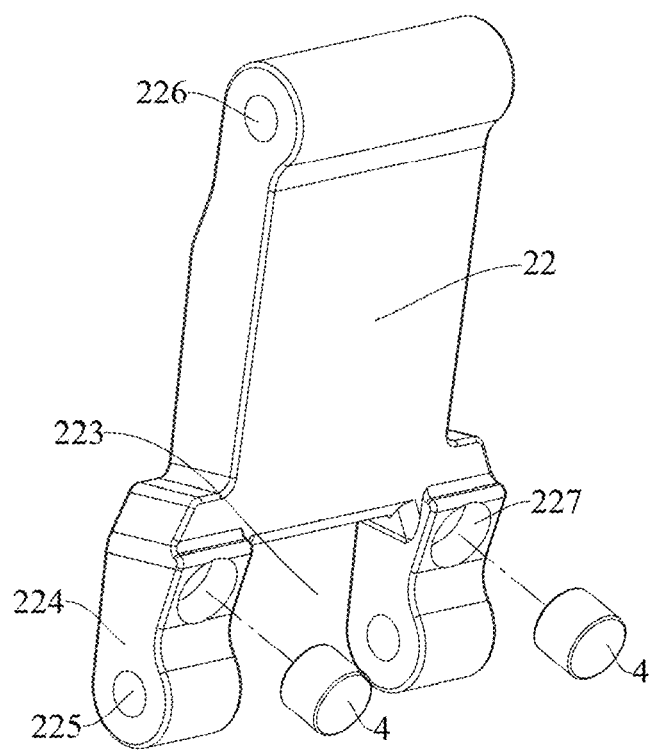
FIG. 8 is a schematic view of a second arm and the cushioning member of the retractable device as shown in FIG. 5.

The arm assembly 2 includes a first arm 21 and a second arm 22. The first arm 21 has a first end 211 and a second end 212. The second end 212 of the first arm 21 is pivotally connected to the connecting portion 31 of the running board holder 3. The second arm 22 has a first end 221 and a second end 222. The second end 222 of the second arm 22 is pivotally connected to the connecting portion 31 of the running board holder 3. The second end of at least one of the first arm 21 or the second arm 22 straddles the connecting portion 31 of the running board holder 3. In other words, one of the second end 212 of the first arm 21 and the second end 222 of the second arm 22 straddles the connecting portion 31. Alternatively, as illustrated in FIG. 5 and FIG. 6, both the second end 212 of the first arm 21 and the second end 222 of the second arm 22 straddle the connecting portion 31. In other words, one of the first arm 21 and the second arm 22 forms a first connecting portion, and the other one of the first arm 21 and the second arm 22 forms a second connecting portion.

It is to be understood herein that the term "straddle" indicates that the second end of the first arm 21 and/or the second arm 22 is to the connecting portion 31 what a person is to a horse when riding. In other words, the second end of the first arm 21 and/or the second arm 22 has two legs, one of which is located at a first side of the connecting portion 31 and the other located at a second side of the connecting portion 31, such that a part of the connecting portion 31 is sandwiched between the two legs.

In the description of the present disclosure, terms "first" and "second" are merely used for purpose of description and cannot be construed as indicating or implying relative importance.

For the retractable device according to embodiments of the present disclosure, the first arm 21 and/or the second arm 22 of the arm assembly 2 straddles the connecting portion 31 of the running board holder 3, in which way the running board holder 3 does not need a groove fitted with the first arm 21 and/or the second arm 22. In this manner, the strength of the running board holder 3 bearing a great force is enhanced, and the operational stability of the retractable device is improved. Furthermore, compared with the solution of providing the groove fitted with the first arm 21 and/or the second arm 22 in the running board holder 3, the solution where the first arm 21 and/or the second arm 22 straddles the connecting portion 31 enables the first arm 21 and/or the second arm 22 to be designed to have a wider width, thereby improving the overall strength and stability of the structure.

In some embodiments, the second end of at least one of the first arm 21 or the second arm 22 has two lugs spaced apart from each other. The two lugs are respectively located at two sides of the connecting portion 31, and the connecting portion 31 is pivotally connected to the lugs. In this manner, the second end of at least one of the first arm 21 or the second arm 22 straddles the connecting portion 31.

Figure 10:
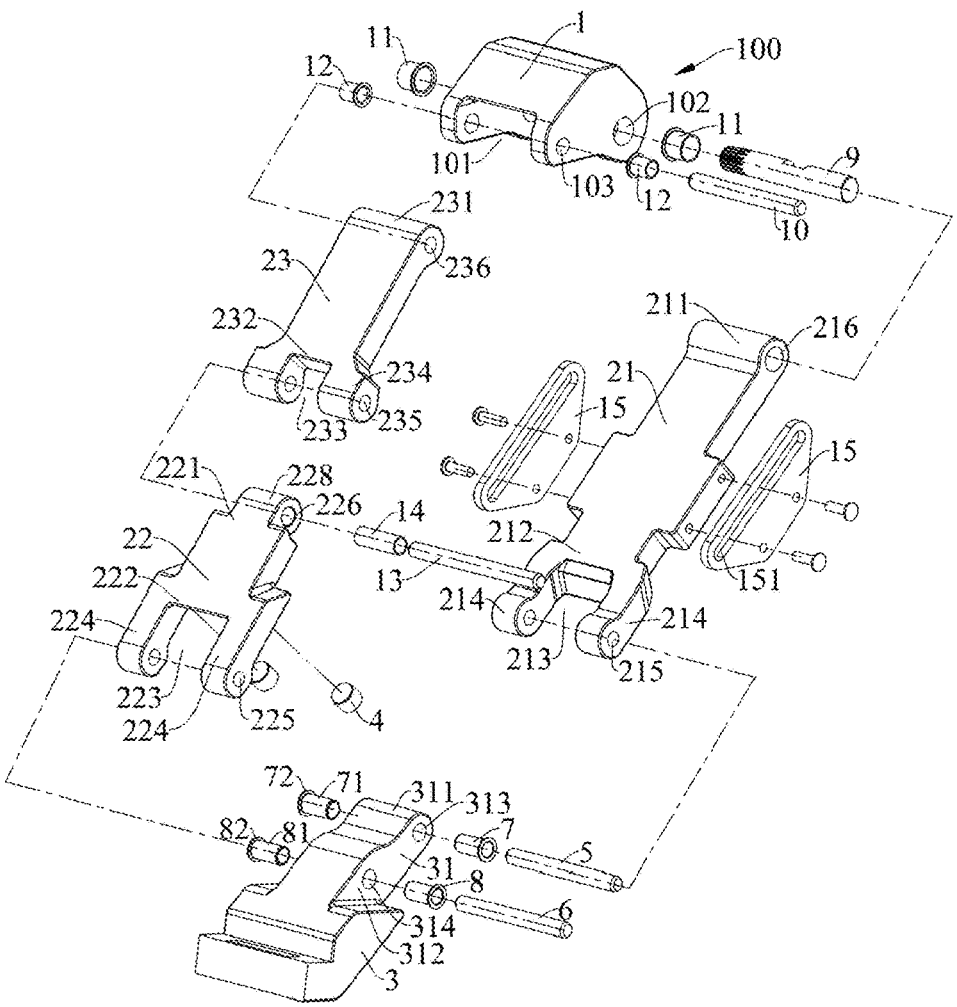
FIG. 10 is an exploded view of the retractable device as shown in FIG. 9.
Figure 11:
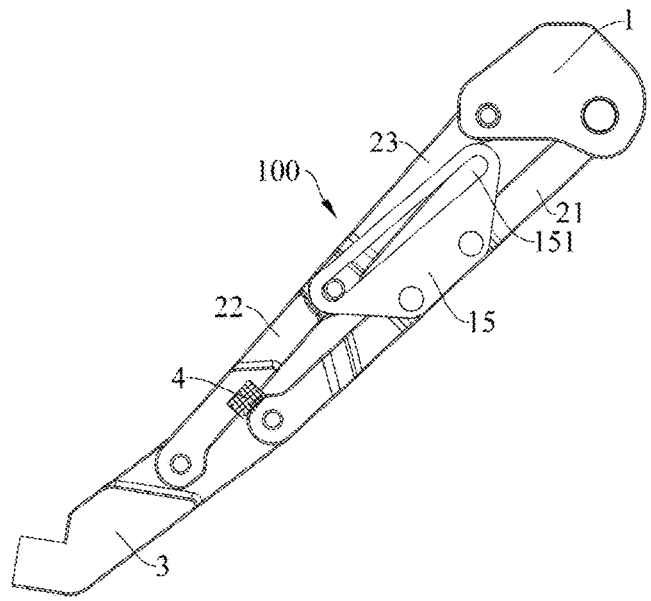
FIG. 11 is a side view of the retractable device as shown in FIG. 9, in which a cushioning member is illustrated.
Figure 12:
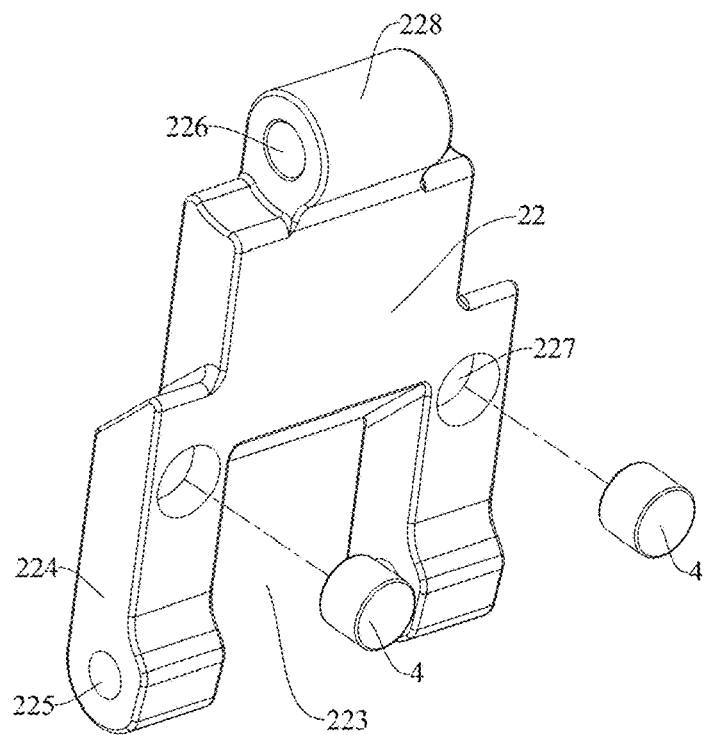
FIG. 12 is a schematic view of a second arm and the cushioning member of the retractable device as shown in FIG. 9.
Figure 13:
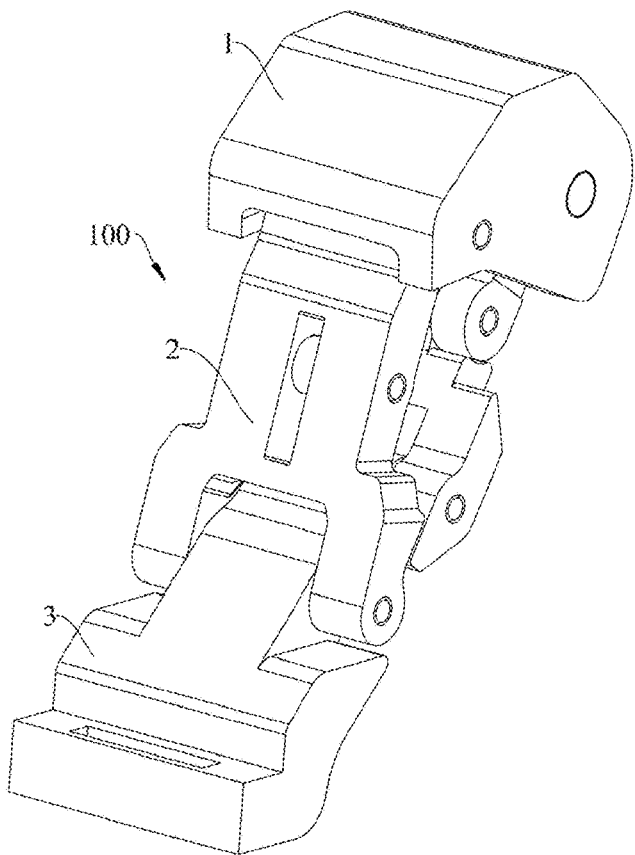
FIG. 13 is a perspective view of a retractable device according to yet another example embodiment of the present disclosure, in which a running board holder is in an extended position.
Figure 14:
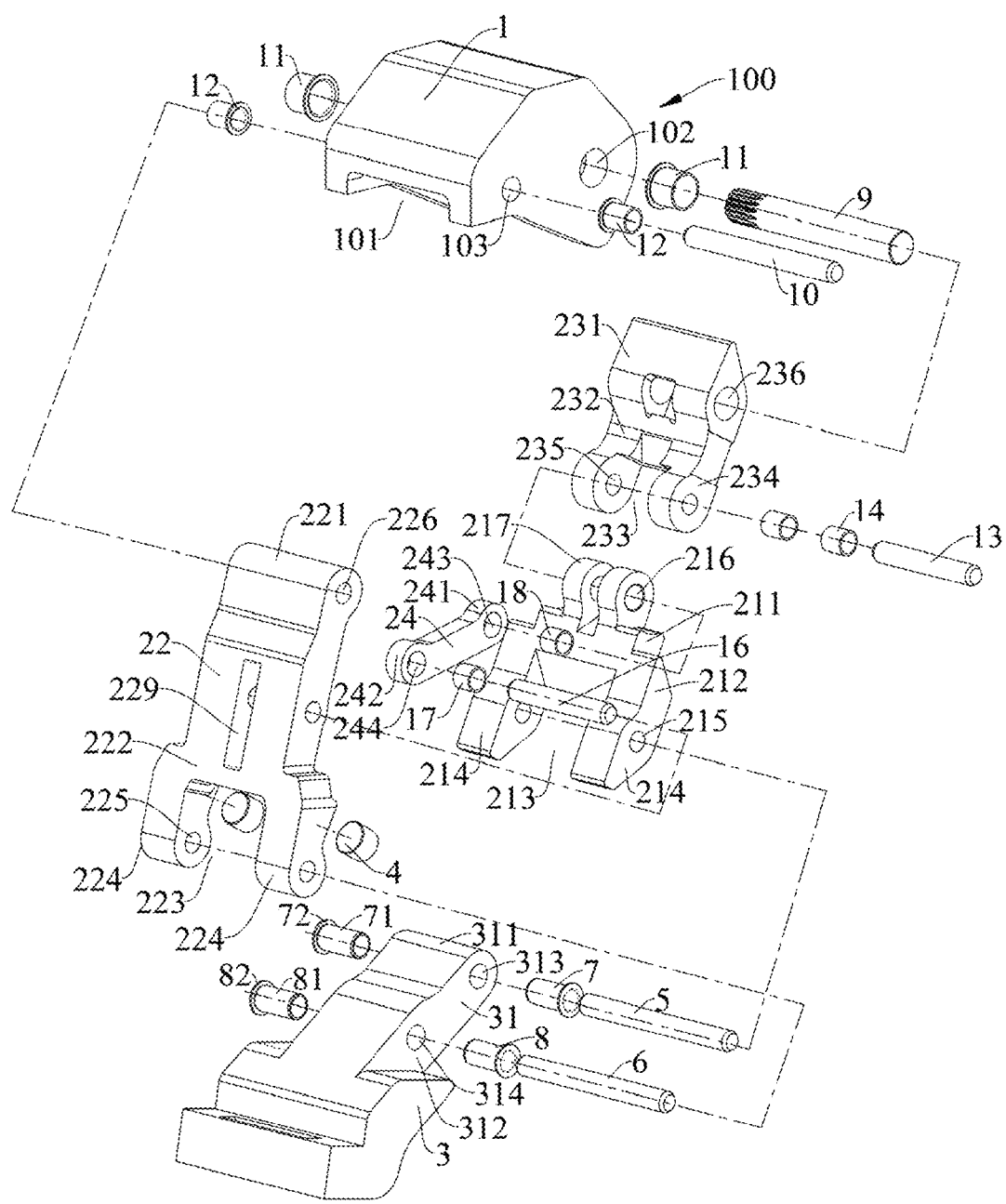
FIG. 14 is an exploded view of the retractable device as shown in FIG. 13.
Figure 15:
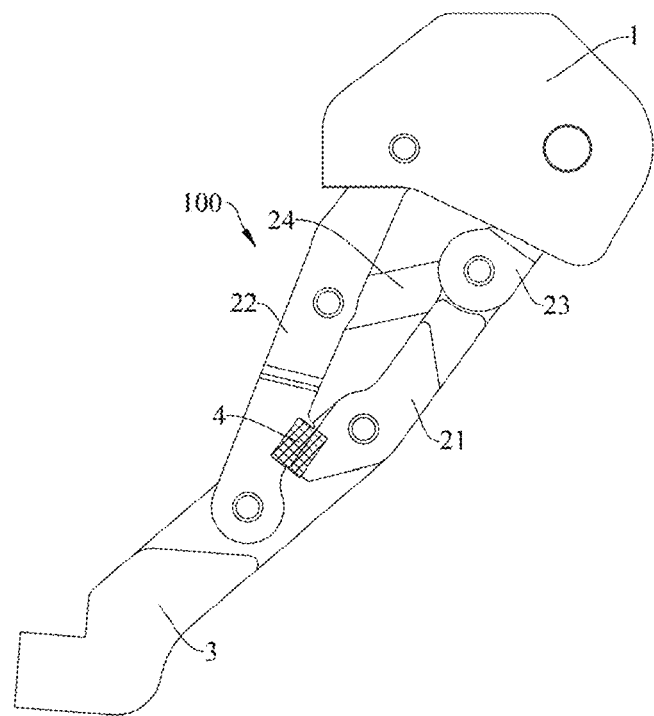
FIG. 15 is a side view of the retractable device as shown in FIG. 13, in which a position of a cushioning member is illustrated.

As illustrated in FIG. 5, FIG. 10 and FIG. 14, in some embodiments, the second end 212 of the first arm 21 has two first lugs 214, a first engagement groove 213 is defined between the two first lugs 214 and a first part of the connecting portion 31 is fitted in the first engagement groove 213. In other words, the two first lugs 214 are respectively located at the two sides of the connecting portion 31, and the connecting portion 31 is pivotally connected to the two first lugs 214. The second end 222 of the second arm 22 has two second lugs 224, a second engagement groove 223 is defined between the two second lugs 224, and a second part of the connecting portion 31 is fitted in the engagement groove 223. In other words, the two second lugs 224 are respectively located at the two sides of the connecting portion 31, and the connecting portion 31 is pivotally connected to the two second lugs 224.

In other words, the first connecting portion includes a first main body and a plurality of first hinged portions spaced apart from each other and connected to the first main body. The third hinged portion 31 of the running board base 3 is rotatably connected between adjacent first hinged portions. The second connecting portion includes a second main body and a plurality of second hinged portions spaced apart from each other and connected to the second main body. The third hinged portion 31 of the running board base 3 is rotatably connected between adjacent second hinged portions.

In example embodiments illustrated in FIG. 5 and FIG. 6, the first arm 21 forms the second connecting portion. The first lug 214 forms the second hinged portion, and two second hinged portions are provided. The third hinged portion 31 of the running board base 3 is movably connected between the two second hinged portions. An end of the first main body is pivotally connected to a mounting bracket (which is also called a mounting base in the description of the embodiments of the present disclosure) 1. The second arm 22 forms the first connecting portion. The second lug 224 forms the first hinged portion, and two first hinged portions are provided. The third hinged portion 31 of the running board base 3 is rotatably connected between the two first hinged portions. The mounting base 1, the first connecting portion 22, the second connecting portion 21 and the running board base 3 constitute a linkage mechanism.

In some embodiments, the second end 212 of the first arm 21 is pivotally connected to a free end (the first part) 311 of the connecting portion 31, and the second end 222 of the second arm 22 is pivotally connected to a middle part (the second part) 312 of the connecting portion 31. Here it is to be understood that the connecting portion 31 extends outwardly from a base body of the running board holder 3. The connecting portion 31 has a connecting end connected to the base body and the free end 311 away from the base body. The middle part 312 of the connecting portion 31 is between the connecting end and the free end 311.

In some embodiments, the connecting portion 31 has a first pin hole 313, the first lug 214 has a first lug hole 215, and the connecting portion 31 is pivotally connected to the first lug 214 through a first pin shaft 5 rotatably fitted in the first pin hole 313 and the first lug hole 215. The connecting portion 31 has a second pin hole 314, the second lug 224 has a second lug hole 225, and the connecting portion 31 is pivotally connected to the second lug 224 through a second pin shaft 6 rotatably fitted in the second pin hole 314 and the second lug hole 225.

The first pin shaft 5 may form an interference fit, e.g., a tight fit, with the first lug hole 215, and the second pin shaft 6 may form an interference fit with the second lug hole 225, which prevents foreign matters like mud and sand from entering a region between the first arm 21 and the running board holder 3 and between the second arm 22 and the running board holder 3, thereby mitigating the wear of the first arm 21, the second arm 22 and the running board holder 3 and improving the operational stability of the retractable device 100. In other words, the first pin shaft 5 does not rotate with respect to the first lug 214 and rotates with respect to the first pin hole 313.

Specifically, each of the two first lugs 214 has the first lug hole 215, and the first lug hole 215 penetrates through the first lug 214. The first pin hole 313 penetrates through the connecting portion 31. The first pin shaft 5 may sequentially pass through one first lug hole 215, the first pin hole 313 and the other lug hole 215 to realize a pivotal connection between the connecting portion 31 and the first lug 214. Similarly, each of the second lugs 224 has the second lug hole 225. The second pin shaft 6 may sequentially pass through one second lug hole 225, the second pin hole 314 and the other second lug hole 225 to realize a pivotal connection between the connecting portion 31 and the second lug 224. Advantageously, two ends of the first pin shaft 5 are tightly fitted in the first lug hole 215 and two ends of the second pin shaft 6 are tightly fitted in the second lug hole 225.

In some embodiments, the retractable device 100 further includes a first bushing 7 and a second bushing 8. The first bushing 7 is tightly fitted in the first pin hole 313, and the first pin shaft 5 is rotatably fitted in the first bushing 7. The second bushing 8 is tightly fitted in the second pin hole 314, and the second pin shaft 6 is rotatably fitted in the second bushing 8. In other words, the first bushing 7 does not rotate with respect to the first pin hole 313, the first pin shaft 5 does not rotate with respect to the first lug 214, the second bushing 8 does not rotate with respect to the second pin hole 314, and the second pin shaft 6 does not rotate with respect to the second lug 224.

In some embodiments, arrangement of the first bushing 7 and the second bushing 8 may prevent mud and sand from entering the first lug hole 215 and the first pin hole 313 as well as the second lug hole 225 and the second pin hole 314, thereby reducing frictions between the first pin shaft 5 and the connecting portion 31 and between the second pin shaft 6 and the connecting portion 31, improving the operational stability of the retractable device and mitigating the wear of the connecting portion 31. In this manner, it is easy and requires low costs to replace the first bushing 7 and the first pin shaft 5 as well as the second bushing 8 and the second pin shaft 6 after wear.

In addition, two first bushings 7 may be provided, one first bushing 7 is tightly fitted in a first end of the first pin hole 313, and the other first bushing 7 is tightly fitted in a second end of the first pin hole 313. Two second bushings 8 may be provided, one second bushing 8 is tightly fitted in a first end of the second pin hole 314, and the other second bushing 8 is tightly fitted in a second end of the second pin hole 314.

Furthermore, each first bushing 7 includes a first cylindrical body 71 and a first flange 72 disposed at an end of the first cylindrical body 71. The first cylindrical body 71 of one of the first bushings 7 is fitted in the first end of the first pin hole 313, and the first flange 72 of the one of the first bushings 7 abuts against a first side face of the connecting portion 31. The first cylindrical body 71 of the other first bushing 7 is fitted in the second end of the first pin hole 313, and the first flange 72 of the other first bushing 7 abuts against a second side face of the connecting portion 31. Consequently, by placing the first bushing 7 between the first lug 214 and the connecting portion 31 and by abutting the first bushing 7 against the connecting portion 31, mud and sand may be further prevented from entering.

Each second bushing 8 includes a second cylindrical body 81 and a second flange 82 disposed at an end of the second cylindrical body 81. The second cylindrical 81 of one of the second bushings 8 is fitted in the first end of the second pin hole 314, and the second flange 82 of the one of the second bushings 8 abuts against the first side face of the connecting portion 31, the second cylindrical body 81 of the other second bushing 8 is fitted in the second end of the second pin hole 314, and the second flange 82 of the other second bushing 8 abuts against the second side face of the connecting portion 31. Consequently, by placing the second bushing 8 between the second lug 224 and the connecting portion 31 and by abutting the second bushing 8 against the connecting portion 31, mud and sand may be further prevented from entering.

In some embodiments, as illustrated in FIGS. 2 to 4, FIGS. 10 to 12 and FIGS. 14 to 16, the retractable device 100 further includes a cushioning member 4, which is also called a damping block 4. The cushioning member 4 is provided to one of the first arm 21 and the second arm 22, and in the retracted position, the cushioning member 4 is in contact with the other one of the first arm 21 and the second arm 22. The cushioning member 4 may be made of rubber or the like. By disposing the cushioning member 4 to the first arm 21 or the second arm 22, collisions and frictions between the first arm 21 and the second arm 22 may be prevented as a direct contact therebetween may be avoided when the arm assembly 2 moves to the retracted state, thereby reducing the wear of the first arm 21 and the second arm 22 and improving the operational stability of the retractable device.

In other words, the damping block 4 is disposed to at least one of the first connecting portion or the second connecting portion. When the running board base 3 is in the retracted position, the damping block 4 abuts between the first connecting portion and the second connecting portion.

As illustrated in embodiments of FIG. 5 and FIG. 6, two first hinged portions are provided, and each of the two first hinged portions is provided with the damping block. Two second hinged portions are provided, and the two second hinged portions are opposite to the two first hinged portions. When the running board base 3 is in the retracted position, one damping block 4 abuts between one first hinged portion and the second hinged portion opposite to the one first hinged portion, and the other damping block 4 abuts between the other first hinged portion and the second hinged portion opposite to the other first hinged portion.

Specifically, the cushioning member 4 is provided in a mounting hole 227 of the second arm 22, and an outer end face of the cushioning member 4 protrudes from an outer surface of the second arm 22.

In some embodiments, as illustrated in FIGS. 1 to 4, the retractable device 100 further includes the mounting bracket 1, which is also called the mounting base 1. The first end 211 of the first arm 21 is pivotally connected to the mounting bracket 1, and the first end 221 of the second arm 22 is pivotally connected to the mounting bracket 1. In other words, as illustrated in FIG. 2, an upper end of the first arm 21 is directly pivotally connected to the mounting bracket 1, and the first end 221 of the second arm 22 is directly pivotally connected to the mounting bracket 1. It can be understood that the retractable device 100 may be mounted to a vehicle easily through the mounting bracket 1. Alternatively, the retractable device 100 may also be mounted to the vehicle by directly connecting the arm assembly 2 to a chassis of the vehicle.

In other words, as illustrated in FIG. 1 and FIG. 5, one end of the first main body of the first connecting portion is rotatably connected to the mounting base 1, and the other end of the first main body is provided with the two first hinged portions. The two first hinged portions are provided at two sides of the third hinged portion 31, and the third hinged portion 31 and the two first hinged portions are connected by the first connecting shaft 5.

One end of the second main body of the second connecting portion is rotatably connected to the mounting base 1, and the other end of the second main body is provided with the two second hinged portions. The two second hinged portions are provided at two sides of the third hinged portion 31, and the third hinged portion 31 and the two second hinged portions are connected by the second connecting shaft 6.

In some example embodiments, the mounting bracket 1 has a bracket groove 101. The first end 211 of the first arm 21 is fitted in the bracket groove 101 and pivotally connected to the mounting bracket 1. The first end 221 of the second arm 22 is fitted in the bracket groove 101 and is pivotally connected to the mounting bracket 1.

Furthermore, the mounting bracket 1 has a first hole 102. The first end 211 of the first arm 21 has a first arm hole 216. The first end 211 of the first arm 21 is pivotally connected to the mounting bracket 1 through a third pin shaft 9 fitted in the first hole 102 and the first arm hole 216. The mounting bracket 1 further has a second hole 103. The first end 221 of the second arm 22 has a second arm hole 226. The first end 221 of the second arm 22 is pivotally connected to the mounting bracket 1 through a fourth pin shaft 10 fitted in the second hole 103 and the second arm hole 226.

In some embodiments, the retractable device 100 further includes a third bushing 11 and a fourth bushing 12. The third bushing 11 is tightly fitted in the first hole 102, and the third pin shaft 9 is rotatably fitted in the third bushing 11. The fourth bushing 12 is tightly fitted in the second hole 103, and the fourth pin shaft 10 is rotatably fitted in the fourth bushing 12. In some embodiments, by providing the third bushing 11 and the fourth bushing 12, mud and sand entered and wear of the mounting bracket 1 may be reduced. In this manner, it is easy and requires low costs to replace the third bushing 11 and fourth bushing 12 after wear.

Furthermore, as illustrated in FIG. 2, two third bushings 11 are provided, one third bushing 11 is tightly fitted in a first end of the first hole 102, and the other third bushing 11 is tightly fitted in a second end of the first hole 102. Two fourth bushings 12 are provided, one fourth bushing 12 is tightly fitted in a first end of the second hole 103 and the other fourth bushing 12 is tightly fitted in a second end of the second hole 103.

In some other alternative embodiments, as illustrated in FIGS. 9 to 12, the retractable device 100 further includes a mounting bracket 1, and the arm assembly 2 further includes a third arm 23. A first end 231 of the third arm 23 is pivotally connected to the mounting bracket 1. A second end 232 of the third arm 23 is pivotally connected to the first end 221 of the second arm 22. The first end 211 of the first arm 21 is pivotally connected to the mounting bracket 1.

In other words, as illustrated in FIG. 10, an upper end of the third arm 23 is pivotally connected to the mounting bracket 1. A lower end of the third arm 23 is pivotally connected to an upper end of the second arm 22. A lower end of the second arm 22 straddles the middle part 312 of the connecting portion 31. The upper end of the first arm 21 is pivotally connected to the mounting bracket 1. The lower end of the first end 21 straddles the free end 311 of the connecting portion 31.

In some embodiments, the retractable device 100 further includes a trajectory-control plate 15 and a trajectory-control shaft 13. The trajectory-control plate 15 is mounted to the first arm 21 and has a trajectory-control groove 151. The trajectory-control shaft 13 is mounted to at least one of the second arm 22 or the third arm 23, and an end of the trajectory-control shaft 13 is movably fitted in the trajectory-control groove 151.

As illustrated in FIG. 10, two trajectory-control plates 15 are provided. Both of the two trajectory-control plates 15 extend in an extending direction of the first arm 21 and are spaced apart from and opposite to each other. One trajectory-control plate 15 is provided at a first side face of the first arm 21, and the other trajectory-control plate 15 is provided at a second side face of the first arm 21.

The trajectory-control groove 151 penetrates through the trajectory-control plate 15 and extends in the extending direction of the first arm 21. The trajectory-control groove 151 on one trajectory-control plate 15 is opposite to the trajectory-control groove 151 on the other trajectory-control plate 15. An end of the trajectory-control shaft 13 may pass through one trajectory-control groove 151 and extend into the other trajectory-control groove 151.

In some embodiments, one of the second end 232 of the third arm 23 and the first end 221 of the second arm 22 has a third engagement groove 233, and the other one of the second end 232 of the third arm 23 and the first end 221 of the second arm 22 is fitted in the third engagement groove 233.

Furthermore, as illustrated in FIG. 10, the second end 232 of the third arm 23 has two third lugs 234. The third engagement groove 233 is defined between the two third lugs 234. The first end 221 of the second arm 22 has a protruding head 228 fitted in the third engagement groove 233.

Figure 9:
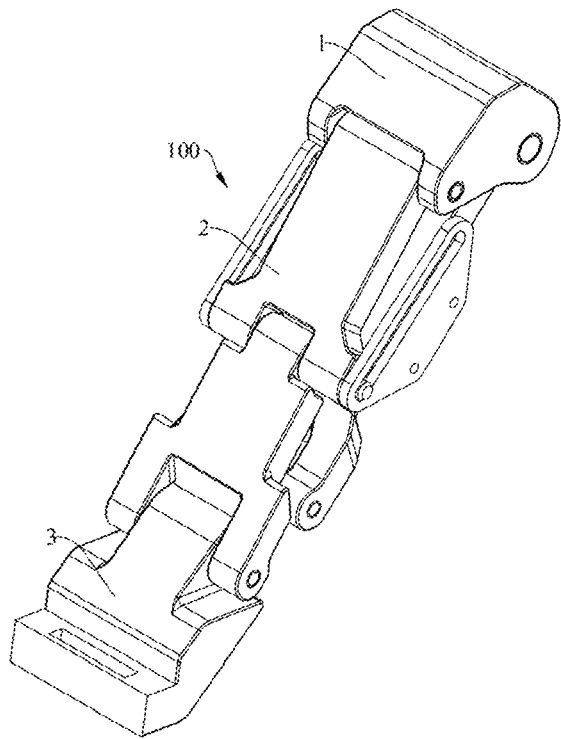
FIG. 9 is a perspective view of a retractable device according to another example embodiment of the present disclosure, in which a running board holder is in an extended position.

Furthermore, the third lug 234 has a third lug hole 235, the protruding head 228 has the second arm hole 226, and the second arm 22 is pivotally connected to the third arm 23 through a fifth pin shaft 13 fitted in the second arm hole 226 and the third lug hole 235. Specifically, as illustrated in FIGS. 9 to 10, the third lug hole 235 penetrates through the third lug 234, the second arm hole 226 penetrates through the protruding head 228, and the fifth pin shaft 13 sequentially passes through one third lug hole 235, the second arm hole 226 and the other third lug hole 235 to realize a pivotal connection between the third arm 23 and the second arm 22.

The fifth pin shaft 13 and the trajectory-control shaft 13 may be the same shaft, an end of this shaft extends into two spaced-apart trajectory-control grooves 151 sequentially, and the other end of this shaft penetrates through the third lug hole 235 and the second arm hole 226 to pivotally connect the third arm 23 and the second arm 22.

As illustrated in FIG. 10, the retractable device 100 further includes a fifth bushing 14. The fifth bushing 14 is tightly fitted in the second arm hole 226, and the fifth pin shaft 13 is rotatably fitted in the fifth bushing 14.

In some embodiments, as illustrated in FIG. 10, the mounting bracket 1 has the bracket groove 101, the first end 211 of the first arm 21 is fitted in the bracket groove 101 and pivotally connected to the mounting bracket 1, and the first end 231 of the third arm 23 is fitted in the bracket groove 101 and pivotally connected to the mounting bracket 1.

Furthermore, the mounting bracket 1 has the first hole 102. The first end 211 of the first arm 21 has the first arm hole 216. The first end 211 of the first arm 21 is pivotally connected to the mounting bracket 1 through the third pin shaft 9 fitted in the first hole 102 and the first arm hole 216. The mounting bracket 1 further has the second hole 103. The first end 231 of the third arm 23 has a third arm hole 236. The first end 231 of the third arm 23 is pivotally connected to the mounting bracket 1 through the fourth pin shaft 10 fitted in the second hole 103 and the third arm hole 236.

In some embodiments, the retractable device 100 further includes the third bushing 11 and the fourth bushing 12. The third bushing 11 is tightly fitted in the first hole 102, and the third pin shaft 9 is rotatably fitted in the third bushing 11. The fourth bushing 12 is tightly fitted in the second hole 103, and the fourth pin shaft 10 is rotatably fitted in the fourth bushing 12.

In some alternative embodiments, as illustrated in FIGS. 13 to 16, the retractable device 100 further includes a mounting bracket 1. The first end 221 of the second arm 22 is pivotally connected to the mounting bracket 1. The arm assembly 2 further includes the third arm 23 and a fourth arm 24. The first end 231 of the third arm 23 is pivotally connected to the mounting bracket 1, and the second end 232 of the third arm 23 is pivotally connected to the first end 211 of the first arm 21. A first end 241 of the fourth arm 24 is pivotally connected to the first end 211 of the first arm 21 and the second end 232 of the third arm 23, and a second end 242 of the fourth arm 24 is pivotally connected to the second arm 22.

In other words, as illustrated in FIG. 14, an upper end of the third arm 23 is pivotally connected to the mounting bracket 1, and a lower end of the third arm 23 is pivotally connected to the upper end of the first arm 21. The lower end of the first arm 21 straddles the middle part 312 of the connecting portion 31. The upper end of the second arm 22 is pivotally connected to the mounting bracket 1, and the lower end of the second arm 22 straddles the free end 311 of the connecting portion 31. An upper end of the fourth arm 24 is pivotally connected to the upper end of the first arm 21 and the lower end of the third arm 23, and a lower end of the fourth arm 24 is pivotally connected to the second arm 22.

In some embodiments, a middle part of the second arm 22 is provided with a groove hole 229, and the second end 242 of the fourth arm 24 is fitted in the groove hole 229. Specifically, as illustrated in FIG. 14, the groove hole 229 extends along the length direction of the second arm 22, and the groove hole 229 is located at a substantially middle part of the second arm 22. The second end 242 of the fourth arm 24 extends into the groove hole 229 and is pivotally connected to the second arm 22.

Figure 16:
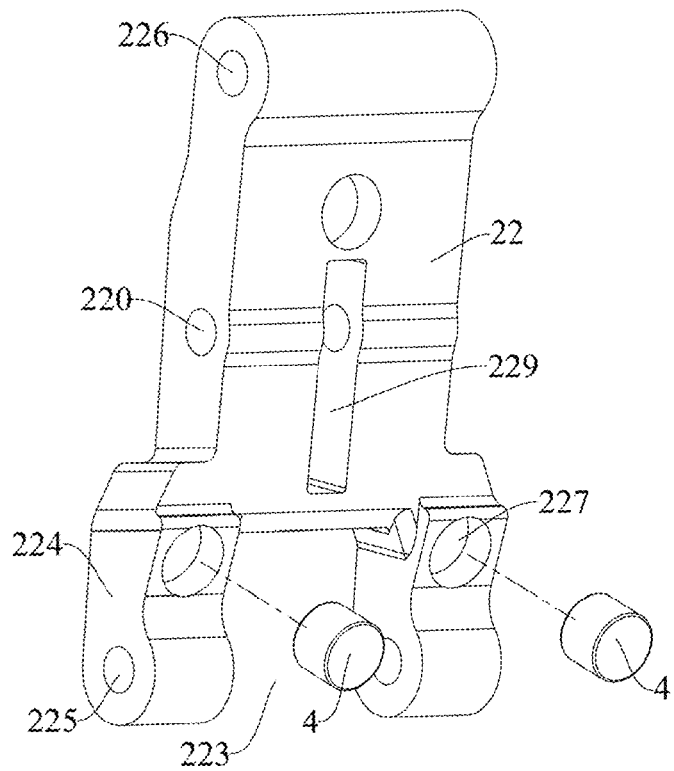
FIG. 16 is a schematic view of a second arm and the cushioning member of the retractable device as shown in FIG. 13.

Furthermore, as illustrated in FIG. 14 and FIG. 16, the second arm 22 has a third hole 220. The second end 242 of the fourth arm 24 has a fourth lower arm hole 244. The second end 242 of the fourth arm 24 is pivotally connected to the second arm 22 through a sixth pin shaft 16 fitted in the fourth lower arm hole 244 and the third hole 220.

Furthermore, the retractable device 100 further includes a sixth bushing 17, and the sixth bushing 17 is tightly fitted in the fourth lower arm hole 224. The sixth pin shaft 16 is rotatably fitted in the sixth bushing 17.

In some embodiments, the first end 211 of the first arm 21 has two lug plates 217 spaced apart from each other, the second end 232 of the third arm 23 has two third lugs 234 spaced apart from each other, the lug plates 217 are fitted between the two third lugs 234, and the first end 241 of the fourth arm 24 is fitted between the two lug plates 217.

In other words, as illustrated in FIG. 14, the upper end of the first arm 21 has two lug plates 217. The two lug plates 217 are opposite to and spaced apart from each other. The lower end of the third arm 23 has two third lugs 234. The two third lugs 234 are opposite to and spaced apart from each other. The third engagement groove 233 is defined between the two third lugs 234. The two lug plates 217 extend into the third engagement groove 233, and the upper end of the fourth arm 24 extends between the two lug plates 217. It is to be understood that, in the embodiments illustrated in FIG. 14, a distance between the two lug plates 217 is smaller than a distance between the two third lugs 234. The two lug plates 217 are fitted between the two third lugs 234. The upper end of the fourth arm 24 is fitted between the two lug plates 217.

Furthermore, the lug plate 217 has the first arm hole 216. The third lug 234 has the third lug hole 236. The upper end of the fourth arm 24 has a fourth upper arm hole 243. The fourth arm 24 is pivotally connected to the first arm 21 and the third arm 23 through the fifth pin shaft 13 fitted in the first arm hole 216, the third lug hole 235 and the fourth upper arm hole 243.

Furthermore, the retractable device 100 further includes the fifth bushing 14 and a seventh bushing 18. The fifth bushing 14 is tightly fitted in the third lug hole 235. The seventh bushing 18 is tightly fitted in the fourth upper arm hole 243. The fifth pin shaft 13 is rotatably fitted in the fifth bushing 14 and the seventh bushing 18.

It is to be understood that the connecting manner of the first arm 21, the third arm 23 and the fourth arm 24 is not limited thereto. For example, in some other embodiments, the first end 211 of the first arm 21 has two lug plates 217 spaced apart from each other. The second end 232 of the third arm 23 has two third lugs 234 spaced apart from each other. The two third lugs 234 are fitted between the two lug plates 217. The first end 241 of the fourth arm 24 is fitted between the two third lugs 234.

It is to be understood that, apart from the connection manner of the first arm 21, the third arm 23 and the fourth arm 24 as illustrated in FIG. 14, it is possible that the distance between the two lug plates 217 is greater than the distance between the two third lugs 234, the two third lugs 234 are fitted between the two lug plates 217, and the upper end of the fourth arm 24 is fitted between the two third lugs 234.

In some embodiments, as illustrated in FIG. 14, the mounting bracket 1 has the bracket groove 101. The first end 221 of the second arm 22 is fitted in the bracket groove 101 and pivotally connected to the mounting bracket 1. The first end 231 of the third arm 23 is fitted in the bracket groove 101 and pivotally connected to the mounting bracket 1.

Furthermore, the mounting bracket 1 has the first hole 102. The first end 231 of the third arm 23 has the third arm hole 236. The first end 231 of the third arm 23 is pivotally connected to the mounting bracket 1 through the third pin shaft 9 fitted in the first hole 102 and the third arm hole 236. The mounting bracket 1 further has the second hole 103. The first end 221 of the second arm 22 has the second arm hole 226. The first end 221 of the second arm 22 is pivotally connected to the mounting bracket 1 through the fourth pin shaft 10 fitted in the second hole 103 and the second arm hole 226.

In some embodiments, the retractable device 100 further includes the third bushing 11 and the fourth bushing 12. The third bushing 11 is tightly fitted in the first hole 102, and the third pin shaft 9 is rotatably fitted in the third bushing 11. The fourth bushing 12 is tightly fitted in the second hole 103, and the fourth pin shaft 10 is rotatably fitted in the fourth bushing 12.

Furthermore, as illustrated in FIG. 14, two third bushings 11 are provided, one third bushing 11 is tightly fitted in the first end of the first hole 102, and the other third bushing 11 is tightly fitted in the second end of the first hole 102. Two fourth bushings 12 are provided, one fourth bushing 12 is tightly fitted in the first end of the second hole 103, and the other fourth bushing 12 is tightly fitted in the second end of the second hole 103.

In some other alternative embodiments, the first end 211 of the first arm 21 is pivotally connected to the bottom surface (the chassis) of the vehicle body, and the first end 221 of the second arm 22 is pivotally connected to the bottom surface of the vehicle body. In some embodiments, the retractable device 100 does not include the mounting bracket 1, and the arm assembly 2 is directly pivotally connected to the bottom surface of the vehicle body. In embodiments illustrated by FIGS. 5 to 8, the first end 211 of the first arm 21 is directly pivotally connected to the bottom surface of the vehicle body, and the first end 221 of the second arm 22 is directly pivotally connected to the bottom surface of the vehicle body. In embodiments illustrated by FIGS. 9 to 12, the first end 211 of the first arm 21 is directly pivotally connected to the bottom surface of the vehicle body, and the first end 231 of the third arm 23 is directly pivotally connected to the bottom surface of the vehicle body. In embodiments illustrated by FIGS. 13 to 16, the first end 231 of the third arm 23 is directly pivotally connected to the bottom surface of the vehicle body, and the first end 221 of the second arm 22 is directly pivotally connected to the bottom surface of the vehicle body.

A retractable device for a vehicle running board apparatus according to an example embodiment of the present disclosure will be described below with reference to FIGS. 5 to 8.

As illustrated in FIGS. 5 to 8, the retractable device 100 includes a mounting bracket (a mounting base) 1, an arm assembly 2, a running board holder (a running board base) 3, two cushioning members (damping blocks) 4, a first pin shaft (a first connecting shaft) 5, a second pin shaft (a second connecting shaft) 6, two first shaft sleeves 7, two second bushings 8, a third pin shaft 9, a fourth pin shaft 10, two third bushings 11 and two fourth bushings 12.

The mounting bracket 1 has a bracket groove 101, a first hole 102 and a second hole 103. One third bushing 11 is tightly fitted in a first end of the first hole 102, and the other third bushing 11 is tightly fitted in a second end of the first hole 102. The third pin shaft 9 is rotatably fitted in the third bushing 11. One fourth bushing 12 is tightly fitted in a first end of the second hole 103, and the other fourth bushing 12 is tightly fitted in a second end of the second hole 103. The fourth pin shaft 10 is rotatably fitted in the fourth bushing 12.

The running board holder 3 includes a third main body and a connecting portion (a third hinged portion) 31, and the connecting portion (the third hinged portion) 31 is provided to the third main body. Specifically, the third main body has a wedged bevel, and the connecting portion (the third hinged portion) 31 is provided to the wedged bevel. A free end 311 of the connecting portion (the third hinged portion) 31 has a first pin hole 313, and a middle part 312 of the connecting portion (the third hinged portion) 31 has a second pin hole 314.

One first bushing 7 is tightly fitted in a first end of the first pin hole 313, the other first bushing 7 is tightly fitted in a second end of the first pin hole 313, and the first pin shaft 5 is rotatably fitted in the first bushing 7. The first pin shaft 5 is also called the first connecting shaft 5. The first bushing 7 includes a first cylindrical body 71 and a first flange 72 disposed at an end of the first cylindrical body 71. The first cylindrical body 71 of one of the first bushings 7 is fitted in the first end of the first pin hole 313, the first flange 72 of the one of the first bushings 7 abuts against a first side face of the connecting portion 31, the first cylindrical body 71 of the other first bushing 7 is fitted in the second end of the first pin hole 313, and the first flange 72 of the other first bushing 7 abuts against a second side face of the connecting portion 31.

One second bushing 8 is tightly fitted in a first end of the second pin hole 314, the other second bushing 8 is tightly fitted in a second end of the second pin hole 314. The second pin shaft 6 is rotatably fitted in the second bushing 8. The second pin shaft 6 is also called the second connecting shaft 6. The second bushing 8 includes a second cylindrical body 81 and a second flange 82 disposed at an end of the second cylindrical body 81. The second cylindrical body 81 of one of the second bushings 8 is fitted in the first end of the second pin hole 314, the second flange 82 of the one of the second bushings 7 abuts against the first side face of the connecting portion 31, the second cylindrical body 81 of the other second bushing 8 is fitted in the second end of the second pin hole 314, and the second flange 82 of the other second bushing 8 abuts against the second side face of the connecting portion 31. The first bushing 7 and the second bushing 8 are also called sleeves.

The arm assembly 2 includes a first arm 21 and a second arm 22. A first end 211 of the first arm 21 has a first arm hole 216. The first end 211 of the first arm 21 is fitted in the bracket groove 101. The third pin shaft 9 is fitted in the first arm hole 216 and the first hole 102 to pivotally connect the first end 211 of the first arm 21 to the mounting bracket 1. In this embodiment, the first arm 21 constitutes a second connecting portion and is a second link rod. The second arm 22 constitutes a first connecting portion and is a first link rod. An end of the first link rod is rotatably connected to the mounting base 1, and the other end of the first link rod is rotatably connected to the running board base 3. An end of the second link rod is rotatably connected to the mounting base 1, and the other end of the second link is rotatably connected to the running board base 3.

A second end 212 of the first arm 21 has two first lugs 214 spaced apart from each other. The first lug 214 is also called a second hinged portion 214. That is, the second connecting portion includes a second main body and the two spaced-apart second hinged portions 214 connected to the second main body. A first engagement groove 213 is defined between the two first lugs 214, and the two first lugs 214 are respectively located at two sides of the free end 311 of the connecting portion 31, such that the second end 212 of the first arm 21 straddles the free end 311 of the connecting portion 31 through the first lug 214 and the first engagement groove 213. Each of the two first lugs 214 has a first lug hole 215. The first pin shaft 5 is fitted in the first pin hole 313 and the first lug hole 215, so that the second end 212 of the first arm 21 is pivotally connected to the free end 313 of the connecting portion 31, and the first pin shaft 5 forms an interference fit with the first lug hole 215.

A first end 221 of the second arm 22 has a second arm hole 226, and the first end 221 of the second arm 22 is fitted in the bracket groove 101. The fourth pin shaft 10 is fitted in the second arm hole 226 and the second hole 103 to pivotally connect the first end 221 of the second arm 22 to the mounting bracket 1.

A second end 222 of the second arm 22 has two second lugs 224 spaced apart from each other. The second lug 224 is also called a first hinged portion 224. That is, the first connecting portion includes a first main body and the two spaced-apart first hinged portions 224 connected to the first main body. A second engagement groove 223 is defined between the two second lugs 224, and the two second lugs 224 are respectively located at two sides of a middle part 312 of the connecting portion 31, such that the second end 222 of the second arm 22 straddles the middle part 312 of the connecting portion 31 through the second lug 224 and the second engagement groove 223. Each of the two second lugs 224 has a second lug hole 225. The second pin shaft 6 is fitted in the second pin hole 314 and the second lug hole 225, so that the second end 222 of the second arm 22 is pivotally connected to the middle part 312 of the connecting portion 31, and the second pin shaft 6 forms an interference fit with the second lug hole 225.

A mounting hole 227 is defined in a surface of each second lug 224 adjacent to the first arm 21. The two cushioning members 4 are respectively provided in the two mounting holes 227. An outer end face of the cushioning member 4 protrudes from the surface of the second lug 224 adjacent to the first arm 21.

In other words, as illustrated in FIGS. 5 to 8, a drive assembly (e.g., the retractable device) for a vehicle running board according to some embodiments of the present disclosure includes: a mounting base 1, a running board base 3, a first connecting portion and a second connecting portion.

The running board base 3 is movable between an extended position and a retracted position.

The running board holder 3 includes a third main body and a third hinged portion 31, and the third hinged portion 31 is provided to the third main body. Specifically, the third main body has a wedged bevel. The third hinged portion 31 is provided to the wedged bevel. A free end 311 of the third hinged portion 31 has a first pin hole 313, and a middle part 312 of the third hinged portion 31 has a second pin hole 314.

The first arm 21 constitutes the second connecting portion and is a second link rod. The second link rod includes a second main body and two second hinged portions 214. An end of the second main body is rotatably connected to the mounting base 1. The two second hinged portions 214 are connected to the other end of the second main body and spaced apart from each other. The third hinged portion 31 is rotatably connected between the two second hinged portions 214. In other words, the two second hinged portions 214 are provided at two sides of the third hinged portion 31, and the third hinged portion 31 is rotatably connected to the two second hinged portions 214 through a second connecting shaft 6.

The third hinged portion 31 is sandwiched between the two second hinged portions 214 to prevent the intrusion of mud, sand or the like, avoid the wear and abnormal noise of the hinged portions due to the mud and sand, and prolong the service life of the drive assembly 100.

The second arm 22 constitutes the first connecting portion and is a first link rod. The first link rod includes a first main body and two first hinged portions 224. An end of the first main body is rotatably connected to the mounting base 1. The two first hinged portions 224 are connected to the other end of the first main body and spaced apart from each other. The two second hinged portions 214 are arranged opposite to the two first hinged portions 224. The third hinged portion 31 is rotatably connected between the two first hinged portions 224. In other words, the two first hinged portions 224 are provided at two sides of the third hinged portion 31, and the third hinged portion 31 is connected to the two first hinged portions 224 through a first connecting shaft 5.

The third hinged portion 31 is sandwiched between the two first hinged portions 224 to prevent the intrusion of mud, sand or the like, avoid the wear and abnormal noise of the hinged portions due to the mud and sand, and prolong the service life of the drive assembly 100.

A damping block 4 is disposed to a surface of each of the two first hinged portions 224 adjacent to the second hinged portion 214, and each of the first hinged portions 224 is provided with one damping block 4. When the running board base 3 is in the retracted position, one damping block 4 abuts between the first hinged portion 224 provided with the one damping block 4 and the second hinged portion 214 corresponding to this first hinged portion 224. The other damping block 4 abuts between the first hinged portion 224 provided with the other damping block 4 and the second hinged portion 214 corresponding to this first hinged portion 224.

The damping block 4 plays a cushioning role to prevent the first link rod from directly colliding with the second link rod and to avoid vibration and damage due to the collision, such that the drive assembly 100 operates stably and the service life of the drive assembly 100 is prolonged.

A sleeve is provided between the first connecting shaft 5 and the first hinged portion 224, and the sleeve forms an interference fit with the first connecting shaft 5 and the first hinged portion 2. A sleeve is provided between the second connecting shaft 6 and the second hinged portion 214. The sleeve functions to protect the connecting shafts and the hinged portions, and additionally, the interference fit can prevent mud and sand from entering from the outside through a gap among the sleeve, the hinged portions and the connecting shafts, thereby reducing the wear, and prolonging the service life of the drive assembly 100.

For the drive assembly 100 for the vehicle running board according to the embodiments of the present disclosure, the drive assembly 100 forms the linkage mechanism, and the third hinged portion 31 is interposed among a plurality of first hinged portions 224 and a plurality of second hinged portions 214, such that the drive assembly 100 has a simple structure, high strength, low cost and long service life.

A retractable device of a vehicle running board apparatus according to another example embodiment of the present disclosure will be described below with reference to FIGS. 9 to 12.

As illustrated in FIGS. 9 to 12, the retractable device 100 according to some embodiments of the present disclosure includes a mounting bracket (a mounting base) 1, an arm assembly 2, a running board holder (a running board base) 3, two cushioning members (damping blocks) 4, a first pin shaft (a first connecting shaft) 5, a second pin shaft (a second connecting shaft) 6, two first bushings 7, two second bushings 8, a third pin shaft 9, a fourth pin shaft 10, two third bushings 11, two fourth bushings 12, a fifth pin shaft (a trajectory-control shaft) 13, a fifth bushing 14 and two trajectory-control plates 15.

The mounting bracket 1 has a bracket groove 101, a first hole 102 and a second hole 103. One third bushing 11 is tightly fitted in a first end of the first hole 102, and the other third bushing 11 is tightly fitted in a second end of the first hole 102. The third pin shaft 9 is rotatably fitted in the third bushing 11. One fourth bushing 12 is tightly fitted in a first end of the second hole 103, and the other fourth bushing 12 is tightly fitted in a second end of the second hole 103. The fourth pin shaft 10 is rotatably fitted in the fourth bushing 12.

The arm assembly 2 includes a first arm 21, a second arm 22 and a third arm 23. A trajectory-control plate 15 is provided to each of a first side face and a second side face of the first arm 21. Two trajectory-control side plates 15 are opposite to and spaced apart from each other. The trajectory-control plate 15 has a trajectory-control groove 151 penetrating through the trajectory-control plate 15. The trajectory-control groove 151 extends along the length direction of the first arm 21. The two trajectory-control grooves 151 are opposite to each other. In this embodiment, the first arm 21 constitutes a second connecting portion. The second arm 22 and the third arm 23 constitute a first connecting portion. The second arm 22 is also called a fourth link rod, and the third arm 23 is also called a third link rod. An end of the third link rod is rotatably connected to the mounting base 1, and the other end of the third link rod is rotatably connected to an end of the fourth link rod. The other end of the fourth link rod is rotatably connected to the running board base 3.

A first end 231 of the third arm 23 has a third arm hole 236, and the first end 231 of the third arm 23 is fitted in the bracket groove 101. The fourth pin shaft 10 is fitted in the third arm hole 236 and the second hole 103 to pivotally connect the first end 231 of the third arm 23 to the mounting bracket 1.

A second end 232 of the third arm 23 has two third lugs 234 spaced apart from each other, and the third lug 234 may also be called the fourth hinged portion 234. That is, the third link rod includes two fourth hinged portions 234 spaced apart from each other. A third engagement groove 233 is defined between the two third lugs 234, and each third lug 234 has a third lug hole 235.

A first end 221 of the second arm 22 has a protruding head 228, and the protruding head 228 is also called a fifth hinged portion. The protruding head 228 has a second arm hole 226. The fifth bushing 14 is fitted in the second arm hole 226. An end of the fifth pin shaft 13 is fitted in the fifth bushing 14 and the third lug hole 235 to pivotally connect the second end 232 of the third arm 23 to the first end 221 of the second arm 22. The other end of the fifth pin shaft 13 is fitted in the two trajectory-control grooves 151 and is movable in an extending direction of the trajectory-control grooves 151.

In other words, as illustrated in FIGS. 9 to 12, a drive assembly (e.g., the retractable device) for a vehicle running board according to embodiments of the present disclosure includes a mounting base 1, a running board base 3, a first connecting portion and a second connecting portion.

The running board base 3 is movable between an extended position and a retracted position. The running board holder 3 includes a third main body and a third hinged portion 31, and the third hinged portion 31 is provided to the third main body. Specifically, the third main body has a wedged bevel. The third hinged portion 31 is provided to the wedged bevel. A free end 311 of the third hinged portion 31 has a first pin hole 313 and a middle part 312 of the third hinged portion 31 has a second pin hole 314.

The first arm 21 constitutes the second connecting portion. The second arm 22 and the third arm 23 constitute the first connecting portion. The second arm 22 is also called a fourth link rod, and the third arm 23 is also called a third link rod. An end of the third link rod is rotatably connected to the mounting base 1, and the other end of the third link rod includes two fourth hinged portions 234 spaced apart from each other. An end of the fourth link rod includes a fifth hinged portion 228, the fifth hinged portion 228 is disposed between the two fourth hinged portions 234, and the fifth hinged portion 228 is rotatably connected to the two fourth hinged portions 234 through the third connecting shaft 13.

The other end of the fourth link rod includes two first hinged portions 224 spaced apart from each other. The third hinged portion 31 is located between the two first hinged portions 224, and the third hinged portion 31 is rotatably connected to the two first hinged portions 224.

The second connecting portion includes a second main body and two second hinged portions 214 spaced apart from each other. An end of the second main body is rotatably connected to the mounting base 1, and the other end of the second main body is connected to the second hinged portion 214. The third hinged portion 31 is located between the two second hinged portions 214, and the third hinged portion 31 is rotatably connected to the two second hinged portions 214.

Two ends of the third connecting shaft 13 protrude from the two fourth hinged portions 234 to form or connect a support portion. The third connecting shaft 13 protrudes from two ends of the fourth hinged portion 234, so that a part of the third connecting shaft 13 protruding from two ends of the fourth hinged portion 234 can serve as a sliding block. The sliding block is fitted with a sliding groove in the second connecting portion and moves along the sliding groove, which simplifies the structure and facilitates the assembling. A damping block 4 is disposed to a surface of each of the two first hinged portions 224 of the fourth link rod adjacent to the first arm, and each of the first hinged portions 224 is provided with one damping block 4. When the running board base 3 is in the retracted position, one damping block 4 abuts between the first hinged portion 224 provided with the one damping block 4 and the second hinged portion 214 corresponding to this first hinged portion 224. The other damping block 4 abuts between the first hinged portion 224 provided with the other damping block 4 and the second hinged portion 214 corresponding to this first hinged portion 224.

The damping block 4 plays a cushioning role to prevent the fourth link rod from directly colliding with the first arm 21 and to avoid vibration and damage due to collision, such that the drive assembly 100 operates stably and the service life of the drive assembly 100 is prolonged.

A retractable device of a vehicle running board apparatus according to yet another example embodiment of the present disclosure will be described below with reference to FIGS. 13 to 16.

As illustrated in FIGS. 13 to 16, the retractable device 100 according to some embodiments of the present disclosure includes a mounting bracket (a mounting base) 1, an arm assembly 2, a running board holder (a running board base) 3, two cushioning members (damping blocks) 4, a first pin shaft (a first connecting shaft) 5, a second pin shaft (a second connecting shaft) 6, two first bushings 7, two second bushings 8, a third pin shaft 9, a fourth pin shaft 10, two third bushings 11, two fourth bushings 12, a fifth pin shaft 13, two fifth bushings 14, a sixth pin shaft 16, a sixth bushing 17 and an eighth bushing 18.

The mounting bracket 1 has a bracket groove 101, a first hole 102 and a second hole 103. One third bushing 11 is tightly fitted in a first end of the first hole 102, and the other third bushing 11 is tightly fitted in a second end of the first hole 102. The third pin shaft 9 is rotatably fitted in the third bushing 11. One fourth bushing 12 is tightly fitted in a first end of the second hole 103, and the other fourth bushing 12 is tightly fitted in a second end of the second hole 103. The fourth pin shaft 10 is rotatably fitted in the fourth bushing 12.

The arm assembly 2 includes a first arm 21, a second arm 22, a third arm 23 and a fourth arm 24. A first end 231 of the third arm 23 has a third arm hole 236. The third pin shaft 9 is fitted in the third arm hole 236 and the first hole 102 to pivotally connect the first end 231 of the third arm 23 to the mounting bracket 1. In this embodiment, the second arm 22 constitutes a second connecting portion, and the first arm 21 and the third arm 23 constitute a first connecting portion. The first arm 21 is also called a fourth link rod, and the third arm 23 is also called a third link rod. An end of the third link rod is rotatably connected to the mounting base 1, and the other end of the third link rod is rotatably connected to an end of the fourth link rod. The other end of the fourth link rod is rotatably connected to the running board base 3.

A second end 232 of the third arm 23 has two third lugs 234 spaced apart from each other, and the third lug 234 is also called the fourth hinged portions 234. That is, the third link rod includes two spaced-apart fourth hinged portions 234 spaced apart from each other. Each third lug 234 has a third lug hole 235. A third engagement groove 233 is defined between the two third lugs 234. A first end 211 of the first arm 21 has two lug plates 217 spaced apart from each other. Each lug plate 217 has a first arm hole 216. The two lug plates 217 are fitted in the third engagement groove 233.

A first end 241 of the fourth arm 24 is fitted between the two lug plates 217, and the first end 241 of the fourth arm 24 has a fourth upper arm hole 243. The fourth arm 24 is also called a fifth link rod 24. The fifth pin shaft 13 is fitted in the third lug hole 235, the first arm hole 216 and the fourth upper arm hole 243 to pivotally connect the first end 241 of the fourth arm 24 to the first end 211 of the first arm 21 and the second end 232 of the third arm 23.

One fifth bushing 14 is fitted in each third lug hole 235. The fifth bushing 14 is also called a sleeve. One seventh bushing 18 is fitted in the fourth upper arm hole 243. The fifth pin shaft 13 is rotatably fitted in the fifth bushing 4 and the seventh bushing 18.

A substantially middle part of the second arm 22 has a groove hole 229, and the groove hole 229 penetrates through a wall thickness of the second arm 22 and extends along a length direction of the second arm 22. A second end 242 of the fourth arm 24 is fitted in the groove hole 229.

The second arm 22 further has two third holes 220 opposite to each other, and the third hole 220 is communicated with the groove hole 229. The second end 242 of the fourth arm 24 has a fourth lower arm hole 244. The sixth bushing 17 is fitted in the fourth lower arm hole 244. The sixth pin shaft 16 is rotatably fitted in the sixth bushing 17. The sixth pin shaft 16 is fitted in the fourth lower arm hole 244 and the third hole 220 to pivotally connect the second end 242 of the fourth arm 24 to the second arm 22.

The technical features described in the above specific examples can be implemented in various configurations, some examples of these configurations are provided below.

In some configurations, a drive assembly for a vehicle running board includes: a mounting base; a running board base movable between an extended position and a retracted position and including a third main body and a third hinged portion connected to the third main body; a first connecting portion rotatably connected to the mounting base and the running board base separately, the first connecting portion including a first main body and a plurality of first hinged portions spaced apart from each other and connected to the first main body, and the third hinged portion being rotatably connected between adjacent first hinged portions; and a second connecting portion rotatably connected to the mounting base and the running board base separately, the second connecting portion including a second main body and a plurality of second hinged portions spaced apart from each other and connected to the second main body, and the third hinged portion being rotatably connected between adjacent second hinged portions.

In a further configuration, an end of the first main body is rotatably connected to the mounting base, two first hinged portions are provided at the other end of the first main body and disposed at two sides of the third hinged portion, and the third hinged portion and the two first hinged portions are connected through a first connecting shaft.

In a further configuration, an end of the second main body is rotatably connected to the mounting base, two second hinged portions are provided at the other end of the second main body and disposed at two sides of the third hinged portion, and the third hinged portion and the two second hinged portions are connected through a second connecting shaft.

In a further configuration, the drive assembly for the vehicle running board further includes a damping block, the damping block is disposed to at least one of the first connecting portion or the second connecting portion, and when the running board base is in the retracted position, the damping block abuts between the first connecting portion and the second connecting portion.

In a further configuration, two first hinged portions are provided, each of the two first hinged portions is provided with a damping block, two second hinged portions are provided, the two second hinged portions are opposite to the two first hinged portions, and when the running board base is in the retracted position, the two damping blocks abut against between the first hinged portion and the second hinged portion correspondingly.

In a further configuration, the third main body has a wedged bevel, and the third hinged portion is provided to the wedged bevel.

In a further configuration, the first connecting portion is configured as a first link rod with two ends connected to the mounting base and the running board base respectively; and the second connecting portion is configured as a second link rod with two ends connected to the mounting base and the running board base respectively.

In a further configuration, the first connecting portion includes: a third link rod rotatably connected to the mounting base; a fourth link rod having two ends rotatably connected to the third link rod and the running board base respectively; and a support portion connected at a hinge joint of the third link rod and the fourth link rod, and connected to the second connecting portion.

In a further configuration, the support portion is a sliding block, the second connecting portion is provided with a sliding groove, and an end of the sliding block is slidably fitted in the sliding groove.

In a further configuration, the support portion is a fifth link rod, and the fifth link rod has an end rotatably connected at the hinge joint of the third link rod and the fourth link rod and the other end rotatably connected to the second connecting portion.

In a further configuration, the third link rod includes two fourth hinged portions spaced apart from each other; the fourth link rod includes a fifth hinged portion; the two fourth hinged portions are disposed at two sides of the fifth hinged portion respectively; and the fifth hinged portion and the two fourth hinged portions are connected through a third connecting shaft.

In a further configuration, two ends of the third connecting shaft protrude from the two fourth hinged portions respectively to form or connect the support portion.

In some configurations, a running board assembly for a vehicle includes: a running board; a drive assembly, the drive assembly being a drive assembly for a vehicle running board according to the above configurations, the running board being mounted to the running board base, and the drive assembly being connected to one of the running board and the running board base; and a drive assembly, the drive assembly being a drive assembly for a vehicle running board according to the above configurations, the running board being mounted to the running board base, and the drive assembly being connected to one of the running board and the running board base; and a driving member connected to the first connecting portion to drive the first connecting portion to rotate with respect to the mounting base.

In a further configuration, the drive assembly is connected to the running board, a plurality of drive assemblies are provided and spaced apart along a length direction of the running board.

In a further configuration, a plurality of drive assemblies are provided, and each of the drive assemblies is individually driven by one driving member.

Additional embodiments of a vehicle running board apparatus and retractable devices thereof in accordance with the present disclosure are described below. Features described in the embodiments below can be incorporated with the devices, methods and systems described in the aforementioned embodiments, and vice versa.

A drive assembly for a running board according to embodiments of a first aspect of the additional embodiments of the present disclosure has a simple structure, high structural strength, and low cost.

A running board assembly for a vehicle according to embodiments of a second aspect of the present disclosure includes the above-described drive assembly.

A vehicle according to embodiments of a third aspect of the present disclosure includes the above-described running board assembly.

The drive assembly according to embodiments of the first aspect of the present disclosure includes: a mounting base; a running board holder; a first connecting portion rotatably connected with the mounting base and the running board holder; and a second connecting portion rotatably connected with the mounting base and the running board holder. A central rotation shaft of the second connection portion relative to the running board holder, a central rotation shaft of the second connection portion relative to the mounting base, a central rotation shaft of the first connection portion relative to the running board holder, and a central rotation shaft of the first connection portion relative to the mounting base each extend along a left-right direction and are parallel to one another; the mounting base, the first connecting portion, the second connecting portion and the running board holder constitute a linkage to make the running board holder movable between an extended position and a retracted position. The running board holder includes a third main body and a third hinged portion connected with the third main body; the first connecting portion includes a first main body, and a plurality of first hinged portions connected with the first main body and spaced apart in the left-right direction, the third hinged portion being rotatably connected among the plurality of first hinged portions; and/or the second connecting portion includes a second main body, and a plurality of second hinged portions connected with the second main body and spaced apart in the left-right direction, the third hinged portion being rotatably connected among the plurality of second hinged portions.

In the drive assembly according to embodiments of the present disclosure, the third hinged portion is rotatably provided between the first hinged portions and/or the second hinged portions, and the running board holder has a simple structure, good manufacturability, and hence low cost.

In addition, the drive assembly according to the above embodiments of the present disclosure may further have the following additional technical features.

According to an embodiment of the present disclosure, the first main body has a first end rotatably connected with the mounting base, and a second end provided with two first hinged portions spaced apart in the left-right direction; the two first hinged portions are disposed at both sides of the third hinged portion, and the third hinged portion is connected with the two first hinged portions through a first connecting shaft.

According to an embodiment of the present disclosure, the second main body has a first end rotatably connected with the mounting base, and a second end provided with two second hinged portions spaced apart in the left-right direction; the two second hinged portions are disposed at both sides of the third hinged portion, and the third hinged portion is connected with the two second hinged portions through a second connecting shaft.

According to an embodiment of the present disclosure, at least one of the first connecting portion and the running board holder is provided with a damping block, and the damping block abuts between the first connecting portion and the running board holder when the running board holder is in at least one of the extended position and the retracted position.

According to an embodiment of the present disclosure, at least one of the second connecting portion and the running board holder is provided with a damping block, and the damping block abuts between the second connecting portion and the running board holder when the running board holder is in at least one of the extended position and the retracted position.

According to an embodiment of the present disclosure, at least a part of the plurality of first hinged portions is provided with a damping block, the third main body is provided with a wedged bevel opposite the first hinged portion, and when the running board holder is in the extended position, the damping block abuts against the wedged bevel.

According to an embodiment of the present disclosure, two first hinged portions are provided and spaced apart in the left-right direction, and each of the two first hinged portions is provided with the damping block; the third main body is provided with the wedged bevel at each of left and right sides of the third hinged portion, and the two wedged bevels are provided in one-to-one correspondence with the two first hinged portions; and when the running board holder is in the extended position, the damping blocks on the two first hinged portions abut against the corresponding wedged bevels.

According to an embodiment of the present disclosure, the first connecting portion is configured as a first link rod with two ends connected with the mounting base and the running board holder respectively; the second connecting portion is configured as a second link rod with two ends connected with the mounting base and the running board holder respectively.

According to an embodiment of the present disclosure, the first connecting portion includes: a third link rod rotatably connected with the mounting base; a fourth link rod having two ends rotatably connected with the third link rod and the running board holder respectively; and a support portion connected at a hinge joint of the third link rod and the fourth link rod, and connected with the second connecting portion.

According to an embodiment of the present disclosure, the support portion is a sliding block, the second connecting portion is provided with a sliding groove, and the support portion is slidably embedded in the sliding groove along a direction perpendicular to the left-right direction.

According to an embodiment of the present disclosure, the support portion is a fifth link rod, and the fifth link rod has a first end rotatably connected at the hinge joint of the third link rod and the fourth link rod and a second end rotatably connected with the second connecting portion.

According to an embodiment of the present disclosure, the third link rod includes two fourth hinged portions spaced apart in the left-right direction; the fourth link rod includes a fifth hinged portion; the two fourth hinged portions are disposed at left and right sides of the fifth hinged portion; and the fifth hinged portion and the two fourth hinged portions are connected by a third connecting shaft.

According to an embodiment of the present disclosure, two ends of the third connecting shaft protrude from the two fourth hinged portions to form or connect the support portion.

The running board assembly according to embodiments of the second aspect of the present disclosure includes: a running board; a drive assembly, the drive assembly being configured as the above-described drive assembly, the running board holder being connected with the running board; and a driving part connected with the first connecting portion to drive the first connecting portion to rotate with respect to the mounting base.

The running board assembly according to embodiments of the present disclosure includes the above-described drive assembly, and the driving part is used to drive the running board to extend or retract. The running board assembly has a simple structure, long service life, and low cost.

According to an embodiment of the present disclosure, the running board extends along a left-right direction, and is provided with a plurality of the drive assemblies spaced apart along the left-right direction.

According to an embodiment of the present disclosure, each of the drive assemblies is individually driven by one driving part.

The vehicle according to embodiments of the third aspect of the present disclosure includes the above-described running board assembly, and the cost of the vehicle is low.

FIGS. 17-39 show some embodiments of a vehicle and a running board assembly, as well as a drive assembly 100T for a running board 200T.

Figure 17:
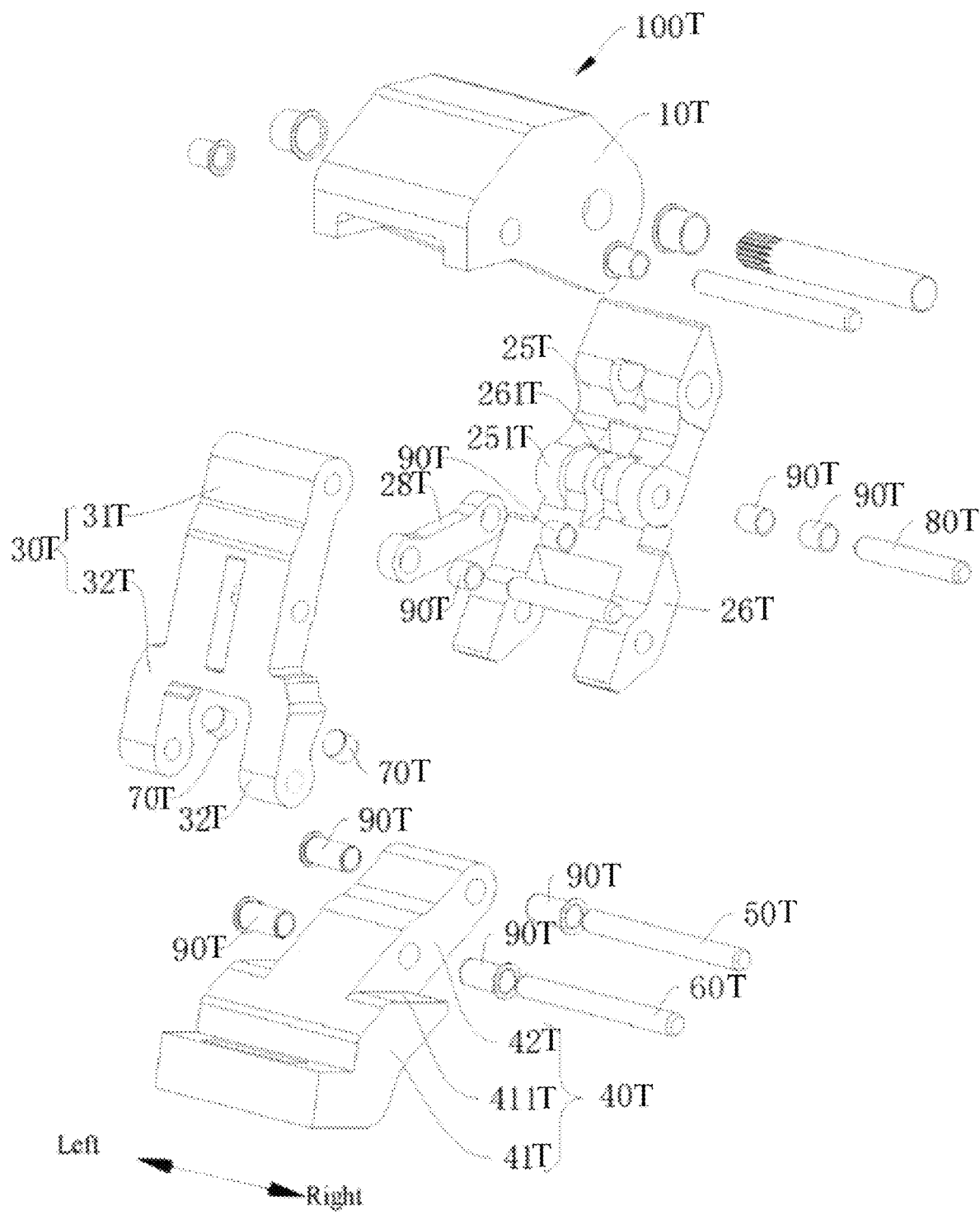
FIG. 17 is an exploded view of a drive assembly according to an embodiment of the present disclosure.
Figure 18:
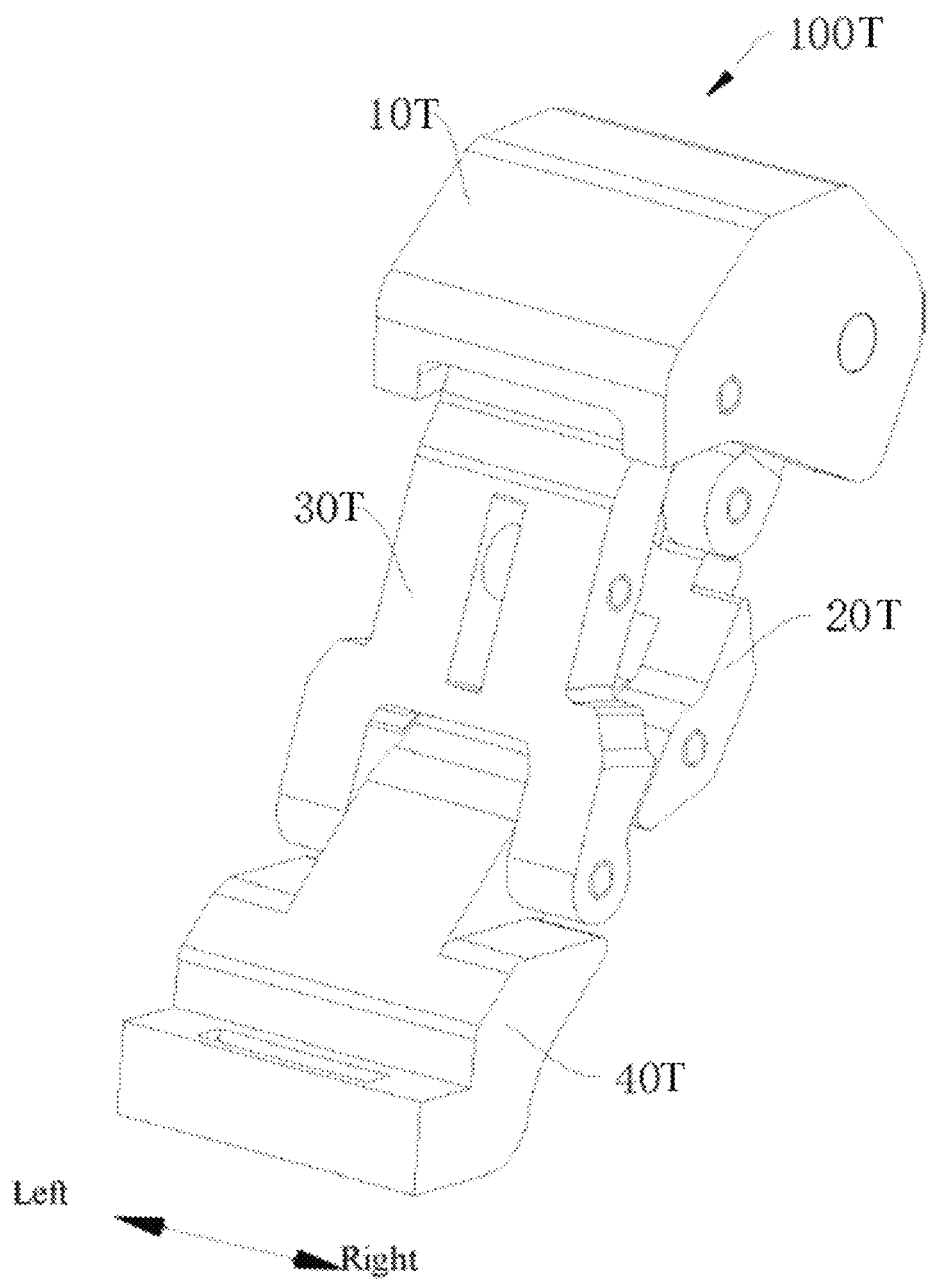
FIG. 18 is a schematic view of a drive assembly with a running board holder in an extended position according to an embodiment of the present disclosure.
Figure 19:
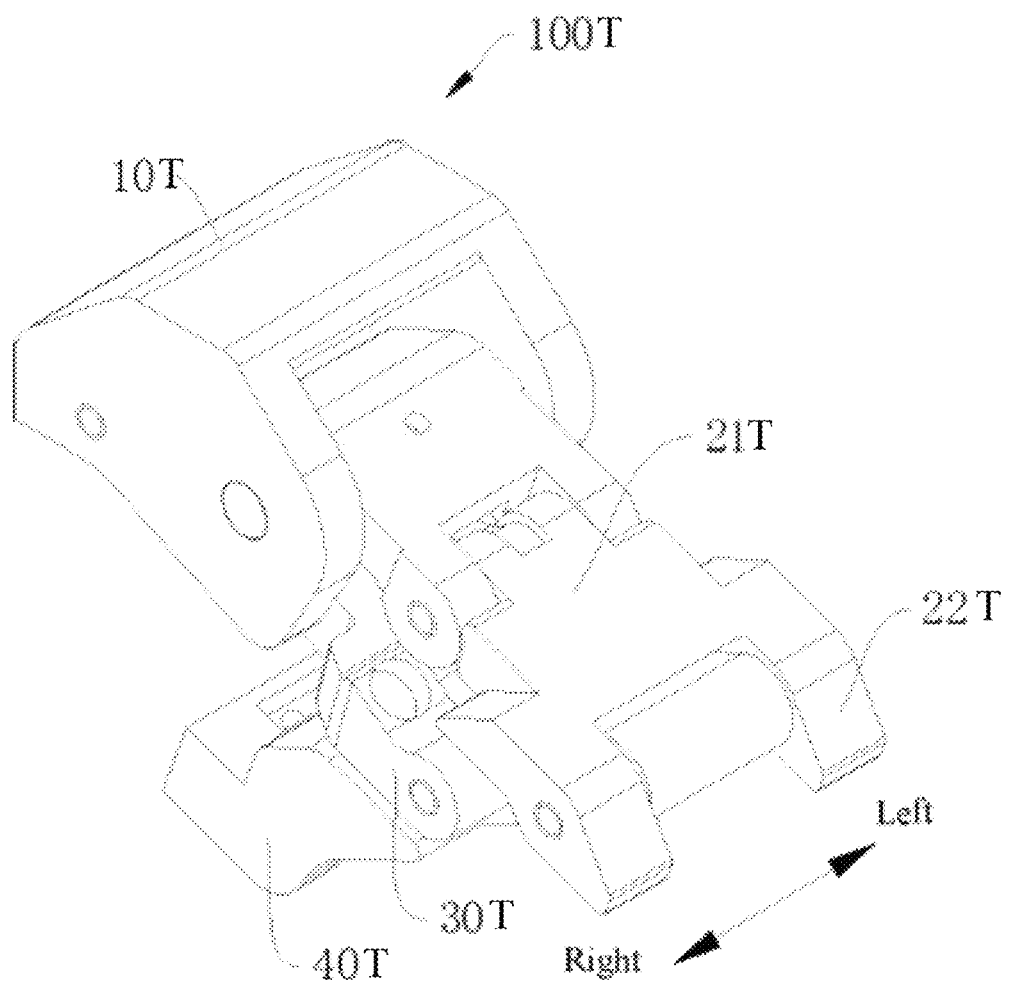
FIG. 19 is a schematic view of a drive assembly with a running board holder in a retracted position according to an embodiment of the present disclosure.
Figure 20:
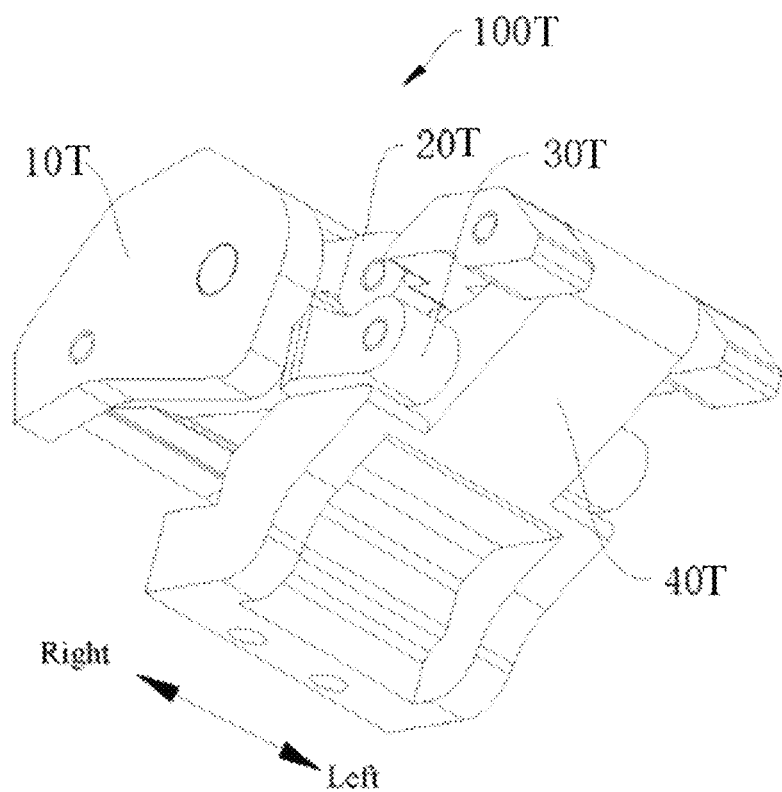
FIG. 20 is a schematic view of a drive assembly with a running board holder in a retracted position according to an embodiment of the present disclosure.
Figure 21:
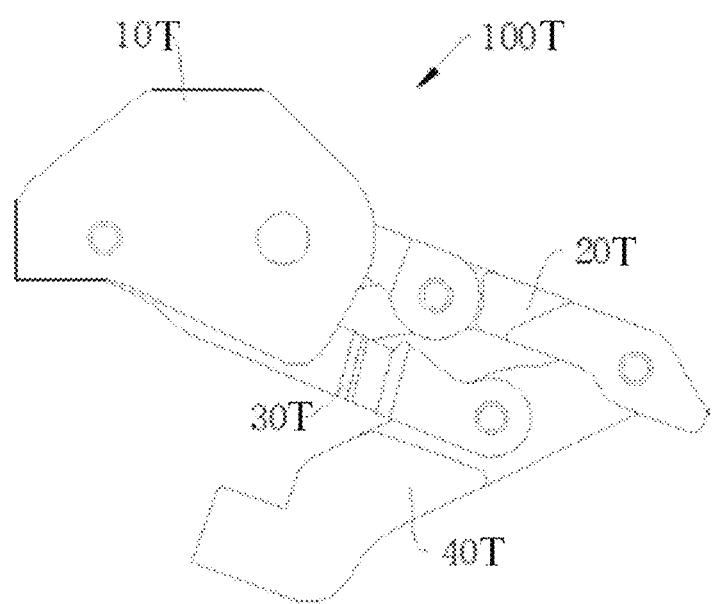
FIG. 21 is a side view of a drive assembly with a running board holder in a retracted position according to an embodiment of the present disclosure.
Figure 22:
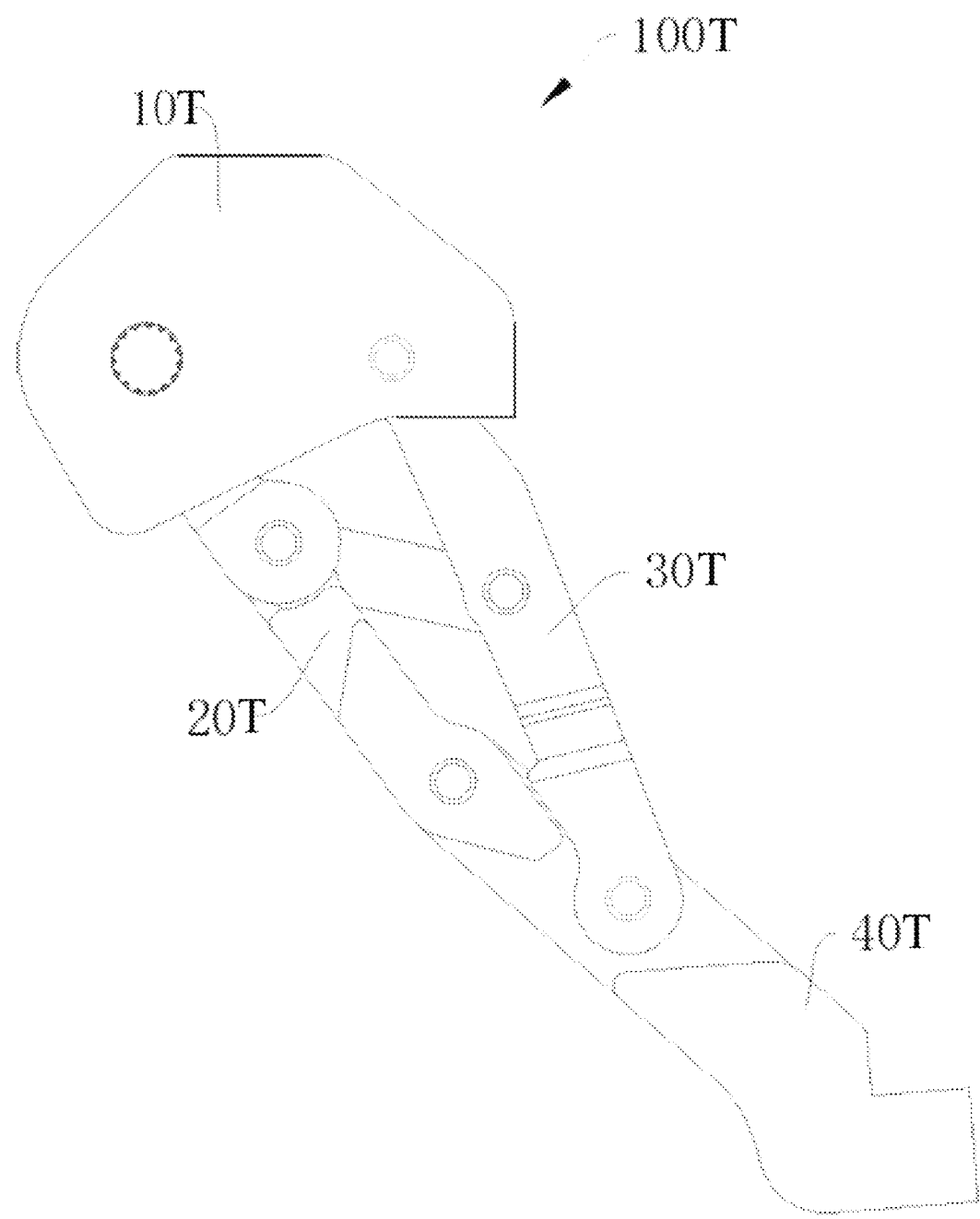
FIG. 22 is a side view of a drive assembly with a running board holder in an extended position according to an embodiment of the present disclosure.
Figure 23:
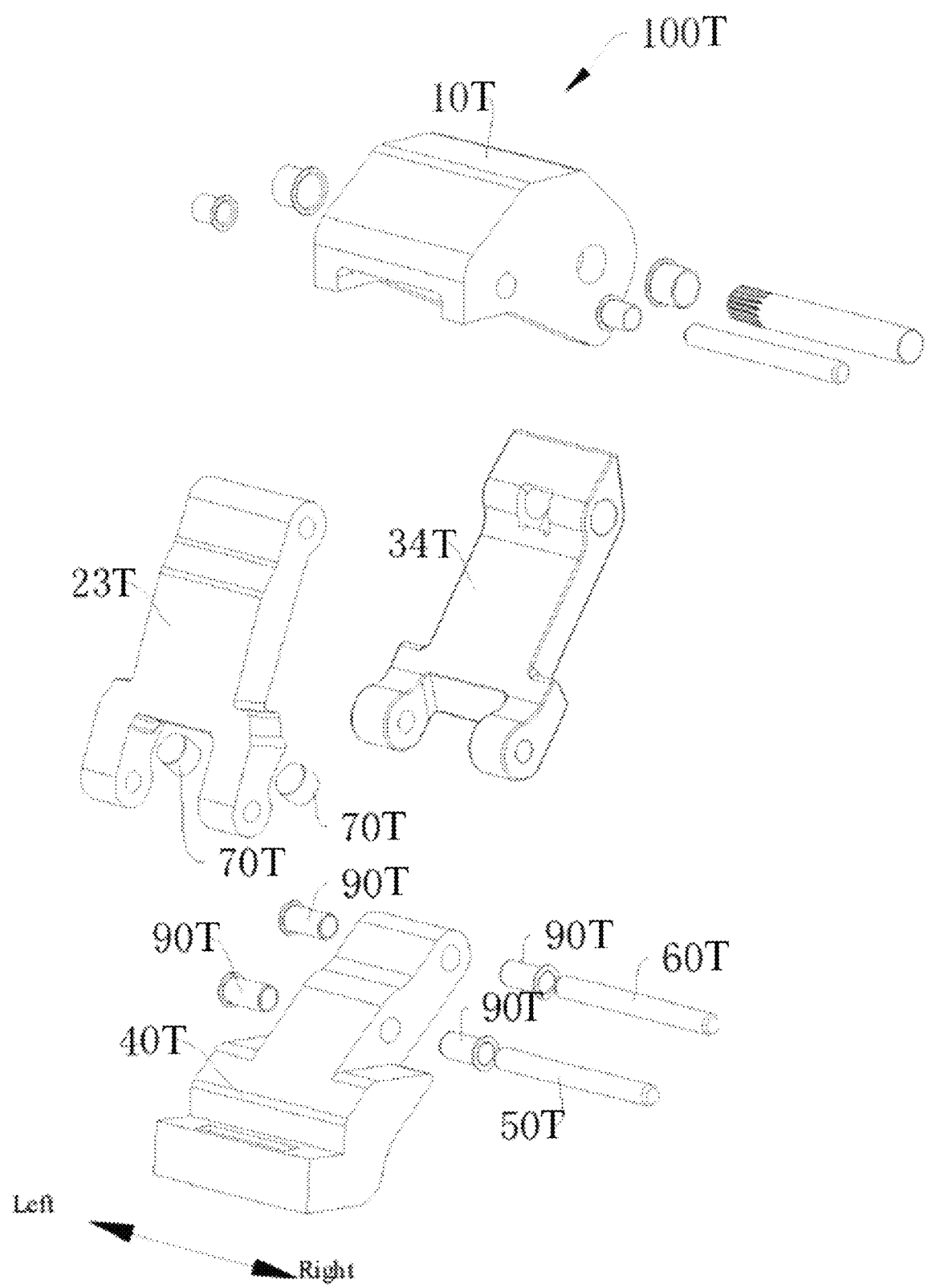
FIG. 23 is an exploded view of a drive assembly according to an embodiment of the present disclosure.
Figure 24:
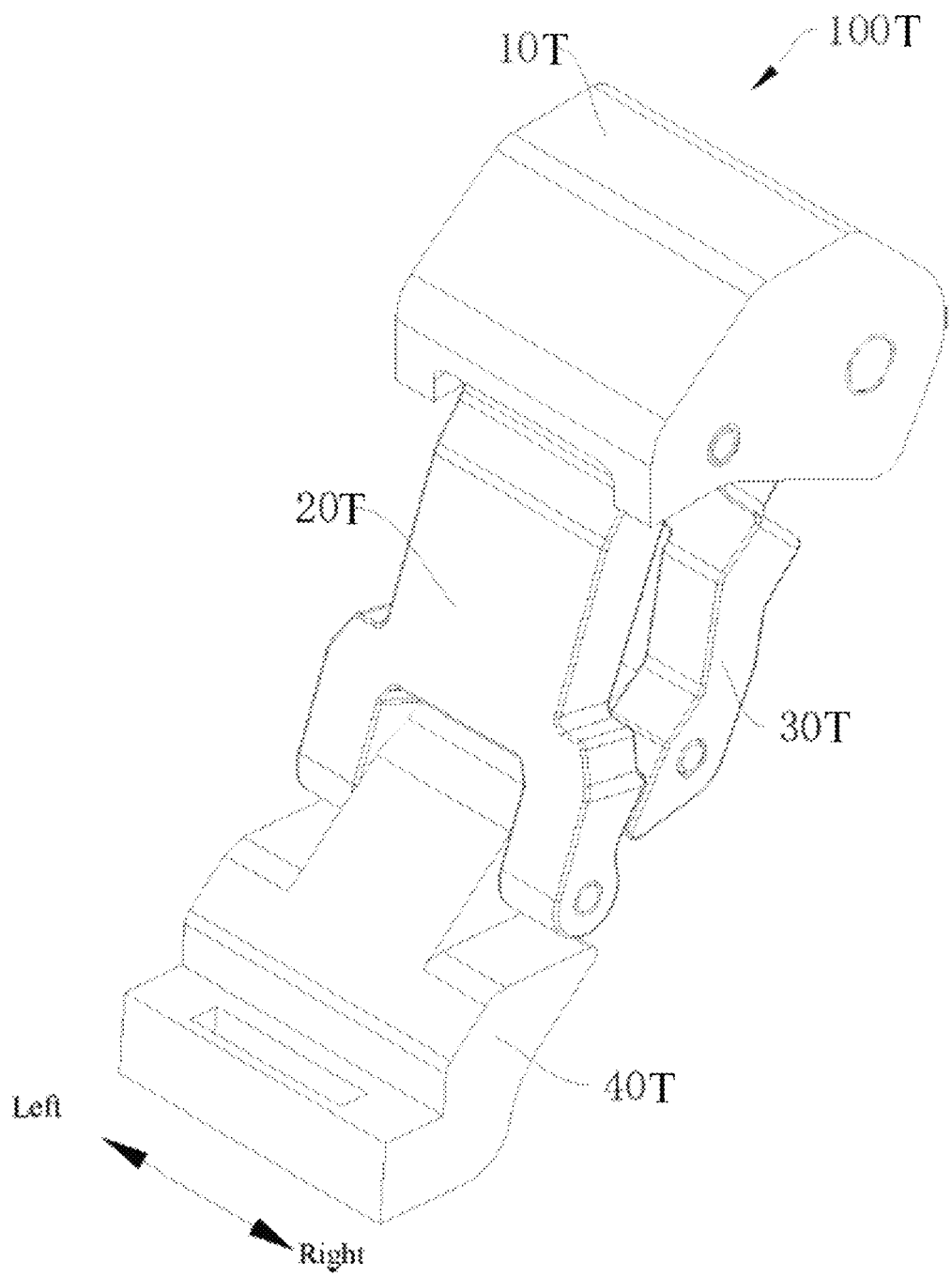
FIG. 24 is a schematic view of a drive assembly with a running board holder in an extended position according to an embodiment of the present disclosure.
Figure 25:
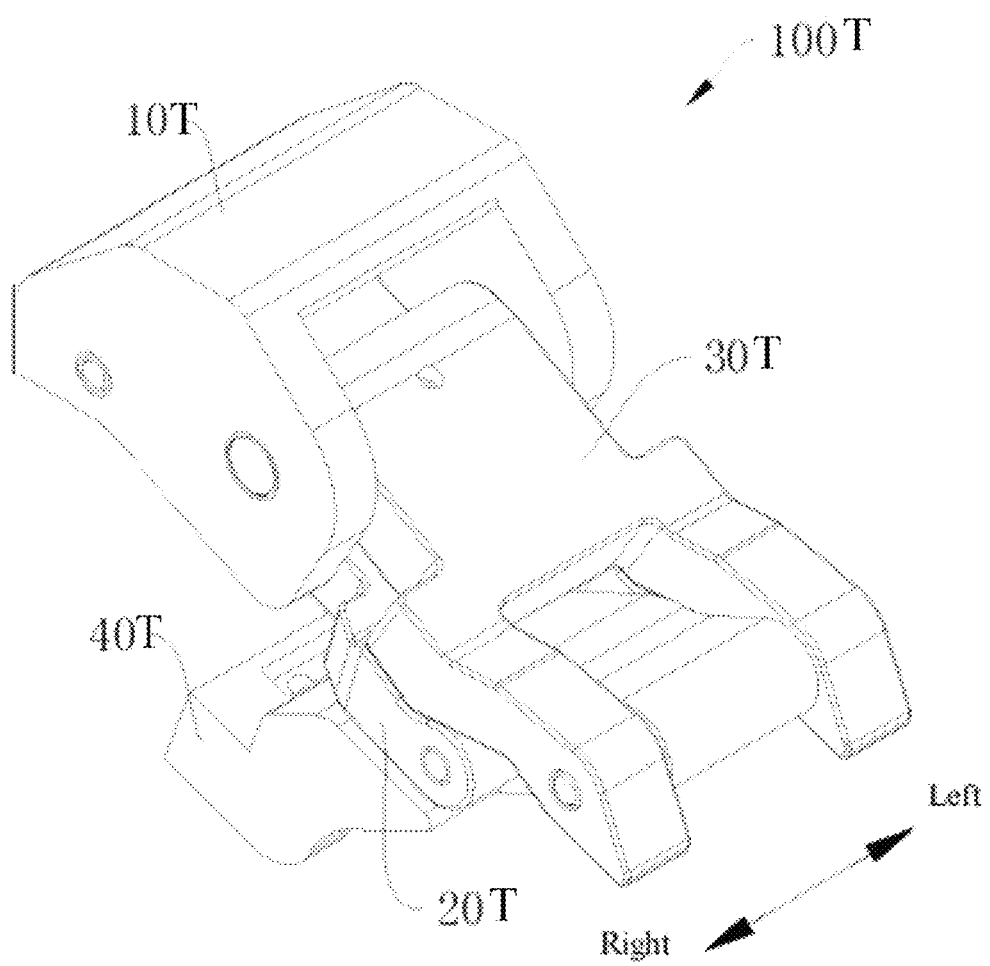
FIG. 25 is a schematic view of a drive assembly with a running board holder in a retracted position according to an embodiment of the present disclosure.
Figure 26:
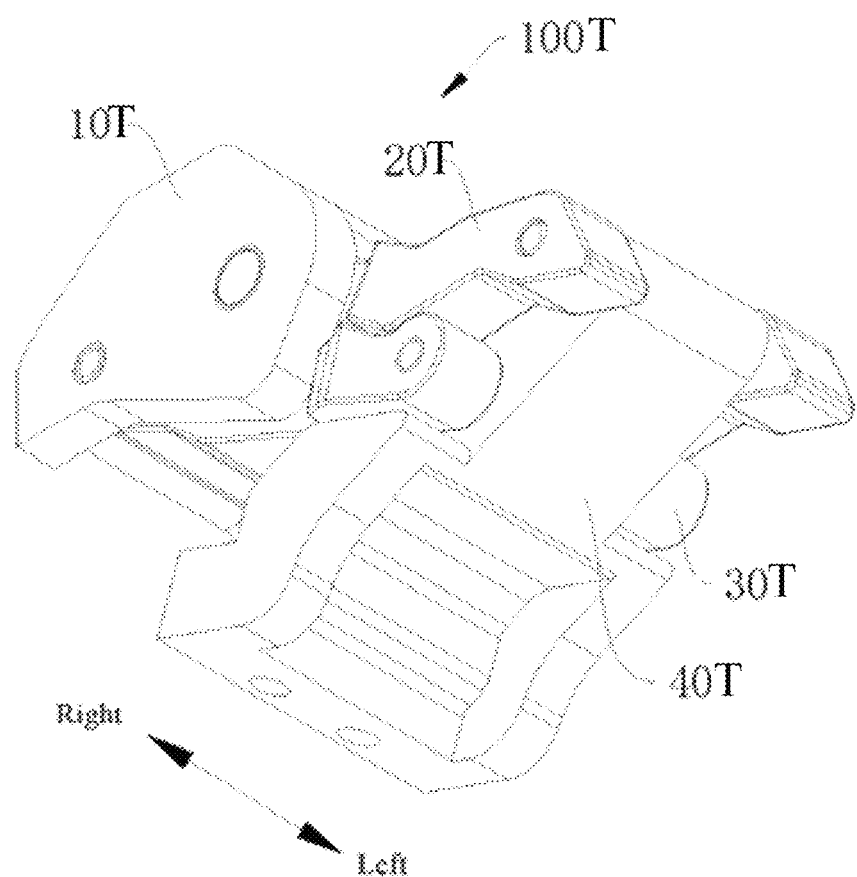
FIG. 26 is a schematic view of a drive assembly with a running board holder in a retracted position according to an embodiment of the present disclosure.
Figure 27:
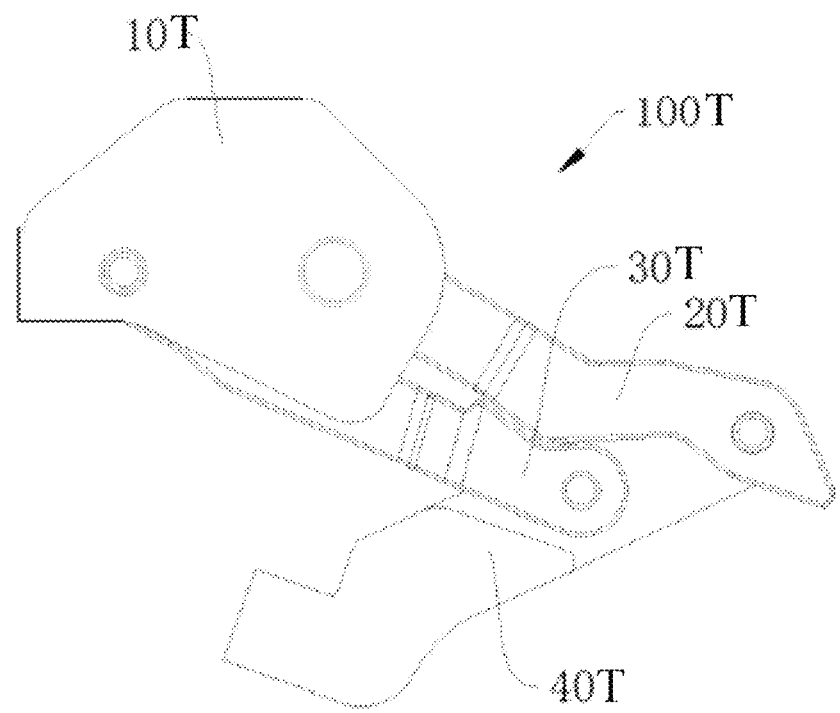
FIG. 27 is a side view of a drive assembly with a running board holder in a retracted position according to an embodiment of the present disclosure.
Figure 28:
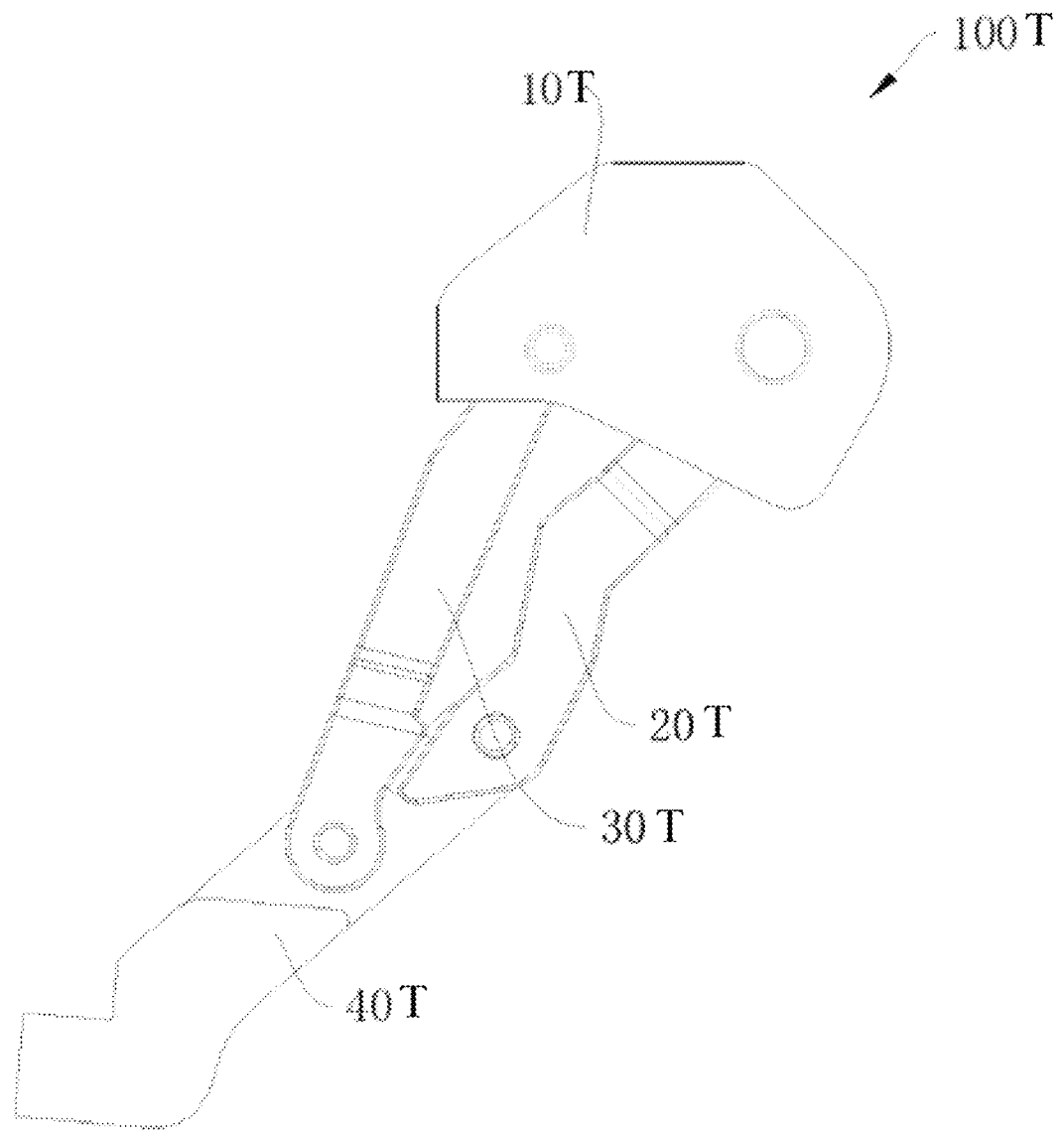
FIG. 28 is a side view of a drive assembly with a running board holder in an extended position according to an embodiment of the present disclosure.
Figure 30:
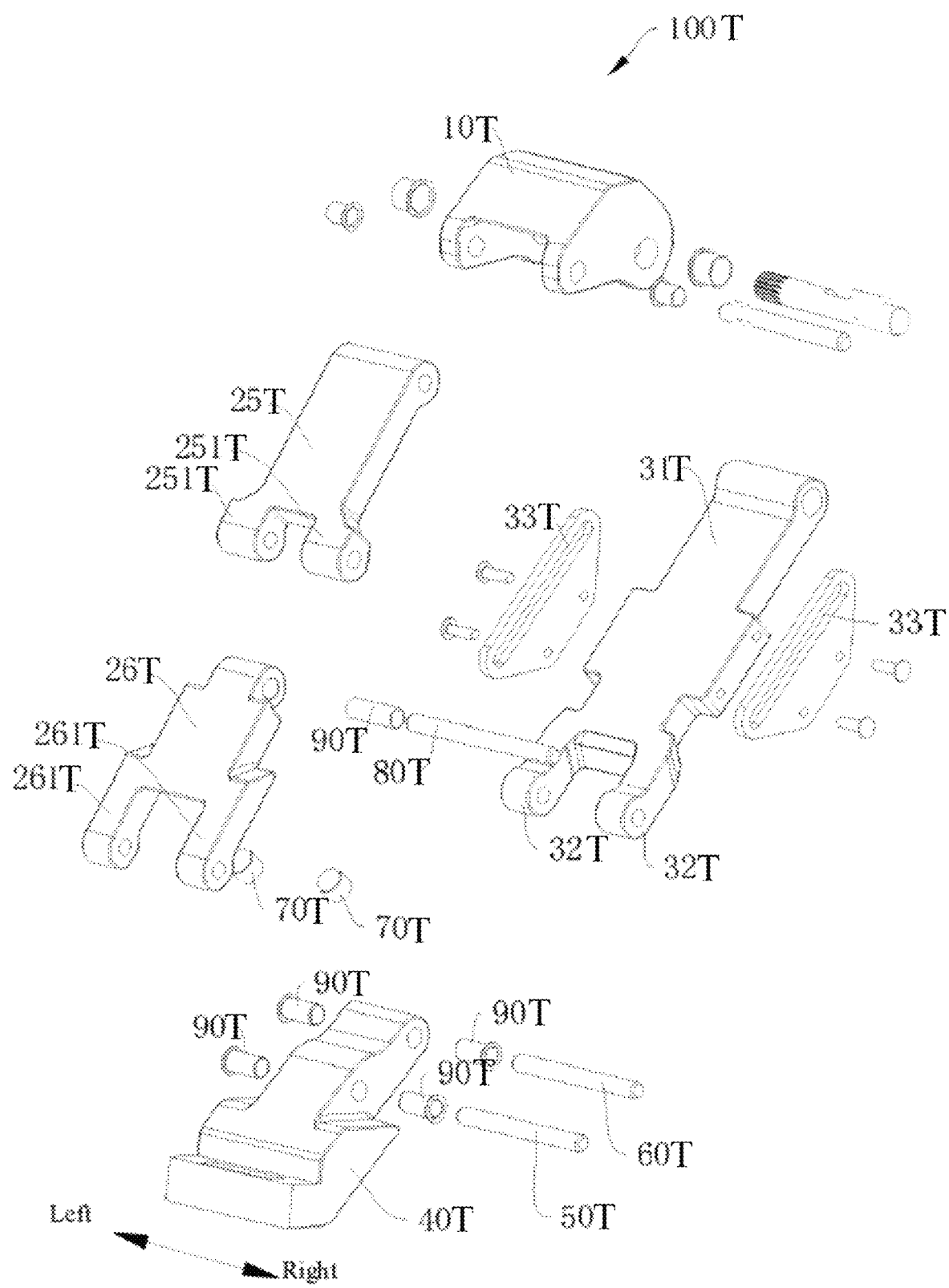
FIG. 30 is an exploded view of a drive assembly according to an embodiment of the present disclosure.
Figure 31:
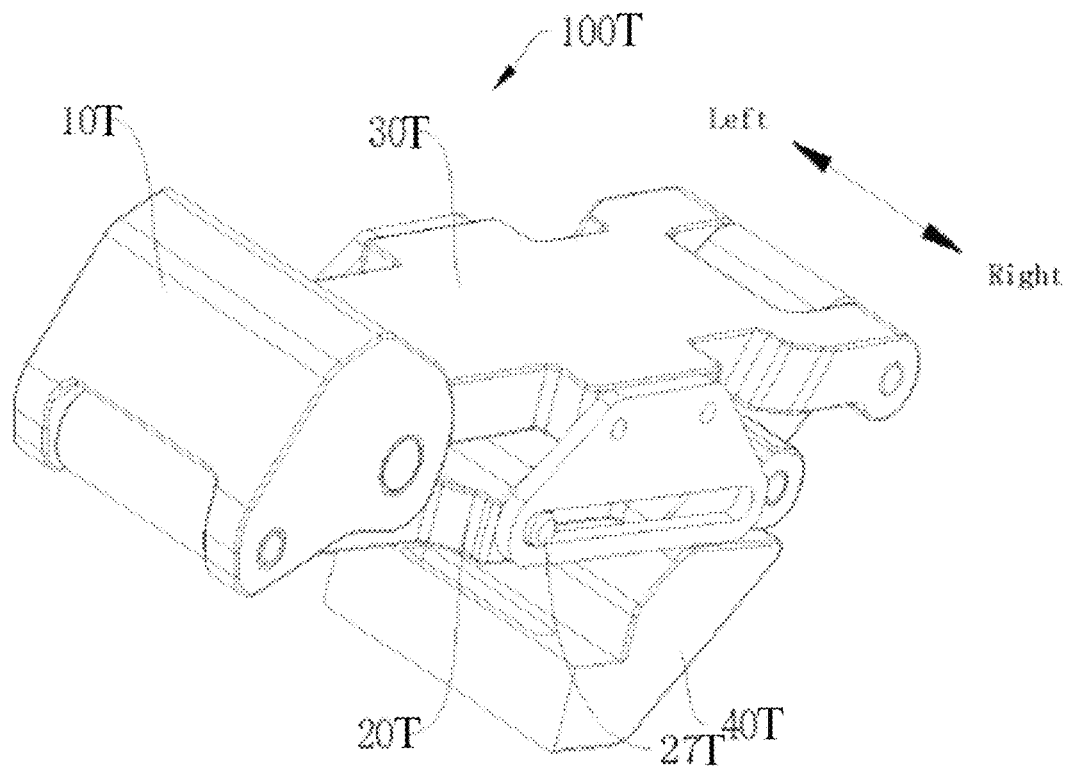
FIG. 31 is a schematic view of a drive assembly with a running board holder in a retracted position according to an embodiment of the present disclosure.
Figure 32:
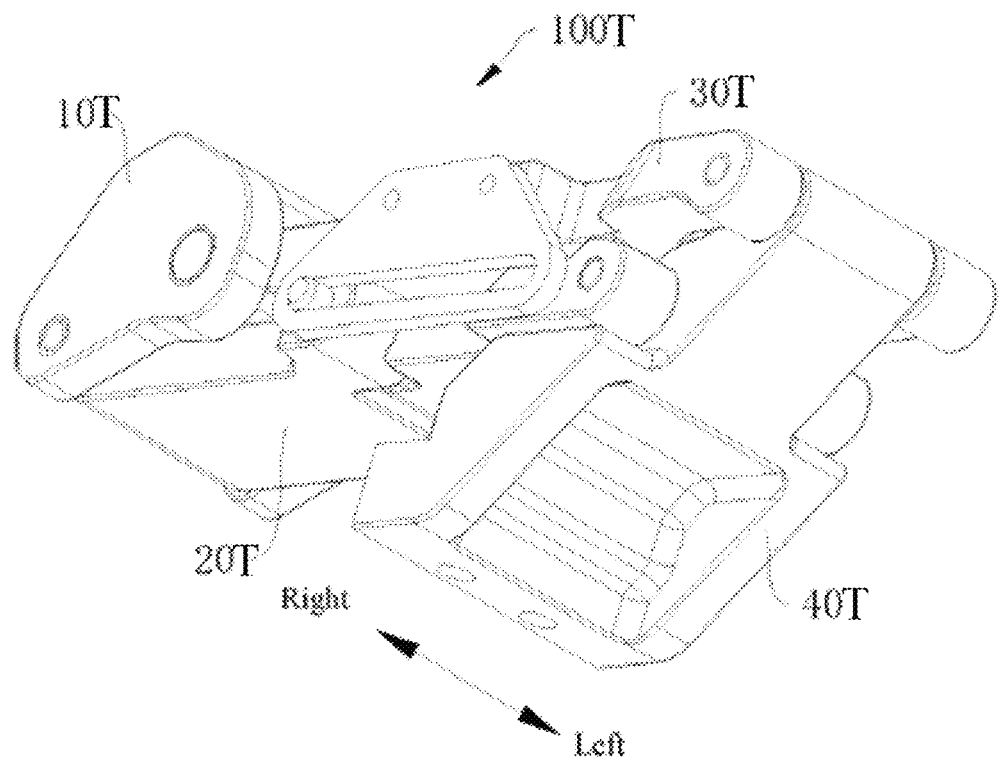
FIG. 32 is a schematic view of a drive assembly with a running board holder in a retracted position according to an embodiment of the present disclosure.
Figure 33:
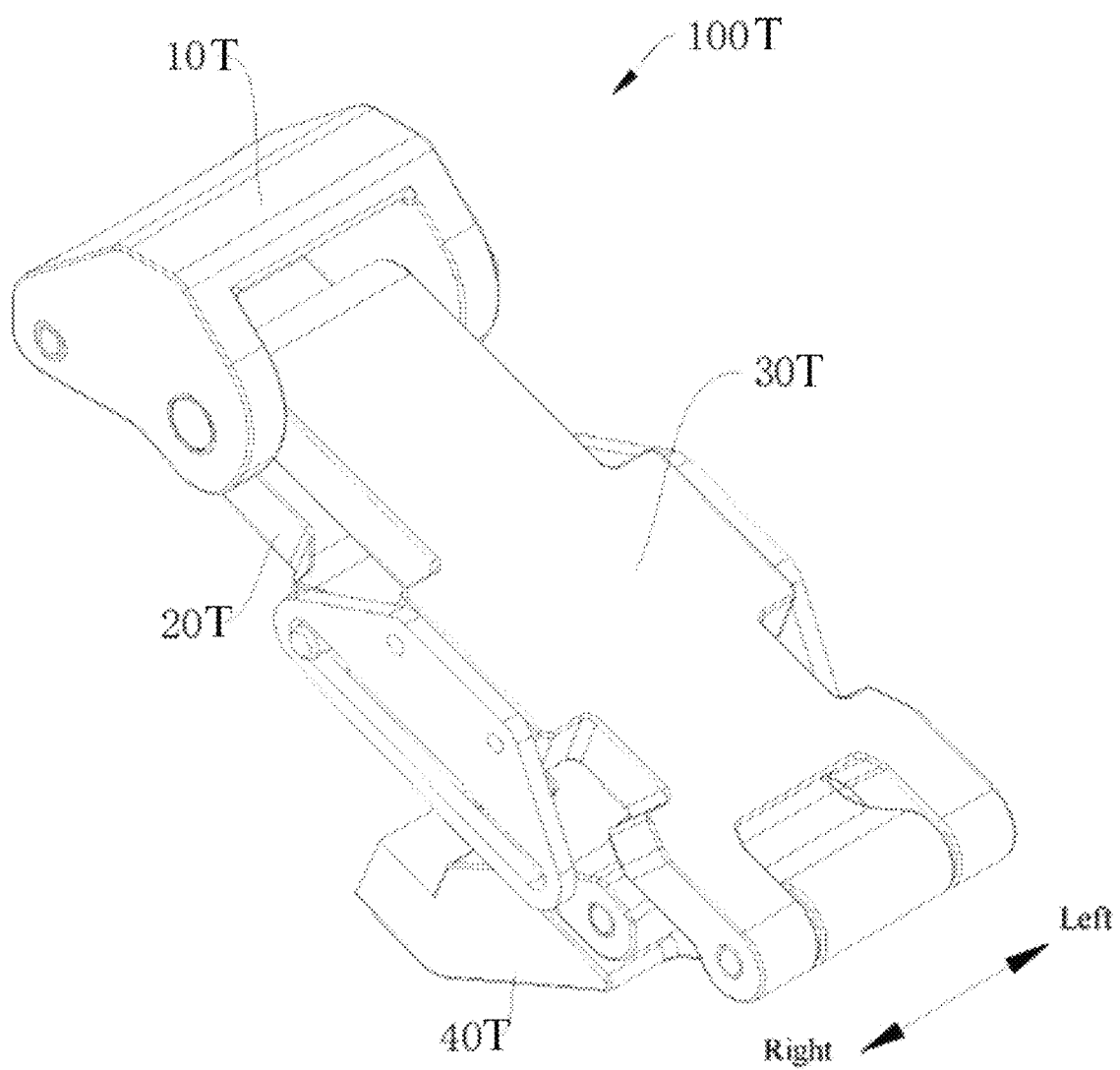
FIG. 33 is a schematic view of a drive assembly with a running board holder in a retracted position according to an embodiment of the present disclosure.
Figure 34:
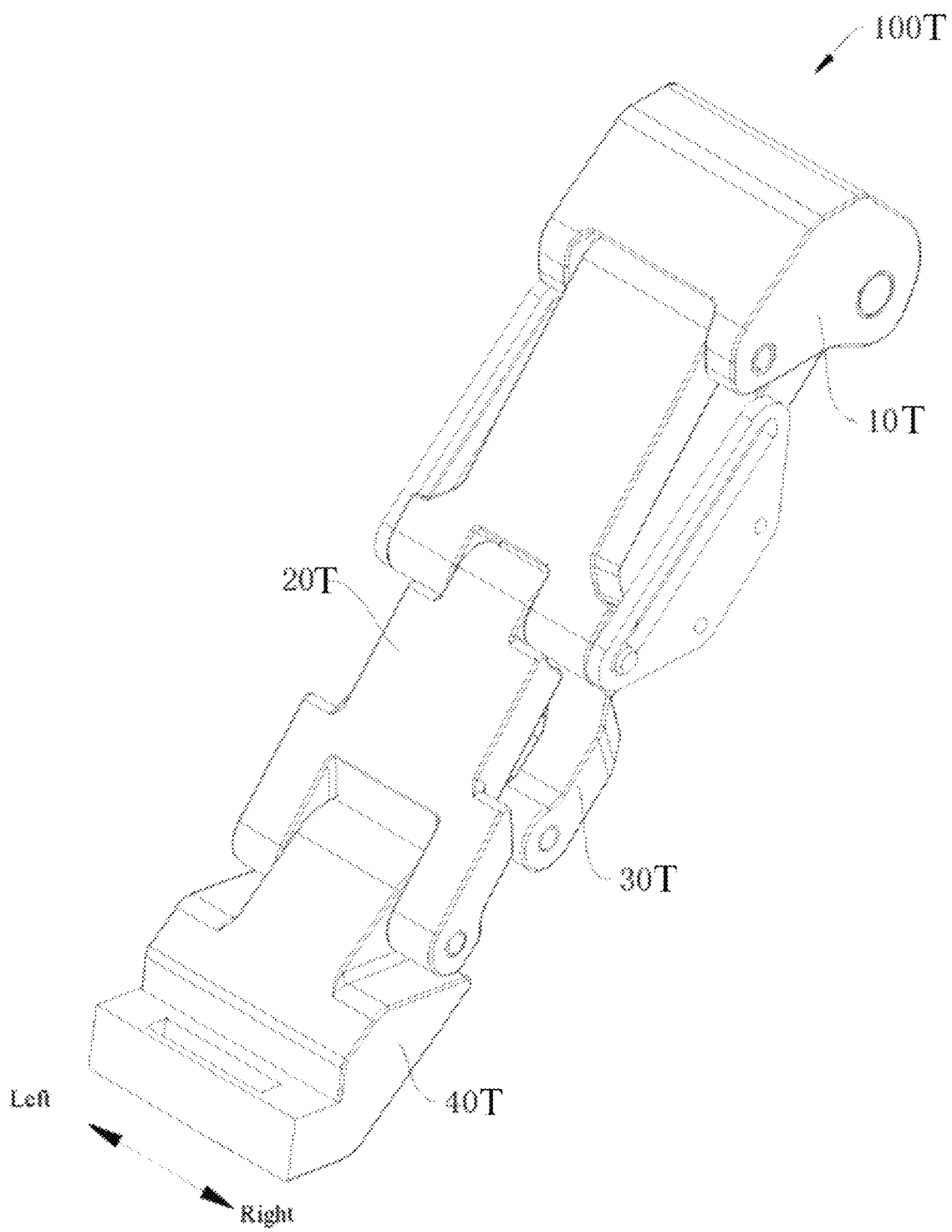
FIG. 34 is a schematic view of a drive assembly with a running board holder in an extended position according to an embodiment of the present disclosure.
Figure 35:
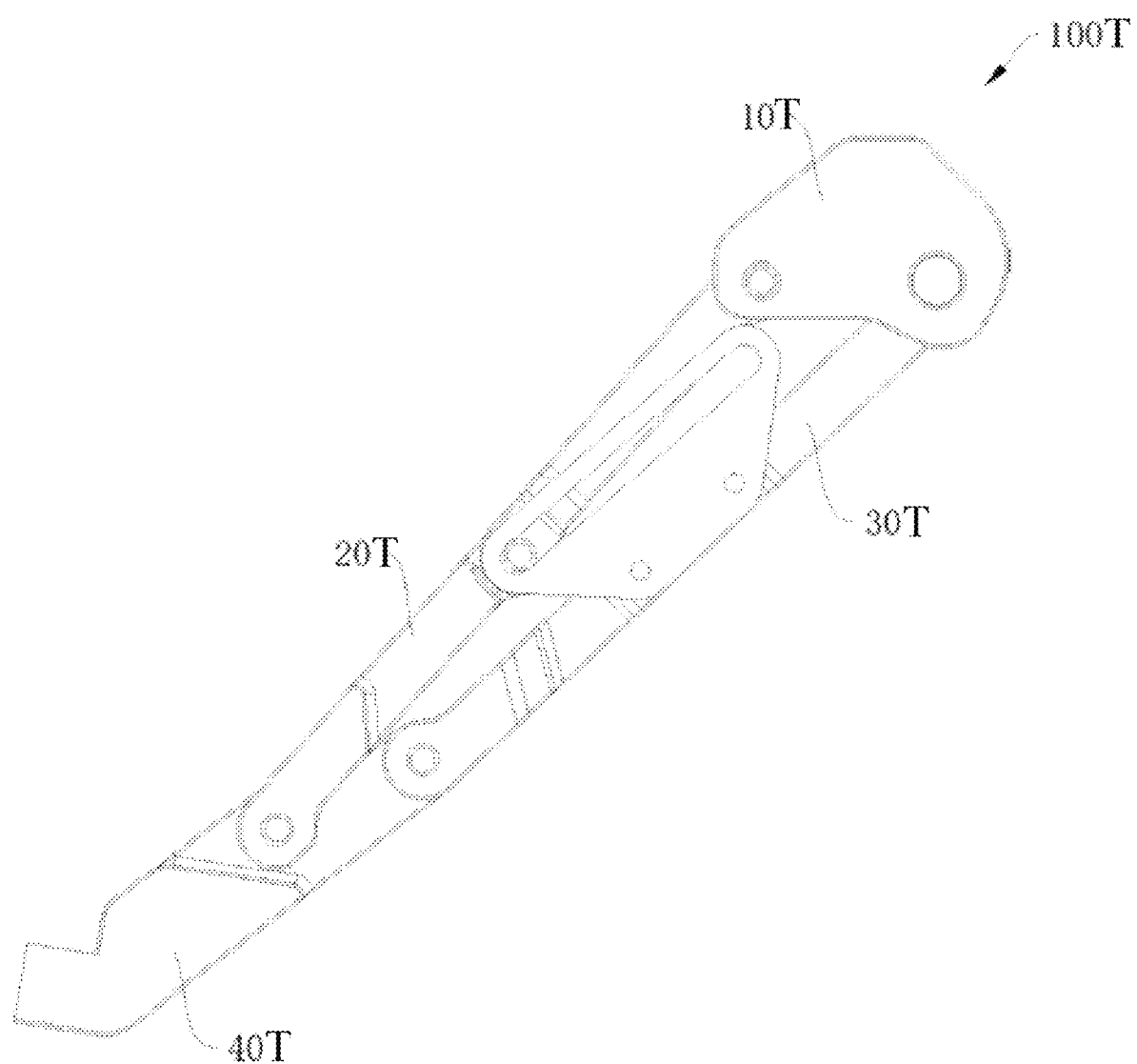
FIG. 35 is a side view of a drive assembly with a running board holder in an extended position according to an embodiment of the present disclosure.
Figure 36:
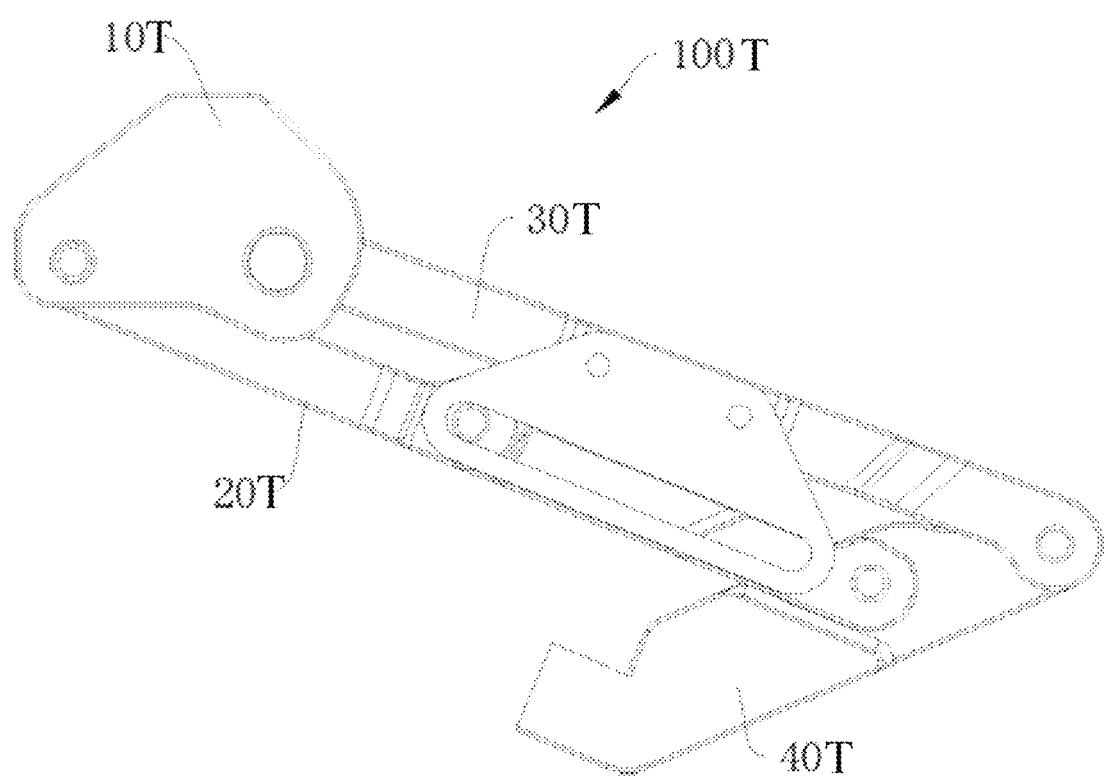
FIG. 36 is a side view of a drive assembly with a running board holder in a retracted position according to an embodiment of the present disclosure.
Figure 37:
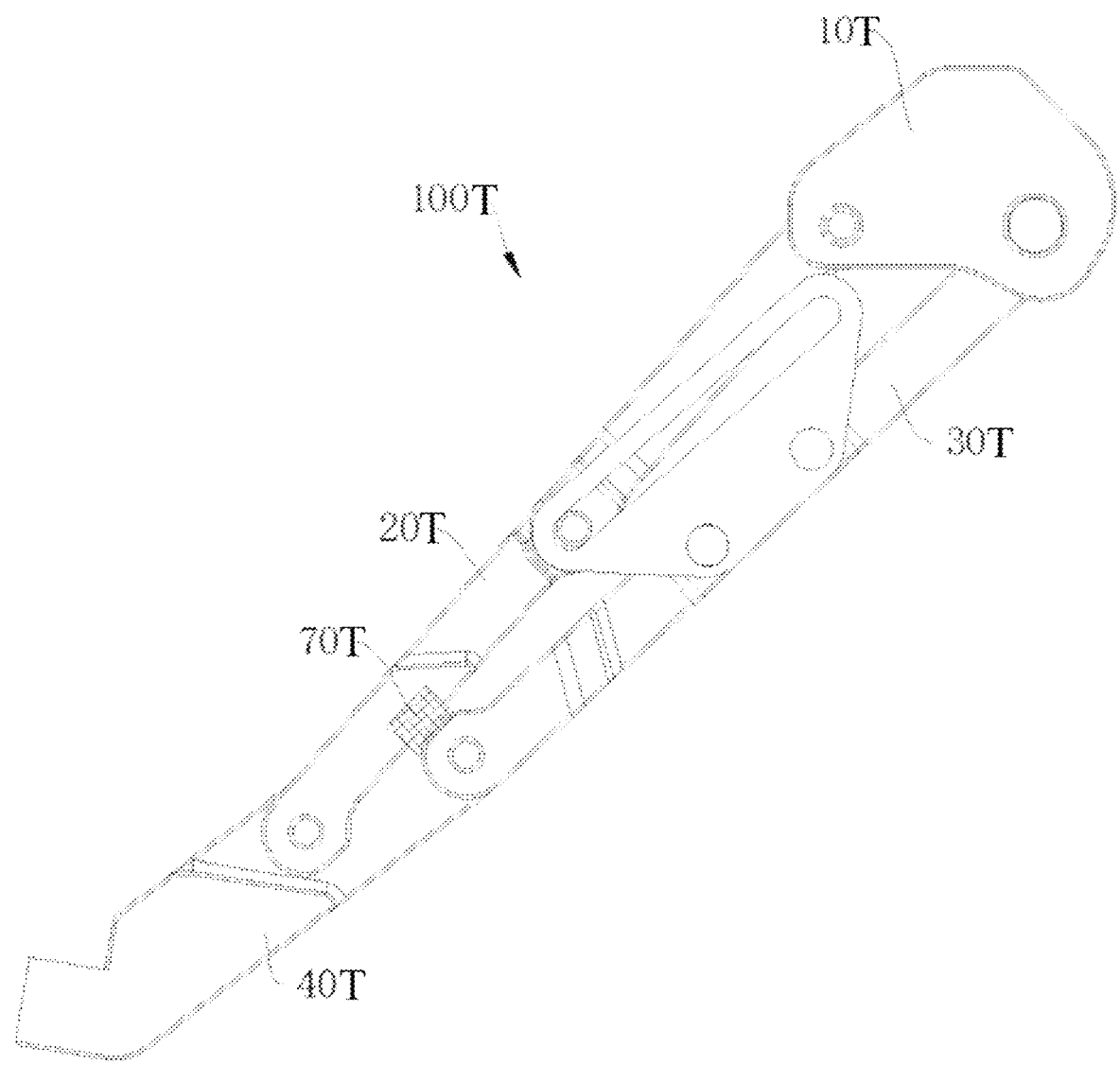
FIG. 37 is a side view of a drive assembly with a running board holder in an extended position according to an embodiment of the present disclosure.

As illustrated in FIGS. 17, 23 and 30, the drive assembly 100T for the running board 200T can generally include a mounting base 10T, a first connecting portion 20T, a second connecting portion 30T, and a running board holder 40T.

Specifically, the first connecting portion 20T is rotatably connected with the mounting base 10T and the running board holder 40T, and the second connecting portion 30T is rotatably connected with the mounting base 10T and the running board holder 40T. A central rotation shaft of the second connection portion 30T relative to the running board holder 40T, a central rotation shaft of the second connection portion 30T relative to the mounting base 10T, a central rotation shaft of the first connection portion 20T relative to the running board holder 40T, and a central rotation shaft of the first connection portion 20T relative to the mounting base 10T each extend along a left-right direction and are parallel to one another. The mounting base 10T, the first connecting portion 20T, the second connecting portion 30T and the running board holder 40T constitute a linkage to make the running board holder 40T movable between an extended position and a retracted position.

That is, the first connecting portion 20T is rotatably connected with the mounting base 10T and the running board holder 40T through the respective central rotation shafts, and the second connecting portion 30T is rotatably connected with the mounting base 10T and the running board holder 40T through the respective central rotation shafts. In other words, the mounting base 10T, the first connecting portion 20T, the second connecting portion 30T and the running board holder 40T constitute the linkage. The mounting base 10T is mounted to a vehicle body and fixed. A driving part (not illustrated) is connected with at least one of the first connecting portion 20T and the second connecting portion 30T, e.g., at least one of the first connecting portion 20T and the second connecting portion 30T is an active rod.

For example, the driving part can be connected with the first connecting portion 20T, such that the first connecting portion 20T acts as the active rod, an end of the first connecting portion 20T rotates around the mounting base 10T while the other end thereof rotates around the running board holder 40T and drives the running board holder 40T to move, and the running board holder 40T drives an end of the second connecting portion 30T to rotate around the mounting base 10T. The first connecting portion 20T can also be associated with the second connecting portion 30T, and the first connecting portion 20T and the second connecting portion 30T together drive the running board holder 40T to extend or retract.

Certainly, the above embodiment is merely illustrative, and the driving part can also be connected with the second connecting portion 30T, or the driving part can be connected with the first connecting portion 20T and the second connecting portion 30T simultaneously.

It should be understood that the running board holder 40T is mounted below a door of the vehicle, and when a passenger needs to get on or off, the running board holder 40T extends out of the vehicle body, e.g., the running board holder 40T is in the extended position, which is convenient for the passenger to get on and off the vehicle. When the vehicle is starting and traveling, the running board holder 40T is in the retracted position, that is, the running board holder 40T is retracted into the vehicle body, thus ensuring the safety of driving the vehicle.

As illustrated in FIGS. 17, 23 and 30, the running board holder 40T includes a third main body 41T and a third hinged portion 42T connected with the third main body 41T; the first connecting portion 20T includes a first main body 21T and a plurality of first hinged portions 22T connected with the first main body 21T and spaced apart in the left-right direction, in which the third hinged portion 42T is rotatably connected among the plurality of first hinged portions 22T. The second connecting portion 30T includes a second main body 31T and a plurality of second hinged portions 32T connected with the second main body 31T and spaced apart in the left-right direction, in which the third hinged portion 42T is rotatably connected among the plurality of second hinged portions 32T.

In other words, the running board holder 40T has the third main body 41T and the third hinged portion 42T; the first connecting portion 20T has the first main body 21T and the plurality of first hinged portions 22T; and the second connecting portion 30T has the second main body 31T and the plurality of second hinged portions 32T.

As illustrated in FIG. 17 in combination with FIGS. 18, 19, 20, 21 and 22, as illustrated in FIG. 23 in combination with FIGS. 24, 25, 26, 27, 28 and 29, as illustrated in FIG. 30 in combination with FIGS. 31, 32, 33, 34, 35, 36 and 37, the third hinged portion 42T is interposed among the plurality of first hinged portions 22T and the plurality of second hinged portions 32T. For example, two first hinged portions 22T are provided and spaced apart in the left-right direction, and the third hinged portion 42T is sandwiched between the two first hinged portions 22T that are spaced apart from each other in the left-right direction. Alternatively, two second hinged portions 32T are provided and spaced apart in the left-right direction, and the third hinged portion 42T is sandwiched between the two second hinged portions 32T that are spaced apart from each other in the left-right direction. Alternatively, the third hinged portion 42T is simultaneously sandwiched between the first hinged portions 22T spaced apart along the left-right direction and between the second hinged portions 32T spaced apart along the left-right direction.

Certainly, the above embodiment is merely illustrative, and for example, three or more first hinged portions 22T and three or more second hinged portions 32T can be provided.

It could be understood that the third hinged portion 42T is wrapped by the first hinged portions 22T and the second hinged portions 32T, in which case the first hinged portion 22T and the second hinged portion 32T have a relatively large width in the left-right direction and increased structural strength. In addition, the first hinged portion 22T and the second hinged portion 32T are tightly fitted with the third hinged portion 42T, and a contact area of the third hinged portion 42T with the first hinged portion 22T and the second hinged portion 32T is enlarged, so that the reliability of the connection thereof is further improved.

Moreover, the third hinged portion 42T is wrapped by the first hinged portion 22T and the second hinged portion 32T to prevent the intrusion of mud, sand or the like, avoid the wear and abnormal noise of the hinged portions due to the mud and sand, and prolong the service life of the drive assembly 100T.

Since the drive assembly 100T for the running board 200T according to the embodiments of the present disclosure forms the linkage, and the third hinged portion 42T is interposed among the plurality of first hinged portions 22T and the plurality of second hinged portions 32T, the drive assembly 100T has a simple structure, high strength, low cost and long service life.

In some embodiments, as illustrated in FIG. 17 in combination with FIGS. 18, 19, 20, 21 and 22, as illustrated in FIG. 23 in combination with FIGS. 24, 25, 26, 27, 28 and 29, as illustrated in FIG. 30 in combination with FIGS. 31, 32, 33, 34, 35, 36 and 37, a first end of the first main body 21T is rotatably connected with the mounting base 10T, while a second end of the first main body 21T is provided with two first hinged portions 22T spaced apart along the left-right direction; the two first hinged portions 22T are disposed at two sides of the third hinged portion 42T, and the third hinged portion 42T is connected with the two first hinged portions 22T by a first connecting shaft 50T. That is, two ends of the first connecting portion 20T are rotatably connected with the mounting base 10T and the running board holder 40T respectively. The first end of the first main body 21T is connected with the mounting base 10T, and the two first hinged portions 22T are spaced apart and provided at the second end of the first main body 21T; the first hinged portions 22T and the third hinged portion 42T are rotatably connected through the first connecting shaft 50T. Thus, the third hinged portion 42T is wrapped between the two first hinged portions 22T to prevent the intrusion of mud, sand or the like, avoid the wear and abnormal noise of the hinged portions due to the mud and sand, and prolong the service life of the drive assembly 100T.

In some embodiments, as illustrated in FIG. 17 in combination with FIGS. 18, 19, 20, 21 and 22, as illustrated in FIG. 23 in combination with FIGS. 24, 25, 26, 27, 28 and 29, as illustrated in FIG. 30 in combination with FIGS. 31, 32, 33, 34, 35, 36 and 37, a first end of the second main body 31T is rotatably connected with the mounting base 10T, while a second end of the second main body 31T is provided with two second hinged portions 32T spaced apart along the left-right direction; the two second hinged portions 32T are disposed at two sides of the third hinged portion 42T, and the third hinged portion 42T is connected with the two second hinged portions 32T by a second connecting shaft 60T. That is, two ends of the second connecting portion 30T are rotatably connected with the mounting base 10T and the running board holder 40T respectively. The first end of the second main body 31T is connected with the mounting base 10T, and the two second hinged portions 32T are spaced apart and provided at the second end of the second main body 31T; the second hinged portions 32T and the third hinged portion 42T are rotatably connected through the second connecting shaft 60T. Thus, the third hinged portion 42T is wrapped between the two second hinged portions 32T to prevent the intrusion of mud, sand or the like, avoid the wear and abnormal noise of the hinged portions due to the mud and sand, and prolong the service life of the drive assembly 100T.

In some optional embodiments, as illustrated in FIGS. 17, 23, 30 and 38, at least one of the first connecting portion 20T and the running board holder 40T is provided with a damping block 70T, and the damping block 70T abuts between the first connecting portion 20T and the running board holder 40T when the running board holder 40T is in at least one of the extended position and the retracted position. The damping block 70T plays a cushioning role to prevent the first connecting portion 20T from directly colliding with the running board holder 40T, and avoid vibration and damage of the first connecting portion 20T and the running board holder 40T due to collision, such that the drive assembly 100T operates stably and the service life of the drive assembly 100T is prolonged. The damping block 70T can be provided to the first connecting portion 20T, or the damping block 70T can be provided to the running board holder 40T, or the damping block 70T can be simultaneously provided to the first connecting portion 20T and the running board holder 40T. Further, the damping block 70T can abut between the first connecting portion 20T and the running board holder 40T when the running board holder 40T is in the extended position; the damping block 70T can abut between the first connecting portion 20T and the running board holder 40T also when the running board holder 40T is in the retracted position; the damping block 70T can also abut between the first connecting portion 20T and the running board holder 40T when the running board holder 40T is in the extended position or the retracted position. Additionally, one, or two or more damping blocks 70T can be provided.

The damping block 70T functions as a cushion to prevent the second connecting portion 30T from directly colliding with the running board holder 40T and avoid vibration and damage of the second connecting portion 30T and the running board holder 40T due to collision, such that the drive assembly 100T operates stably and the service life of the drive assembly 100T is prolonged. The damping block 70T can be provided to the second connecting portion 30, or the damping block 70T can be provided to the running board holder 40T, or the damping block 70T can be simultaneously provided to the second connecting portion 30T and the running board holder 40T. Further, the damping block 70T can abut between the second connecting portion 30T and the running board holder 40T when the running board holder 40T is in the extended position; the damping block 70T can abut between the second connecting portion 30T and the running board holder 40T also when the running board holder 40T is in the retracted position; the damping block 70T can also abut between the second connecting portion 30T and the running board holder 40T when the running board holder 40T is in the extended position or the retracted position. Additionally, one, or two or more damping blocks 70T can be provided.

In some optional embodiments, as illustrated in FIGS. 17, 23, 29, 30, 37 and 38, at least a part of the plurality of first hinged portions 22T is provided with the damping block 70T. That is, at least one of the plurality of first hinged portions 22T is provided with the damping block 70T. For example, two first hinged portions 22T are provided at an end of the first main body 21T and spaced apart in the left-right direction, and the damping block 70T can be provided to one of the first hinged portions 22T or can be simultaneously provided to both of the first hinged portions 22T.

Further, as illustrated in FIG. 17 in combination with FIGS. 18, 19, 20, 21 and 22, as illustrated in FIG. 23 in combination with FIGS. 24, 25, 26, 27, 28 and 29, as illustrated in FIG. 30 in combination with FIGS. 31, 32, 33, 34, 35, 36 and 37, the third main body 41T is provided with a wedged bevel 411T opposite the first hinged portion 22T, and when the running board holder 40T is in the extended position, the damping block 70T abuts against the wedged bevel 411T. It could be understood that the first connecting portion 20T rotates relative to the running board holder 40T, and the contact between the damping block 70T and the wedged bevel 411T is facilitated by providing the third main body 41T with the wedged bevel 411T opposite the first hinged portion 22T, such that the damping block 70T can have a larger contact area with the wedged bevel 411T, thereby improving a damping effect. Preferably, when the running board holder 40T is in the extended position, the damping block 70T abuts against and is in vertical contact with the wedged bevel 411T, such that the damping block 70T has good mechanical behavior and a prolonged service life.

Figure 38:
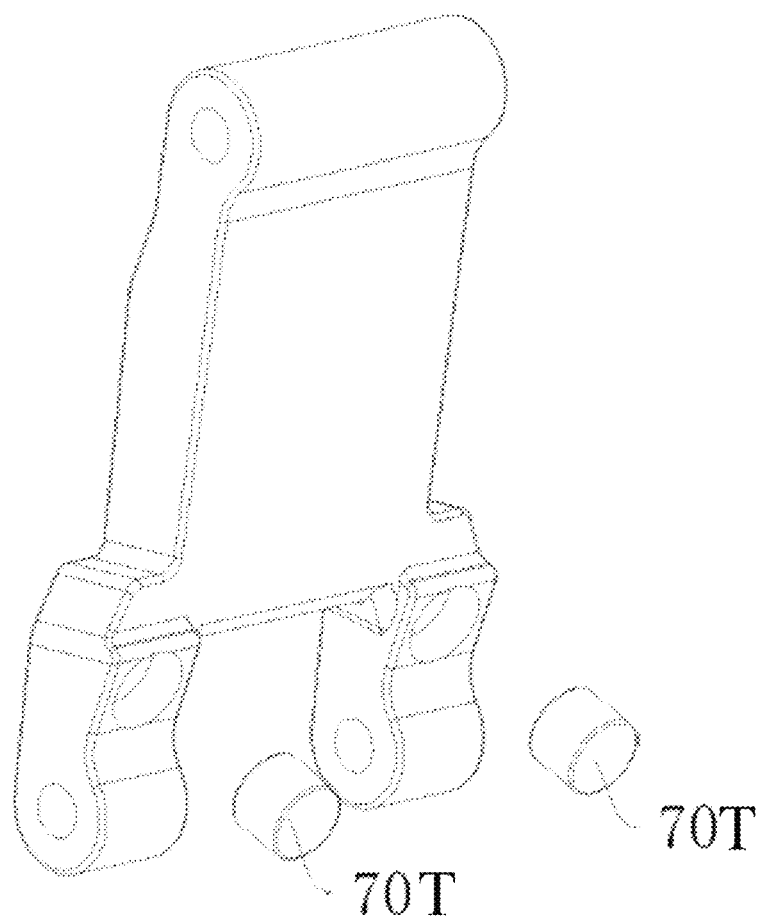
FIG. 38 is a schematic view of a connecting portion assembled with a damping block according to an embodiment of the present disclosure.
Figure 39:
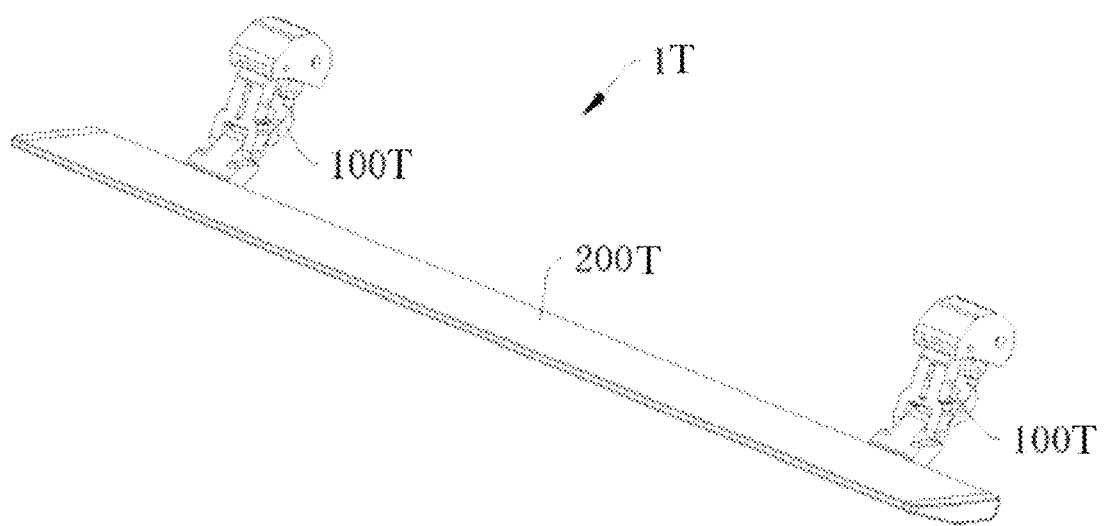
FIG. 39 is a schematic view of a running board assembly according to an embodiment of the present disclosure.

As illustrated in FIG. 38, a side of the first hinged portion 22T or the second hinged portion 32T facing the wedged bevel 411T has a groove, and the damping block 70T is accommodated in the groove. The groove functions to position the damping block 70T and enable the damping block 70T to be stably mounted to the first hinged portion 22T or the second hinged portion 32T.

In some specific embodiments, as illustrated in FIG. 17 in combination with FIGS. 18, 19, 20, 21 and 22, as illustrated in FIG. 23 in combination with FIGS. 24, 25, 26, 27, 28 and 29, as illustrated in FIG. 30 in combination with FIGS. 31, 32, 33, 34, 35, 36 and 37, two first hinged portions 22T are provided and spaced apart in the left-right direction, and each of the first hinged portions 22T is provided with the damping block 70T; the third main body 41T is provided with the wedged bevel 411T at each of left and right sides of the third hinged portion 42T, and the two wedged bevels 411T are provided in one-to-one correspondence with the two first hinged portions 22T; and when the running board holder 40T is in the extended position, the damping blocks 70T on the two first hinged portions 22T abut against the corresponding wedged bevels 411T. As a result, when the running board holder 40T is in the extended position, the damping blocks 70T at the left and right sides abut against the corresponding wedged bevels 411T respectively, which leads to good balance and enhances a cushioning effect.

In some embodiments of the present disclosure, as illustrated in FIG. 23 in combination with FIGS. 24, 25, 26, 27, 28 and 29, the first connecting portion 20T is configured as a first link rod 23T with two ends connected with the mounting base 10T and the running board holder 40T respectively. The second connecting portion 30T is configured as a second link rod 34T with two ends connected with the mounting base 10T and the running board holder 40T respectively. That is, the drive assembly 100T is a four-bar linkage, and the drive assembly 100T has a simple structure and low cost.

In some embodiments of the present disclosure, as illustrated in FIG. 17 in combination with FIGS. 18, 19, 20, 21 and 22, as illustrated in FIG. 30 in combination with FIGS. 31, 32, 33, 34, 35, 36 and 37, the first connecting portion 20T includes a third link rod 25T, a fourth link rod 26T, and a support portion. The third link rod 25T is rotatably connected with the mounting base 10T; two ends of the fourth link rod 26T are rotatably connected with the third link rod 25T and the running board holder 40T respectively; the support portion is connected at a hinge joint of the third link rod 25T and the fourth link rod 26T; and the support portion is connected with the second connecting portion 30T. As a result, the drive assembly 100T forms a five-bar linkage or a six-bar linkage. The driving part is connected with the third link rod 25T, that is, the third link rod 25T is an active rod, and an end of the third link rod 25T is rotated around the mounting base 10T under the driving of the driving part, and the other end of the third link rod 25T drives the support portion and the fourth link rod 26T to move. The fourth link rod 26T drives the running board holder 40T to move while the support portion drives an end of the second connecting portion 30T to rotate around the mounting base 10T, and the other end of the second connecting portion 30T drives the running board holder 40T to move. In other words, under the cooperation of the fourth link rod 26T and the second connecting portion 30T, the running board holder 40T can be extended and retracted. It could be understood that the running board holder 40T is used to support the running board 200T. When there is a passenger stepping on the running board 200T, the running board holder 40T needs to have some load-bearing capacity, and the running board holder 40T needs to keep stable when bearing the load. With the linkage configured as the five-bar linkage or the six-bar linkage, the structure of the drive mechanism is stable on the one hand, and the load-bearing capacity of the drive mechanism is enhanced on the other hand.

In some embodiments of the present disclosure, as illustrated in FIG. 30 in combination with FIGS. 31, 32, 33, 34, 35, 36 and 37, the support portion is a sliding block 27T, the second connecting portion 30T is provided with a sliding groove 33T, and the support portion is slidably embedded in the sliding groove 33T along a direction perpendicular to the left-right direction. Thus, the drive assembly 100T forms a five-bar linkage. It could be understood that the sliding groove 33T has a guiding effect on the movement of the sliding block 27T, such that the third link rod 25T, the fourth link rod 26T and the second connecting portion 30T as well as the running board holder 40T all move along a predetermined trajectory, the movement of the first connecting portion 20T is associated with that of the second connecting portion 30T, and under the cooperation of the fourth link rod 26T and the second connecting portion 30T, the running board holder 40T can be extended and retracted.

In some other specific embodiments, as illustrated in FIG. 17 in combination with FIGS. 18, 19, 20, 21 and 22, the support portion is a fifth link rod 28T, and an end of the fifth link rod 28T is rotatably connected at the hinge joint of the third link rod 25T and the fourth link rod 26T while the other end of the fifth link rod 28T is rotatably connected with the second connecting portion 30T. Thus, the drive assembly 100T forms a six-bar linkage. The driving part is connected with the third link rod 25T, that is, the third link rod 25T is an active rod, and an end of the third link rod 25T is rotated around the mounting base 10T under the driving of the driving part, and the other end of the third link rod 25T drives the fifth link rod 28T and the fourth link rod 26T to move. The fourth link rod 26T drives the running board holder 40T to move while the fifth link rod 28T drives an end of the second connecting portion 30T to rotate around the mounting base 10T, and the other end of the second connecting portion 30T drives the running board holder 40T to move. As a result, the third link rod 25T, the fourth link rod 26T, the fifth link rod 28T and the second connecting portion 30T as well as the running board holder 40T all move along a predetermined trajectory, the movement of the first connecting portion 20T is associated with that of the second connecting portion 30T, and under the cooperation of the fourth link rod 26T and the second connecting portion 30T, the running board holder 40T can be extended and retracted.

In some optional embodiments, as illustrated in FIG. 17 in combination with FIGS. 18, 19, 20, 21 and 22, as illustrated in FIG. 30 in combination with FIGS. 31, 32, 33, 34, 35, 36 and 37, the third link rod 25T includes two fourth hinged portions 251T spaced apart in the left-right direction; the fourth link rod 26T includes a fifth hinged portion 261T; the two fourth hinged portions 251T are disposed at left and right sides of the fifth hinged portion 261T; and the fifth hinged portion 261T and the two fourth hinged portions 251T are connected by a third connecting shaft 80T.

In other words, the fourth link rod 26T has the fifth hinged portion 261T, and the third link rod 25T has the two fourth hinged portions 251T, in which the fifth hinged portion 261T is sandwiched between the two fourth hinged portions 251T.

It could be understood that the fifth hinged portion 261T is wrapped by the fourth hinged portions 251T, in which case the fourth hinged portion 251T has a relatively large width in the left-right direction, and the structural strength of the fourth hinged portion 251T is enhanced. In addition, the fifth hinged portion 261T and the fourth hinged portion 251T are tightly fitted, and a contact area of the fifth hinged portion 261T with the fourth hinged portion 251T is enlarged, so that the reliability of the connection thereof is further improved.

Moreover, the fifth hinged portion 261T is wrapped by the two fourth hinged portions 251T to prevent the intrusion of mud, sand or the like, avoid the wear and abnormal noise of the hinged portions due to the mud and sand, and prolong the service life of the drive assembly 100T.

In some embodiments, two ends of the third connecting shaft 80T protrude from the two fourth hinged portions 251T to form or connect the support portion. The third connecting shaft 80T protrude from both ends of the fourth hinged portion 251T along the left-right direction, so that a part of the third connecting shaft 80T protruding from both ends of the fourth hinged portion 251T can serve as the sliding block 27T. The sliding block 27T is fitted with the sliding groove 33T in the second connecting portion 30T and moves along the sliding groove 33T, which simplifies the structure and facilitates the assembling. In addition, the part of the third connecting shaft 80T protruding from both ends of the fourth hinged portion 251T can also facilitate the connection of the fifth link rod 28T.

Preferably, as illustrated in FIGS. 17, 23 and 30, a sleeve 90T is provided between the first connecting shaft 50T and the first hinged portion 22T, and the sleeve 90T has an interference fit with the first connecting shaft 50T and the first hinged portion 22T. A sleeve 90T is provided between the second connecting shaft 60T and the second hinged portion 32T, and provided between the third connecting shaft 80T and the fourth hinged portion 251T, and the sleeve 90T has an interference fit with the third connecting shaft 80T and the fourth hinged portion 251T. The sleeve 90T functions to protect the connecting shafts and the hinged portions, and additionally, the interference fit can prevent mud and sand from entering from the outside through a gap among the sleeve, the hinged portions and the connecting shafts, reduce wear and tear, and prolong the service life of the drive assembly 100T.

Figure 29:
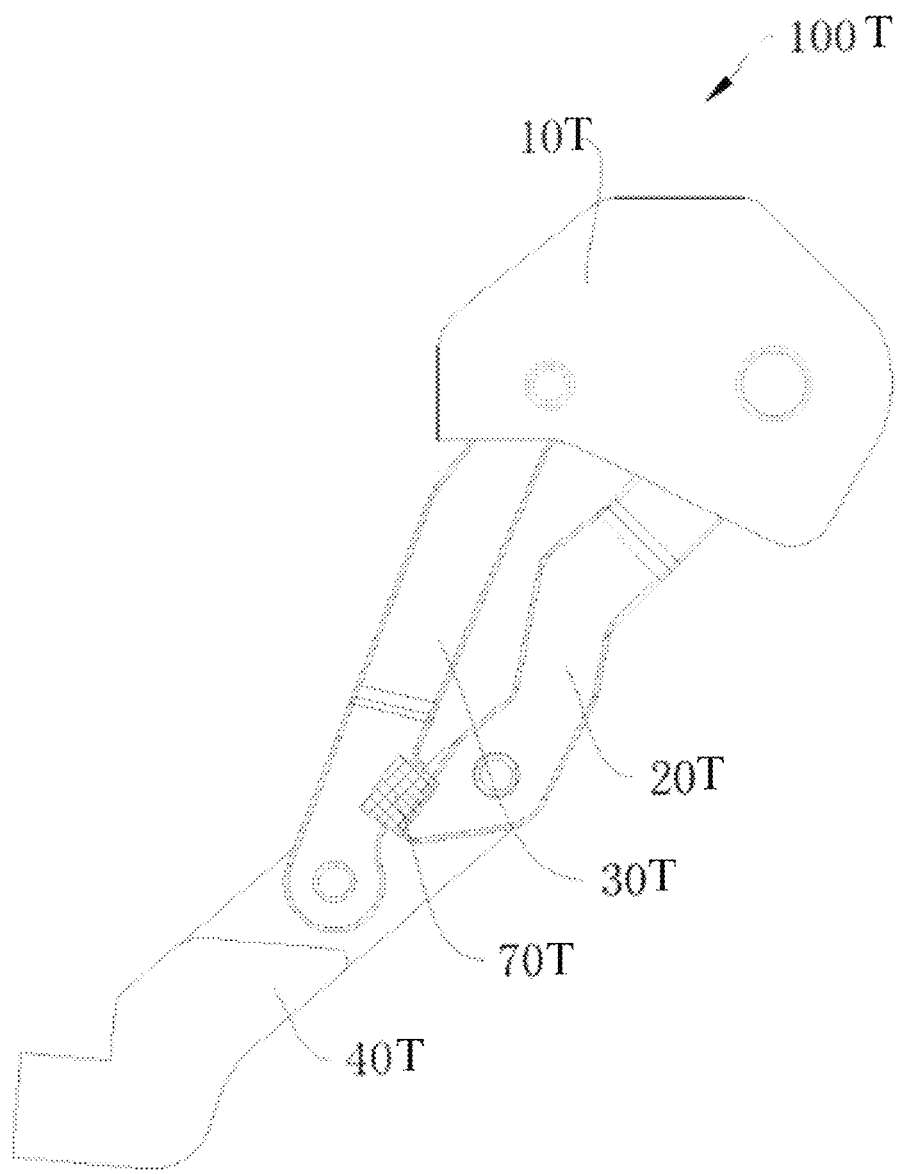
FIG. 29 is a side view of a drive assembly with a running board holder in an extended position according to an embodiment of the present disclosure.

As illustrated in FIG. 29, a running board assembly 1T for a vehicle according to embodiments of the present disclosure includes a running board 200T, a drive assembly 100T, and the driving part, in which the drive assembly 100T is the above-described drive assembly.

Specifically, the running board holder 40T is connected with the running board 200T, and the driving part is connected with the first connecting portion 20T to drive the first connecting portion 20T to rotate with respect to the mounting base 10T.

The running board 200T is used for passengers to step on, so that passengers can get on and off the vehicle conveniently. The driving part can be an electric motor that drives the first connecting portion 20T to rotate with respect to the mounting base 10T, the first connecting portion 20T drives the running board holder 40T to move, and the running board holder 40T is connected with the running board 200T, such that the running board 200T can be extended or retracted. The second connecting portion 30T is rotatably connected with the running board holder 40T, the running board holder 40T drives the second connecting portion 30T to rotate, and the first connecting portion 20T and the second connecting portion 30T each can provide support for the running board holder 40T. Hence, the stability of the running board assembly 1T is enhanced.

Therefore, the running board assembly 1T according to embodiments of the present disclosure has the driving part that drives the first connecting portion 20T to rotate, and the running board assembly 1T has a simple structure, high stability and low cost.

In some embodiments, the running board 200T extends along the left-right direction, and is provided with a plurality of drive assemblies 100T spaced apart along the left-right direction. It could be understood that the drive assembly 100T is used to provide support for the running board 200T, and by providing the running board 200T with the plurality of drive assemblies 100T, the running board 200T can keep balanced and be safer. For example, one drive assembly 100T is provided adjacent to each of left and right ends of the running board 200T, such that two ends of the running board 200T are supported along with better stability.

Advantageously, each drive assembly 100T is individually driven by one drive part. It could be understood that during long-term driving, the vehicle often encounters bumpy roads, which may cause one side of the running board 200T to sag, thereby affecting the transmission of the running board assembly 1T, and the running board 200T also becomes unstable due to the tilt, resulting in poor safety performance. Since the drive assemblies 100T are spaced apart on the running board 200T in the left-right direction, and each drive assembly 100T has the driving part, a long transmission path is not required (for example, when there is only one driving part, a transmission member is required to transmit motion to each of the drive assemblies 100T), and both sides of the running board 200T are supported, such that the running board 200T is not easy to sag, and the stability of the running board assembly 1T becomes high.

A vehicle according to embodiments of the present disclosure includes the above-described running board assembly 1T. The vehicle is convenient for the passenger to get on and off, and have good stability and low cost.

In some example embodiments (example 1), a drive assembly for a running board, comprising: a mounting base; a running board holder; a first connecting portion rotatably connected with the mounting base and the running board holder; and a second connecting portion rotatably connected with the mounting base and the running board holder, wherein a central rotation shaft of the second connection portion relative to the running board holder, a central rotation shaft of the second connection portion relative to the mounting base, a central rotation shaft of the first connection portion relative to the running board holder, and a central rotation shaft of the first connection portion relative to the mounting base each extend along a left-right direction and are parallel to one another; the mounting base, the first connecting portion, the second connecting portion and the running board holder constitute a linkage to make the running board holder movable between an extended position and a retracted position; wherein the running board holder comprises a third main body and a third hinged portion connected with the third main body; the first connecting portion comprises a first main body, and a plurality of first hinged portions connected with the first main body and spaced apart in the left-right direction, the third hinged portion being rotatably connected among the plurality of first hinged portions; and/or the second connecting portion comprises a second main body, and a plurality of second hinged portions connected with the second main body and spaced apart in the left-right direction, the third hinged portion being rotatably connected among the plurality of second hinged portions.

The drive assembly according to example 1, wherein the first main body has a first end rotatably connected with the mounting base, and a second end provided with two first hinged portions spaced apart in the left-right direction; the two first hinged portions are disposed at both sides of the third hinged portion, and the third hinged portion is connected with the two first hinged portions through a first connecting shaft.

The drive assembly according to example 1, wherein the second main body has a first end rotatably connected with the mounting base, and a second end provided with two second hinged portions spaced apart in the left-right direction; the two second hinged portions are disposed at both sides of the third hinged portion, and the third hinged portion is connected with the two second hinged portions through a second connecting shaft.

The drive assembly according to example 1, wherein at least one of the first connecting portion and the running board holder is provided with a damping block, and the damping block abuts between the first connecting portion and the running board holder when the running board holder is in at least one of the extended position and the retracted position; and/or at least one of the second connecting portion and the running board holder is provided with a damping block, and the damping block abuts between the second connecting portion and the running board holder when the running board holder is in at least one of the extended position and the retracted position.

The drive assembly according to example 1, wherein at least a part of the plurality of first hinged portions is provided with a damping block, the third main body is provided with a wedged bevel opposite the first hinged portion, and when the running board holder is in the extended position, the damping block abuts against the wedged bevel.

The drive assembly according to example 5, wherein two first hinged portions are provided and spaced apart in the left-right direction, and each of the two first hinged portions is provided with the damping block; the third main body is provided with the wedged bevel at each of left and right sides of the third hinged portion, and the two wedged bevels are provided in one-to-one correspondence with the two first hinged portions; and when the running board holder is in the extended position, the damping blocks on the two first hinged portions abut against the corresponding wedged bevels.

The drive assembly according to example 1, wherein the first connecting portion is configured as a first link rod with two ends connected with the mounting base and the running board holder respectively; and the second connecting portion is configured as a second link rod with two ends connected with the mounting base and the running board holder respectively.

The drive assembly according to example 1, wherein the first connecting portion comprises: a third link rod rotatably connected with the mounting base; a fourth link rod having two ends rotatably connected with the third link rod and the running board holder respectively; and a support portion connected at a hinge joint of the third link rod and the fourth link rod, and connected with the second connecting portion.

The drive assembly according to example 8, wherein the support portion is a sliding block, the second connecting portion is provided with a sliding groove, and the support portion is slidably embedded in the sliding groove along a direction perpendicular to the left-right direction.

The drive assembly according to example 8, wherein the support portion is a fifth link rod, and the fifth link rod has a first end rotatably connected at the hinge joint of the third link rod and the fourth link rod and a second end rotatably connected with the second connecting portion.

The drive assembly according to example 8, wherein the third link rod comprises two fourth hinged portions spaced apart in the left-right direction; the fourth link rod comprises a fifth hinged portion; the two fourth hinged portions are disposed at left and right sides of the fifth hinged portion; and the fifth hinged portion and the two fourth hinged portions are connected by a third connecting shaft.

The drive assembly according to example 11, wherein two ends of the third connecting shaft protrude from the two fourth hinged portions to form or connect the support portion.

In an example embodiment (example 13), a running board assembly for a vehicle, comprising: a running board; a drive assembly comprising: a mounting base, a running board holder, a first connecting portion rotatably connected with the mounting base and the running board holder, and a second connecting portion rotatably connected with the mounting base and the running board holder, wherein a central rotation shaft of the second connection portion relative to the running board holder, a central rotation shaft of the second connection portion relative to the mounting base, a central rotation shaft of the first connection portion relative to the running board holder, and a central rotation shaft of the first connection portion relative to the mounting base each extend along a left-right direction and are parallel to one another; the mounting base, the first connecting portion, the second connecting portion and the running board holder constitute a linkage to make the running board holder movable between an extended position and a retracted position, wherein the running board holder comprises a third main body and a third hinged portion connected with the third main body; the first connecting portion comprises a first main body, and a plurality of first hinged portions connected with the first main body and spaced apart in the left-right direction, the third hinged portion being rotatably connected among the plurality of first hinged portions; and/or the second connecting portion comprises a second main body, and a plurality of second hinged portions connected with the second main body and spaced apart in the left-right direction, the third hinged portion being rotatably connected among the plurality of second hinged portions, the running board holder being connected with the running board; and a driving part connected with the first connecting portion to drive the first connecting portion to rotate with respect to the mounting base.

The running board assembly according to example 13, wherein the running board extends along a left-right direction, and is provided with a plurality of the drive assemblies spaced apart along the left-right direction.

The running board assembly according to example 14, wherein each of the drive assemblies is individually driven by one driving part.

The running board assembly according to example 13, wherein the first main body has a first end rotatably connected with the mounting base, and a second end provided with two first hinged portions spaced apart in the left-right direction; the two first hinged portions are disposed at both sides of the third hinged portion, and the third hinged portion is connected with the two first hinged portions through a first connecting shaft.

The running board assembly according to example 13, wherein the second main body has a first end rotatably connected with the mounting base, and a second end provided with two second hinged portions spaced apart in the left-right direction; the two second hinged portions are disposed at both sides of the third hinged portion, and the third hinged portion is connected with the two second hinged portions through a second connecting shaft.

The running board assembly according to example 13, wherein at least one of the first connecting portion and the running board holder is provided with a damping block, and the damping block abuts between the first connecting portion and the running board holder when the running board holder is in at least one of the extended position and the retracted position; and/or at least one of the second connecting portion and the running board holder is provided with a damping block, and the damping block abuts between the second connecting portion and the running board holder when the running board holder is in at least one of the extended position and the retracted position.

The running board assembly according to example 13, wherein at least a part of the plurality of first hinged portions is provided with a damping block, the third main body is provided with a wedged bevel opposite the first hinged portion, and when the running board holder is in the extended position, the damping block abuts against the wedged bevel.

In an example embodiment (example 20), a vehicle, comprising a running board assembly comprising: a running board; a drive assembly comprising: a mounting base, a running board holder, a first connecting portion rotatably connected with the mounting base and the running board holder, and a second connecting portion rotatably connected with the mounting base and the running board holder, wherein a central rotation shaft of the second connection portion relative to the running board holder, a central rotation shaft of the second connection portion relative to the mounting base, a central rotation shaft of the first connection portion relative to the running board holder, and a central rotation shaft of the first connection portion relative to the mounting base each extend along a left-right direction and are parallel to one another; the mounting base, the first connecting portion, the second connecting portion and the running board holder constitute a linkage to make the running board holder movable between an extended position and a retracted position, wherein the running board holder comprises a third main body and a third hinged portion connected with the third main body; the first connecting portion comprises a first main body, and a plurality of first hinged portions connected with the first main body and spaced apart in the left-right direction, the third hinged portion being rotatably connected among the plurality of first hinged portions; and/or the second connecting portion comprises a second main body, and a plurality of second hinged portions connected with the second main body and spaced apart in the left-right direction, the third hinged portion being rotatably connected among the plurality of second hinged portions, the running board holder being connected with the running board; and a driving part connected with the first connecting portion to drive the first connecting portion to rotate with respect to the mounting base.

Other compositions and configurations of the vehicle according to embodiments of the present disclosure are easily understood and readily available to those skilled in the art, which will not be elaborated herein.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," "counterclockwise," "axial," "radial," and "circumferential" should be construed to refer to the orientation as then described or as shown in the drawings under discussion. These relative terms are for convenience and simplicity of description, and do not indicate or imply that the present disclosure have a particular orientation and be constructed or operated in a particular orientation. Thus, these terms cannot be constructed to limit the present disclosure.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" refers to two or more than two, unless specified otherwise.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples described in the specification and features of the various embodiments or examples may be combined by those skilled in the art without mutual contradictions.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections or communications with each other; may also be direct connections or indirect connections via intervening structures; may also be inner communications or mutual interaction of two elements, which can be understood by those skilled in the art according to specific situations.

Although embodiments of the present disclosure have been shown and described, it would be appreciated by those skilled in the art that the above embodiments are only exemplary, and cannot be construed to limit the present disclosure, and changes, modifications, alternatives and variations can be made in the embodiments without departing from the scope of the present disclosure.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A retractable device for a vehicle running board apparatus, comprising:
   a running board holder having a connecting portion;
   an arm assembly configured to drive the running board holder to move between an extended position and a retracted position, the arm assembly comprising a first arm and a second arm, the first arm having a first end and a second end, the second end of the first arm being pivotally connected to the connecting portion of the running board holder, the second arm having a first end and a second end, the second end of the second arm being pivotally connected to the connecting portion of the running board holder, and the second end of at least one of the first arm or the second arm straddles the connecting portion,
   wherein:
      the second end of the first arm includes two first lugs, the two first lugs define a first engagement groove therebetween, the two first lugs are respectively located at two sides of the connecting portion, and a first part of the connecting portion is fitted in the first engagement groove and is pivotally connected to the two first lugs, and
      the second end of the second arm includes two second lugs, the two second lugs define a second engagement groove therebetween, the two second lugs are respectively located at the two sides of the connecting portion, and a second part of the connecting portion is fitted in the engagement groove and is pivotally connected to the two second lugs,
   wherein:
      the connecting portion has a first pin hole, the first lug has a first lug hole, and the connecting portion is pivotally connected to the first lug through a first pin shaft fitted in the first pin hole and the first lug hole, and
      the connecting portion has a second pin hole, the second lug has a second lug hole, and the connecting portion is pivotally connected to the second lug through a second pin shaft fitted in the second pin hole and the second lug hole;
   a first bushing fitted in the first pin hole, the first pin shaft being rotatably fitted in the first bushing; and
   a second bushing fitted in the second pin hole, the second pin shaft being rotatably fitted in the second bushing.

2. The retractable device according to claim 1, wherein both the second end of the first arm and the second end of the second arm straddle the connecting portion.

3. The retractable device according to claim 1, wherein the second end of at least one arm includes two lugs spaced apart from each other, the two lugs are respectively located at two sides of the connecting portion, and the connecting portion is pivotally connected to the lugs.

4. The retractable device according to claim 1, wherein the second end of the first arm is pivotally connected to a free end of the connecting portion, and the second end of the second arm is pivotally connected to a middle part of the connecting portion.

5. The retractable device according to claim 1, wherein
   two first bushings are provided, one first bushing is fitted in a first end of the first pin hole, and the other first bushing is fitted in a second end of the first pin hole; and
   two second bushings are provided, one second bushing is fitted in a first end of the second pin hole, and the other second bushing is fitted in a second end of the second pin hole.

6. The retractable device according to claim 5, wherein each of the two first bushings comprises a first cylindrical body and a first flange disposed at an end of the first cylindrical body, the first cylindrical body of one of the two first bushings is fitted in the first end of the first pin hole, the first flange of the one of the two first bushings abuts against a first side face of the connecting portion, the first cylindrical body of the other of the two first bushings is fitted in the second end of the first pin hole, and the first flange of the other of the two first bushings abuts against a second side face of the connecting portion,
   wherein each of the two second bushings comprises a second cylindrical body and a second flange disposed at an end of the second cylindrical body, the second cylindrical body of one of the two second bushings is fitted in the first end of the second pin hole, the second flange of the one of the two second bushings abuts against the first side face of the connecting portion, the second cylindrical body of the other of the two second bushings is fitted in the second end of the second pin hole, and the second flange of the other of the two second bushings abuts against the second side face of the connecting portion.

7. The retractable device according to claim 1, further comprising a cushioning member provided to one of the first arm and the second arm, wherein in the retracted position, the cushioning member is in contact with the other one of the first arm and the second arm.

8. The retractable device according to claim 1, further comprising a mounting bracket, the first end of the first arm being pivotally connected to the mounting bracket, and the first end of the second arm being pivotally connected to the mounting bracket.

9. The retractable device according to claim 1, further comprising a mounting bracket, the arm assembly further comprising a third arm having a first end pivotally connected to the mounting bracket and a second end pivotally connected to the first end of the second arm, and the first end of the first arm being pivotally connected to the mounting bracket.

10. The retractable device according to claim 9, further comprising:
   a trajectory-control plate mounted to the first arm and having a trajectory-control groove;
   and a trajectory-control shaft mounted to at least one of the second arm or the third arm, an end of the trajectory-control shaft being movably fitted in the trajectory-control groove.

11. The retractable device according to claim 9, wherein one of the second end of the third arm or the first end of the second arm has a third engagement groove, and the other one of the second end of the third arm or the first end of the second arm is fitted in the third engagement groove.

12. The retractable device according to claim 1, further comprising a mounting bracket, the first end of the second arm being pivotally connected to the mounting bracket, and the arm assembly further comprising:
- a third arm having a first end pivotally connected to the mounting bracket, and a second end pivotally connected to the first end of the first arm;
- a fourth arm having a first end pivotally connected to the first end of the first arm and the second end of the third arm, and a second end pivotally connected to the second arm.

13. The retractable device according to claim 12, wherein a middle part of the second arm is provided with a groove hole, and the second end of the fourth arm is fitted in the groove hole.

14. The retractable device according to claim 13, wherein the first end of the first arm includes two lug plates spaced apart from each other, the second end of the third arm includes two third lugs spaced apart from each other, the two lug plates are fitted between the two third lugs, and the first end of the fourth arm is fitted between the two lug plates.

15. The retractable device according to claim 13, wherein the first end of the first arm includes two lug plates spaced apart from each other, the second end of the third arm includes two third lugs spaced apart from each other, the two third lugs are fitted between the two lug plates, and the first end of the fourth arm is fitted between the two third lugs.

16. The retractable device according to claim 1, wherein the first end of the first arm is pivotally connected to a bottom surface of a vehicle body, and the first end of the second arm is pivotally connected to the bottom surface.

17. A vehicle running board apparatus, comprising:
a retractable device comprising:
- a running board holder having a connecting portion; and
- an arm assembly configured to drive the running board holder to move between an extended position and a retracted position, the arm assembly comprising a first arm and a second arm, the first arm having a first end and a second end, the second end of the first arm being pivotally connected to the connecting portion of the running board holder, the second arm having a first end and a second end, the second end of the second arm being pivotally connected to the connecting portion of the running board holder, and the second end of at least one of the first arm or the second arm straddles the connecting portion,
wherein the second end of the first arm includes two first lugs, the two first lugs define a first engagement groove therebetween, the two first lugs are respectively located at two sides of the connecting portion, and a first part of the connecting portion is fitted in the first engagement groove and is pivotally connected to the two first lugs, and
wherein the second end of the second arm includes two second lugs, the two second lugs define a second engagement groove therebetween, the two second lugs are respectively located at the two sides of the connecting portion, and a second part of the connecting portion is fitted in the engagement groove and is pivotally connected to the two second lugs,
wherein the connecting portion has a first pin hole, the first lug has a first lug hole, and the connecting portion is pivotally connected to the first lug through a first pin shaft fitted in the first pin hole and the first lug hole,
wherein the connecting portion has a second pin hole, the second lug has a second lug hole, and the connecting portion is pivotally connected to the second lug through a second pin shaft fitted in the second pin hole and the second lug hole,
and wherein the arm assembly comprises a first bushing fitted in the first pin hole, the first pin shaft being rotatably fitted in the first bushing, and a second bushing fitted in the second pin hole, the second pin shaft being rotatably fitted in the second bushing; and
a footboard mounted to the running board holder.

18. The retractable device according to claim 17, wherein both the second end of the first arm and the second end of the second arm straddle the connecting portion.

19. The retractable device according to claim 17, wherein
- two first bushings are provided, one first bushing is fitted in a first end of the first pin hole, and the other first bushing is fitted in a second end of the first pin hole; and
- two second bushings are provided, one second bushing is fitted in a first end of the second pin hole, and the other second bushing is fitted in a second end of the second pin hole.

20. The retractable device according to claim 19, wherein each of the two first bushings comprises a first cylindrical body and a first flange disposed at an end of the first cylindrical body, the first cylindrical body of one of the two first bushings is fitted in the first end of the first pin hole, the first flange of the one of the two first bushings abuts against a first side face of the connecting portion, the first cylindrical body of the other of the two first bushings is fitted in the second end of the first pin hole, and the first flange of the other of the two first bushings abuts against a second side face of the connecting portion,
wherein each of the two second bushings comprises a second cylindrical body and a second flange disposed at an end of the second cylindrical body, the second cylindrical body of one of the two second bushings is fitted in the first end of the second pin hole, the second flange of the one of the two second bushings abuts against the first side face of the connecting portion, the second cylindrical body of the other of the two second bushings is fitted in the second end of the second pin hole, and the second flange of the other of the two second bushings abuts against the second side face of the connecting portion.

* * * * *